(12) United States Patent
Chen et al.

(10) Patent No.: US 11,411,778 B2
(45) Date of Patent: Aug. 9, 2022

(54) TIME-DIVISION DUPLEX MULTIPLE INPUT MULTIPLE OUTPUT CALIBRATION

(71) Applicant: XCOM LABS, INC., San Diego, CA (US)

(72) Inventors: Jinghu Chen, San Diego, CA (US); Wanlun Zhao, San Diego, CA (US); Tamer Adel Kadous, San Diego, CA (US); Peter John Black, La Jolla, CA (US); Michael Mingxi Fan, San Diego, CA (US)

(73) Assignee: XCOM Labs, Inc., San Diego, CA (US)

( * ) Notice: Subject to any disclaimer, the term of this patent is extended or adjusted under 35 U.S.C. 154(b) by 193 days.

(21) Appl. No.: 16/510,802

(22) Filed: Jul. 12, 2019

(65) Prior Publication Data

US 2021/0014085 A1 Jan. 14, 2021

(51) Int. Cl.
*H04B 7/0413* (2017.01)
*H04B 7/06* (2006.01)
(Continued)

(52) U.S. Cl.
CPC ....... *H04L 25/0226* (2013.01); *H04B 7/0413* (2013.01); *H04B 7/0626* (2013.01); *H04L 5/0048* (2013.01); *H04L 5/14* (2013.01)

(58) Field of Classification Search
CPC .... H04B 7/026; H04B 7/0413; H04B 7/0626; H04B 7/0691; H04B 7/0874;
(Continued)

(56) References Cited

U.S. PATENT DOCUMENTS

| 5,469,115 A | 11/1995 | Peterzell |
| 5,617,060 A | 4/1997 | Wilson |

(Continued)

FOREIGN PATENT DOCUMENTS

| KR | 101027233 | 4/2011 |
| KR | 101532848 | 6/2015 |

OTHER PUBLICATIONS

International Search Report for International Application No. PCT/US2020/040534, dated Oct. 15, 2020.
(Continued)

*Primary Examiner* — Melvin C Marcelo
*Assistant Examiner* — Natali Pascual Peguero
(74) *Attorney, Agent, or Firm* — Knobbe, Martens, Olson & Bear, LLP

(57) ABSTRACT

Aspects of this disclosure relate to a time-division duplex (TDD) multiple-input multiple-output (MIMO) system that includes a plurality of nodes. The plurality of nodes collectively includes antennas divided into groups. Reference signals can be transmitted from each group of antennas to one or more other groups of antennas during respective time slots. Channel estimates can be generated based on the received reference signals. The channel estimates can be jointly processed to generate calibration coefficients. Each calibration coefficient can represent a ratio associated with a transmit coefficient and a receive coefficient. Example algorithms for the joint processing are disclosed.

23 Claims, 22 Drawing Sheets

(51) Int. Cl.
  *H04L 25/02* (2006.01)
  *H04L 5/00* (2006.01)
  *H04L 5/14* (2006.01)

(58) Field of Classification Search
  CPC ............ H04L 25/0206; H04L 25/0224; H04L 25/0226; H04L 5/0048; H04L 5/14
  See application file for complete search history.

(56) References Cited

U.S. PATENT DOCUMENTS

| | | |
|---|---|---|
| 5,757,858 A | 5/1998 | Black |
| 5,870,431 A | 2/1999 | Easton |
| 6,006,108 A | 12/1999 | Black |
| 6,107,878 A | 8/2000 | Black |
| 6,134,440 A | 10/2000 | Black |
| 6,147,964 A | 11/2000 | Black |
| 6,181,201 B1 | 1/2001 | Black |
| 6,205,129 B1 | 3/2001 | Esteves |
| 6,208,873 B1 | 3/2001 | Black |
| 6,246,885 B1 | 6/2001 | Black |
| 6,285,861 B1 | 9/2001 | Bonaccorso |
| 6,363,102 B1 | 3/2002 | Ling |
| 6,397,070 B1 | 5/2002 | Black |
| 6,426,971 B1 | 7/2002 | Wu |
| 6,434,376 B1 | 8/2002 | Black |
| 6,449,490 B1 | 9/2002 | Chaponniere |
| 6,560,211 B2 | 5/2003 | Esteves |
| 6,574,211 B2 | 6/2003 | Padovani |
| 6,594,501 B2 | 7/2003 | Black |
| 6,633,552 B1 | 10/2003 | Ling |
| 6,636,568 B2 | 10/2003 | Kadous |
| 6,661,833 B1 | 12/2003 | Black |
| 6,678,257 B1 | 1/2004 | Vijayan |
| 6,680,925 B2 | 1/2004 | Wu |
| 6,680,968 B2 | 1/2004 | Black |
| 6,687,510 B2 | 2/2004 | Esteves |
| 6,693,920 B2 | 2/2004 | Montojo |
| 6,694,469 B1 | 2/2004 | Jalali |
| 6,714,526 B2 | 3/2004 | Wei |
| 6,725,028 B2 | 4/2004 | Bonaccorso |
| 6,738,608 B2 | 5/2004 | Black |
| 6,748,201 B2 | 6/2004 | Black |
| 6,757,520 B2 | 6/2004 | Attar |
| 6,798,736 B1 | 9/2004 | Black |
| 6,801,580 B2 | 10/2004 | Kadous |
| 6,813,478 B2 | 11/2004 | Glazko |
| 6,873,606 B2 | 3/2005 | Agrawal |
| 6,894,994 B1 | 5/2005 | Grob |
| 6,917,821 B2 | 7/2005 | Kadous |
| 6,920,504 B2 | 7/2005 | Bender |
| 6,928,062 B2 | 8/2005 | Krishnan |
| 6,985,516 B1 | 1/2006 | Easton |
| 6,987,778 B2 | 1/2006 | Sindhushayana |
| 7,010,073 B2 | 3/2006 | Black |
| 7,020,073 B2 | 3/2006 | Kadous |
| 7,020,225 B2 | 3/2006 | Sindhushayana |
| 7,039,001 B2 | 5/2006 | Krishnan |
| 7,042,857 B2 | 5/2006 | Krishnan |
| 7,051,268 B1 | 5/2006 | Sindhushayana |
| 7,068,707 B2 | 6/2006 | Bender |
| 7,069,037 B2 | 6/2006 | Lott |
| 7,072,628 B2 | 7/2006 | Agashe |
| 7,079,550 B2 | 7/2006 | Padovani |
| 7,088,701 B1 | 8/2006 | Attar |
| 7,088,957 B2 | 8/2006 | Ling |
| 7,095,790 B2 | 8/2006 | Krishnan |
| 7,106,782 B2 | 9/2006 | Howard |
| 7,123,922 B2 | 10/2006 | Chaponniere |
| 7,127,654 B2 | 10/2006 | Jalali |
| 7,130,282 B2 | 10/2006 | Black |
| 7,133,437 B2 | 11/2006 | Black |
| 7,145,940 B2 | 12/2006 | Gore |
| 7,149,264 B2 | 12/2006 | Black |
| 7,155,246 B2 | 12/2006 | Bhushan |
| 7,167,684 B2 | 1/2007 | Kadous |
| 7,177,351 B2 | 2/2007 | Kadous |
| 7,177,648 B2 | 2/2007 | Attar |
| 7,184,426 B2 | 2/2007 | Padovani |
| 7,184,713 B2 | 2/2007 | Kadous |
| 7,194,041 B2 | 3/2007 | Kadous |
| 7,206,580 B2 | 4/2007 | Black |
| 7,206,598 B2 | 4/2007 | Attar |
| 7,209,517 B2 | 4/2007 | Sindhushayana |
| 7,228,148 B2 | 6/2007 | Esteves |
| 7,236,535 B2 | 6/2007 | Subramaniam |
| 7,239,622 B2 | 7/2007 | Black |
| 7,239,847 B2 | 7/2007 | Attar |
| 7,251,229 B2 | 7/2007 | Montojo |
| 7,289,473 B1 | 10/2007 | Padovani |
| 7,295,857 B2 | 11/2007 | Joshi |
| 7,315,531 B2 | 1/2008 | Black |
| 7,369,549 B2 | 5/2008 | Wu |
| 7,376,209 B2 | 5/2008 | Namgoong |
| 7,382,744 B2 | 6/2008 | Bhushan |
| 7,411,930 B2 | 8/2008 | Montojo |
| 7,418,046 B2 | 8/2008 | Gore |
| 7,428,269 B2 | 9/2008 | Sampath |
| 7,450,943 B2 | 11/2008 | Black |
| 7,457,639 B2 | 11/2008 | Subramaniam |
| 7,463,576 B2 | 12/2008 | Krishnan |
| 7,477,693 B2 | 1/2009 | Subramaniam |
| 7,499,427 B2 | 3/2009 | Padovani |
| 7,508,748 B2 | 3/2009 | Kadous |
| 7,525,909 B2 | 4/2009 | Fan |
| 7,564,775 B2 | 7/2009 | Jayaraman |
| 7,564,794 B2 | 7/2009 | Montojo |
| 7,564,818 B2 | 7/2009 | Black |
| 7,567,621 B2 | 7/2009 | Sampath |
| 7,580,709 B2 | 8/2009 | Black |
| 7,596,090 B2 | 9/2009 | Black |
| 7,606,326 B2 | 10/2009 | Krishnan |
| 7,609,773 B2 | 10/2009 | Bhushan |
| 7,613,978 B2 | 11/2009 | Jalali |
| 7,620,005 B2 | 11/2009 | Wei |
| 7,646,802 B2 | 1/2010 | Black |
| 7,668,125 B2 | 2/2010 | Kadous |
| 7,672,383 B2 | 3/2010 | Namgoong |
| 7,675,886 B2 | 3/2010 | Agrawal |
| 7,693,213 B2 | 4/2010 | Sindhushayana |
| 7,719,991 B2 | 5/2010 | Bhushan |
| 7,729,714 B2 | 6/2010 | Black |
| 7,738,906 B2 | 6/2010 | Attar |
| 7,742,447 B2 | 6/2010 | Joshi |
| 7,796,563 B2 | 9/2010 | Wu |
| 7,817,677 B2 | 10/2010 | Black |
| 7,817,760 B2 | 10/2010 | Black |
| 7,822,148 B2 | 10/2010 | Shapira et al. |
| 7,826,441 B2 | 11/2010 | Black |
| 7,830,900 B2 | 11/2010 | Black |
| 7,835,695 B2 | 11/2010 | Ling |
| 7,848,282 B2 | 12/2010 | Padovani |
| 7,848,283 B2 | 12/2010 | Padovani |
| 7,848,284 B2 | 12/2010 | Padovani |
| 7,848,285 B2 | 12/2010 | Padovani |
| 7,848,298 B2 | 12/2010 | Attar |
| 7,869,387 B2 | 1/2011 | Black |
| 7,876,265 B2 | 1/2011 | Black |
| 7,890,144 B2 | 2/2011 | Subramaniam |
| 7,893,873 B2 | 2/2011 | Black |
| 7,903,615 B2 | 3/2011 | Gorokhov |
| 7,924,753 B2 | 4/2011 | Attar |
| 7,940,663 B2 | 5/2011 | Kadous |
| 7,948,959 B2 | 5/2011 | Wang |
| 7,953,062 B2 | 5/2011 | Sindhushayana |
| 7,961,592 B2 | 6/2011 | Black |
| 7,974,359 B2 | 7/2011 | Gorokhov |
| 7,995,531 B2 | 8/2011 | Padovani |
| 7,995,684 B2 | 8/2011 | Montojo |
| 8,005,042 B2 | 8/2011 | Padovani |
| 8,009,625 B2 | 8/2011 | Padovani |
| 8,010,113 B2 | 8/2011 | Black |
| 8,014,331 B2 | 9/2011 | Sarkar |
| 8,040,942 B2 | 10/2011 | Bhushan |

(56) References Cited

U.S. PATENT DOCUMENTS

| | | |
|---|---|---|
| 8,050,198 B2 | 11/2011 | Bhushan |
| 8,073,068 B2 | 12/2011 | Kim |
| 8,077,654 B2 | 12/2011 | Sutivong |
| 8,077,655 B2 | 12/2011 | Padovani |
| 8,077,691 B2 | 12/2011 | Kadous |
| 8,085,678 B2 | 12/2011 | Spindola |
| 8,089,924 B2 | 1/2012 | Padovani |
| 8,094,623 B2 | 1/2012 | Attar |
| 8,094,740 B2 | 1/2012 | Bhushan |
| 8,098,635 B2 | 1/2012 | Montojo |
| 8,098,767 B2 | 1/2012 | Mirbagheri |
| 8,102,872 B2 | 1/2012 | Spindola |
| 8,107,517 B2 | 1/2012 | Naguib |
| 8,111,663 B2 | 2/2012 | Black |
| 8,116,283 B2 | 2/2012 | Black |
| 8,126,072 B2 | 2/2012 | Namgoong |
| 8,139,672 B2 | 3/2012 | Gore |
| 8,160,596 B2 | 4/2012 | Black |
| 8,165,619 B2 | 4/2012 | Attar |
| 8,175,594 B2 | 5/2012 | Attar |
| 8,189,540 B2 | 5/2012 | Padovani |
| 8,203,961 B2 | 6/2012 | Yavuz |
| 8,204,530 B2 | 6/2012 | Gorokhov |
| 8,213,390 B2 | 7/2012 | Black |
| 8,218,573 B2 | 7/2012 | Bhushan |
| 8,229,423 B2 | 7/2012 | Sarkar |
| 8,306,096 B2 | 11/2012 | Sampath |
| 8,311,027 B2 | 11/2012 | Padovani |
| 8,331,310 B2 | 12/2012 | Wang |
| 8,331,377 B2 | 12/2012 | Attar |
| 8,331,385 B2 | 12/2012 | Black |
| 8,331,892 B2 | 12/2012 | Kadous |
| 8,351,372 B2 | 1/2013 | Padovani |
| 8,351,456 B2 | 1/2013 | Kadous |
| 8,363,697 B2 | 1/2013 | Grob |
| 8,375,261 B2 | 2/2013 | Shi |
| 8,385,388 B2 | 2/2013 | Soriaga |
| 8,385,433 B2 | 2/2013 | Wang |
| 8,385,465 B2 | 2/2013 | Kadous |
| 8,385,923 B2 | 2/2013 | Attar |
| 8,391,196 B2 | 3/2013 | Gorokhov |
| 8,391,337 B2 | 3/2013 | Black |
| 8,391,413 B2 | 3/2013 | Mantravadi |
| 8,396,152 B2 | 3/2013 | Attar |
| 8,406,774 B2 | 3/2013 | Yavuz |
| 8,411,594 B2 | 4/2013 | Black |
| 8,412,227 B2 | 4/2013 | Edge |
| 8,416,756 B2 | 4/2013 | Bhushan |
| 8,451,740 B2 | 5/2013 | Sampath |
| 8,451,776 B2 | 5/2013 | Dayal |
| 8,452,011 B2 | 5/2013 | Guo |
| 8,457,152 B2 | 6/2013 | Gorokhov |
| 8,462,859 B2 | 6/2013 | Sampath |
| 8,472,322 B2 | 6/2013 | Black |
| 8,472,877 B2 | 6/2013 | Hou |
| 8,483,223 B2 | 7/2013 | Black |
| 8,494,593 B2 | 7/2013 | Black |
| 8,498,192 B2 | 7/2013 | Bhushan |
| 8,503,360 B2 | 8/2013 | Hou |
| 8,514,988 B2 | 8/2013 | Wu |
| 8,537,875 B2 | 9/2013 | Soriaga |
| 8,576,760 B2 | 11/2013 | Gorokhov |
| 8,582,621 B2 | 11/2013 | Grob |
| 8,583,137 B2 | 11/2013 | Rezaiifar |
| 8,594,252 B2 | 11/2013 | Black |
| 8,605,729 B2 | 12/2013 | Dayal |
| 8,605,801 B2 | 12/2013 | Rezaiifar |
| 8,611,303 B2 | 12/2013 | Rezaiifar |
| 8,611,305 B2 | 12/2013 | Black |
| 8,611,310 B2 | 12/2013 | Black |
| 8,611,325 B2 | 12/2013 | Black |
| 8,619,717 B2 | 12/2013 | Agrawal |
| 8,619,835 B2 | 12/2013 | Grob |
| 8,630,602 B2 | 1/2014 | Attar |
| 8,634,435 B2 | 1/2014 | Kadous |
| 8,634,438 B2 | 1/2014 | Nanda |
| 8,635,645 B2 | 1/2014 | Krishnamoorthi |
| 8,638,758 B2 | 1/2014 | Black |
| 8,639,190 B2 | 1/2014 | Gore |
| 8,654,705 B2 | 2/2014 | Wang |
| 8,654,715 B2 | 2/2014 | Wang |
| 8,655,400 B2 | 2/2014 | Kadous |
| 8,676,209 B2 | 3/2014 | Gorokhov |
| 8,700,083 B2 | 4/2014 | Yavuz |
| 8,712,461 B2 | 4/2014 | Yavuz |
| 8,724,545 B2 | 5/2014 | Dayal |
| 8,724,555 B2 | 5/2014 | Krishnan |
| 8,732,272 B2 | 5/2014 | Deshpande |
| 8,737,538 B2 | 5/2014 | Grob |
| 8,737,911 B2 | 5/2014 | Black |
| 8,743,909 B2 | 6/2014 | Black |
| 8,744,018 B2 | 6/2014 | Chen |
| 8,744,504 B2 | 6/2014 | Faccin et al. |
| 8,760,994 B2 | 6/2014 | Wang |
| 8,767,885 B2 | 7/2014 | Sampath |
| 8,773,308 B2 | 7/2014 | Black |
| 8,782,112 B2 | 7/2014 | Ling |
| 8,824,979 B2 | 9/2014 | Yavuz |
| 8,825,860 B2 | 9/2014 | Linsky |
| 8,830,934 B2 | 9/2014 | Banister |
| 8,831,156 B2 | 9/2014 | Liang |
| 8,839,079 B2 | 9/2014 | Chen |
| 8,842,693 B2 | 9/2014 | Agrawal |
| 8,848,607 B2 | 9/2014 | Wang |
| 8,854,944 B2 | 10/2014 | Jou |
| 8,855,001 B2 | 10/2014 | Gorokhov |
| 8,867,456 B2 | 10/2014 | Yavuz |
| 8,868,118 B2 | 10/2014 | Rezaiifar |
| 8,873,534 B2 | 10/2014 | Sindhushayana |
| 8,879,440 B2 | 11/2014 | Guo |
| 8,879,445 B2 | 11/2014 | Sadek |
| 8,885,744 B2 | 11/2014 | Kadous |
| 8,886,126 B2 | 11/2014 | Mantravadi |
| 8,886,239 B2 | 11/2014 | Dayal |
| 8,891,436 B2 | 11/2014 | Zhang |
| 8,897,181 B2 | 11/2014 | Wang |
| 8,897,188 B2 | 11/2014 | Black |
| 8,897,220 B2 | 11/2014 | Kadous |
| 8,897,256 B2 | 11/2014 | Cherian |
| 8,903,021 B2 | 12/2014 | Mantravadi |
| 8,908,496 B2 | 12/2014 | Kadous |
| 8,923,109 B2 | 12/2014 | Wang |
| 8,923,125 B2 | 12/2014 | Lott |
| 8,923,208 B2 | 12/2014 | Dayal |
| 8,929,908 B2 | 1/2015 | Agrawal |
| 8,948,095 B2 | 2/2015 | Black |
| 8,948,147 B2 | 2/2015 | Zheng |
| 8,954,063 B2 | 2/2015 | Sarkar |
| 8,971,461 B2 | 3/2015 | Sampath |
| 8,971,823 B2 | 3/2015 | Gore |
| 8,971,884 B2 | 3/2015 | Ahluwalia |
| 8,971,948 B1 | 3/2015 | Breslin et al. |
| 8,983,480 B2 | 3/2015 | Rezaiifar |
| 8,995,417 B2 | 3/2015 | Jou |
| 9,001,735 B2 | 4/2015 | Padovani |
| 9,007,942 B2 | 4/2015 | Zhao |
| 9,014,152 B2 | 4/2015 | Jou |
| 9,054,761 B2 | 6/2015 | Lee et al. |
| 9,055,545 B2 | 6/2015 | Black |
| 9,059,785 B2 | 6/2015 | Fertonani |
| 9,066,306 B2 | 6/2015 | Yavuz |
| 9,071,344 B2 | 6/2015 | Smee |
| 9,072,102 B2 | 6/2015 | Yavuz |
| 9,078,269 B2 | 7/2015 | Yavuz |
| 9,088,389 B2 | 7/2015 | Gorokhov |
| 9,106,287 B2 | 8/2015 | Wang |
| 9,113,488 B2 | 8/2015 | Oguz |
| 9,118,387 B2 | 8/2015 | Padovani |
| 9,119,026 B2 | 8/2015 | Black |
| 9,119,217 B2 | 8/2015 | Black |
| 9,124,344 B2 | 9/2015 | Padovani |
| 9,131,420 B2 | 9/2015 | Rezaiifar |
| 9,136,974 B2 | 9/2015 | Gorokhov |
| 9,137,806 B2 | 9/2015 | Yavuz |

(56) References Cited

U.S. PATENT DOCUMENTS

| | | |
|---|---|---|
| 9,143,957 B2 | 9/2015 | Sadek |
| 9,144,036 B2 | 9/2015 | Gorokhov |
| 9,144,084 B2 | 9/2015 | Sadek |
| 9,148,256 B2 | 9/2015 | Sampath |
| 9,154,179 B2 | 10/2015 | Gudem |
| 9,154,211 B2 | 10/2015 | Sampath |
| 9,155,106 B2 | 10/2015 | Krishnan |
| 9,161,232 B2 | 10/2015 | Linsky |
| 9,161,233 B2 | 10/2015 | Wang |
| 9,172,402 B2 | 10/2015 | Gudem |
| 9,172,453 B2 | 10/2015 | Wang |
| 9,179,319 B2 | 11/2015 | Gore |
| 9,184,870 B2 | 11/2015 | Sampath |
| 9,185,718 B2 | 11/2015 | Kadous |
| 9,185,720 B2 | 11/2015 | Mantravadi |
| 9,198,053 B2 | 11/2015 | Edge |
| 9,204,437 B2 | 12/2015 | Smee |
| 9,226,173 B2 | 12/2015 | Sadek |
| 9,246,560 B2 | 1/2016 | Sampath |
| 9,253,658 B2 | 2/2016 | Sadek |
| 9,264,972 B2 | 2/2016 | Fan |
| 9,277,564 B2 | 3/2016 | Wang |
| 9,282,462 B2 | 3/2016 | Dayal |
| 9,288,814 B2 | 3/2016 | Yavuz |
| 9,307,544 B2 | 4/2016 | Gore |
| 9,344,973 B2 | 5/2016 | Yavuz |
| 9,363,764 B2 | 6/2016 | Black |
| 9,374,791 B2 | 6/2016 | Yavuz |
| 9,398,602 B2 | 7/2016 | Kadous |
| 9,408,165 B2 | 8/2016 | Jou |
| 9,408,220 B2 | 8/2016 | Gore |
| 9,419,751 B2 | 8/2016 | Sindhushayana |
| 9,450,638 B2 | 9/2016 | Yan |
| 9,451,480 B2 | 9/2016 | Huang |
| 9,461,736 B2 | 10/2016 | Bhushan |
| 9,474,075 B2 | 10/2016 | Yavuz |
| 9,491,722 B2 | 11/2016 | Yavuz |
| 9,497,495 B2 | 11/2016 | Krishnamoorthi |
| 9,509,452 B2 | 11/2016 | Liang |
| 9,525,477 B1 | 12/2016 | Wu |
| 9,578,649 B2 | 2/2017 | Dayal |
| 9,585,150 B2 | 2/2017 | Marsh |
| 9,585,156 B2 | 2/2017 | Bhattad |
| 9,602,176 B2 | 3/2017 | Schmid et al. |
| 9,609,649 B2 | 3/2017 | Fan |
| 9,628,311 B2 | 4/2017 | Bertrand et al. |
| 9,660,776 B2 | 5/2017 | Kadous |
| 9,673,837 B2 | 6/2017 | Xue |
| 9,730,227 B2 | 8/2017 | Marsh |
| 9,750,014 B2 | 8/2017 | Sadek |
| 9,788,361 B2 | 10/2017 | Valliappan |
| 9,832,785 B2 | 11/2017 | Kadous |
| 9,860,033 B2 | 1/2018 | Kadous |
| 9,867,194 B2 | 1/2018 | Kadous |
| 9,893,800 B2 | 2/2018 | Wu |
| 9,900,856 B2 | 2/2018 | Wu |
| 9,924,368 B2 | 3/2018 | Valliappan |
| 9,936,400 B2 | 4/2018 | Lee |
| 9,954,668 B2 | 4/2018 | Lee |
| 9,955,476 B2 | 4/2018 | Black |
| 9,991,986 B2 | 6/2018 | Sindhushayana |
| 10,044,438 B2 | 8/2018 | Kadous |
| 10,044,459 B2 | 8/2018 | Chendamarai |
| 10,075,313 B2 | 9/2018 | Black |
| 10,091,789 B2 | 10/2018 | Valliappan |
| 10,178,649 B2 | 1/2019 | Liu |
| 10,182,404 B2 | 1/2019 | Prakash |
| 10,201,014 B2 | 2/2019 | Kadous |
| 10,218,406 B2 | 2/2019 | Liu |
| 10,219,235 B2 | 2/2019 | Patel |
| 10,219,252 B2 | 2/2019 | Chendamarai |
| 10,219,300 B2 | 2/2019 | Gorokhov |
| 10,225,818 B2 | 3/2019 | Liu |
| 10,244,399 B2 | 3/2019 | Damnjanovic et al. |
| 10,257,848 B2 | 4/2019 | Sun |
| 10,257,851 B2 | 4/2019 | Patel |
| 10,264,541 B2 | 4/2019 | Patel |
| 10,278,177 B2 | 4/2019 | Sadek |
| 10,291,379 B2 | 5/2019 | Kadous |
| 10,292,093 B2 | 5/2019 | Chendamarai Kannan |
| 10,298,289 B2 | 5/2019 | Yerramalli |
| 10,299,284 B2 | 5/2019 | Sadek |
| 10,327,241 B2 | 6/2019 | Kadous |
| 10,327,261 B2 | 6/2019 | Naghshvar |
| 10,334,546 B2 | 6/2019 | Chendamarai Kannan |
| 10,349,404 B2 | 7/2019 | Chendamarai Kannan |
| 10,356,816 B2 | 7/2019 | Valliappan |
| 10,362,574 B2 | 7/2019 | Chendamarai Kannan |
| 10,368,301 B2 | 7/2019 | Chendamarai Kannan |
| 10,368,305 B2 | 7/2019 | Radulescu |
| 10,368,348 B2 | 7/2019 | Chendamarai Kannan |
| 10,368,372 B2 | 7/2019 | Chendamarai Kannan |
| 10,374,777 B2 | 8/2019 | Kadous |
| 10,375,711 B2 | 8/2019 | Sadek |
| 10,404,434 B2 | 9/2019 | Kannan |
| 10,404,509 B2 | 9/2019 | Sun |
| 10,405,228 B2 | 9/2019 | Liu |
| 10,405,242 B2 | 9/2019 | Kadous |
| 10,405,262 B2 | 9/2019 | Chendamarai Kannan |
| 10,405,335 B2 | 9/2019 | Barghi |
| 10,411,795 B2 | 9/2019 | Liu |
| 10,425,945 B2 | 9/2019 | Sun |
| 10,433,179 B2 | 10/2019 | Zhang |
| 10,448,257 B2 | 10/2019 | Patel |
| 10,448,296 B2 | 10/2019 | Radulescu |
| 10,454,569 B2 | 10/2019 | Wu |
| 10,455,457 B2 | 10/2019 | Sadek |
| 10,461,797 B2 | 10/2019 | Liu |
| 10,476,627 B2 | 11/2019 | Bhushan |
| 10,476,781 B2 | 11/2019 | Luo |
| 10,477,437 B2 | 11/2019 | Zhang |
| 10,477,526 B2 | 11/2019 | Chendamarai Kannan |
| 10,484,878 B2 | 11/2019 | Patel |
| 10,484,934 B2 | 11/2019 | Malik |
| 10,484,935 B2 | 11/2019 | Li |
| 10,484,954 B2 | 11/2019 | Liu |
| 10,484,959 B2 | 11/2019 | Liu |
| 10,484,992 B2 | 11/2019 | Sadek |
| 10,506,629 B2 | 12/2019 | Sun |
| 10,511,399 B2 | 12/2019 | Sun |
| 10,511,987 B2 | 12/2019 | Liu |
| 10,516,618 B2 | 12/2019 | Barghi |
| 10,523,300 B2 | 12/2019 | Malik |
| 10,536,944 B2 | 1/2020 | Zhang |
| 10,536,966 B2 | 1/2020 | Liu |
| 10,541,851 B2 | 1/2020 | Malik |
| 10,542,436 B2 | 1/2020 | Liu |
| 10,542,541 B2 | 1/2020 | Valliappan |
| 10,542,543 B2 | 1/2020 | Yerramalli |
| 10,547,422 B2 | 1/2020 | Yoo |
| 10,547,494 B2 | 1/2020 | Liu |
| 10,548,020 B2 | 1/2020 | Khoshnevisan |
| 10,548,131 B2 | 1/2020 | Yerramalli |
| 10,548,153 B2 | 1/2020 | Akkarakaran |
| 10,554,539 B2 | 2/2020 | Luo |
| 10,554,540 B2 | 2/2020 | Luo |
| 10,555,203 B2 | 2/2020 | Malik |
| 10,560,304 B2 | 2/2020 | Lei |
| 10,574,565 B2 | 2/2020 | Luo |
| 10,575,185 B2 | 2/2020 | Li |
| 10,575,229 B2 | 2/2020 | Wu |
| 10,581,572 B2 | 3/2020 | Chendamarai Kannan |
| 10,581,722 B2 | 3/2020 | Luo |
| 10,582,458 B2 | 3/2020 | Sadek |
| 10,587,497 B2 | 3/2020 | Luo |
| 10,595,327 B2 | 3/2020 | Sadek |
| 10,595,342 B2 | 3/2020 | Islam |
| 10,602,543 B2 | 3/2020 | Sun |
| 10,609,660 B2 | 3/2020 | Liu |
| 10,616,737 B2 | 4/2020 | Liu |
| 10,616,769 B2 | 4/2020 | Damnjanovic |
| 10,616,845 B2 | 4/2020 | Fan |
| 10,616,912 B2 | 4/2020 | Chendamarai Kannan |
| 10,623,163 B2 | 4/2020 | Sun |

(56) References Cited

U.S. PATENT DOCUMENTS

| | | | |
|---|---|---|---|
| 2002/0191565 A1* | 12/2002 | Mani | H04W 88/085 |
| | | | 370/334 |
| 2004/0009755 A1* | 1/2004 | Yoshida | H01Q 1/246 |
| | | | 455/101 |
| 2004/0110525 A1 | 6/2004 | Black | |
| 2004/0121730 A1 | 6/2004 | Kadous | |
| 2006/0203794 A1 | 9/2006 | Sampath | |
| 2006/0229089 A1 | 10/2006 | Tokgoz | |
| 2007/0041457 A1 | 2/2007 | Kadous | |
| 2007/0066232 A1 | 3/2007 | Black | |
| 2007/0071147 A1 | 3/2007 | Sampath | |
| 2007/0165738 A1 | 7/2007 | Barriac | |
| 2008/0025241 A1 | 1/2008 | Bhushan | |
| 2008/0032740 A1 | 2/2008 | Joshi | |
| 2008/0112495 A1 | 5/2008 | Gore | |
| 2009/0080499 A1 | 3/2009 | Yavuz | |
| 2009/0163209 A1 | 6/2009 | Black | |
| 2010/0003931 A1 | 1/2010 | Krishnan | |
| 2010/0046497 A1 | 2/2010 | Jalali | |
| 2010/0067422 A1 | 3/2010 | Kadous | |
| 2010/0215022 A1 | 8/2010 | Black | |
| 2011/0007680 A1 | 1/2011 | Kadous | |
| 2011/0007688 A1 | 1/2011 | Veeravalli | |
| 2011/0222423 A1 | 9/2011 | Spindola | |
| 2011/0256834 A1 | 10/2011 | Dayal | |
| 2011/0310858 A1 | 12/2011 | Tokgoz | |
| 2012/0077532 A1 | 3/2012 | Kadous | |
| 2012/0113906 A1 | 5/2012 | Kadous | |
| 2012/0127870 A1 | 5/2012 | Zhao | |
| 2012/0127923 A1 | 5/2012 | Zhao | |
| 2012/0140798 A1 | 6/2012 | Kadous | |
| 2012/0213303 A1 | 8/2012 | Kadous | |
| 2012/0300864 A1* | 11/2012 | Merlin | H04B 7/0857 |
| | | | 375/260 |
| 2013/0201959 A1 | 8/2013 | Guo | |
| 2013/0229961 A1 | 9/2013 | Ma | |
| 2013/0229990 A1 | 9/2013 | Fan | |
| 2014/0029705 A1 | 1/2014 | Wu | |
| 2014/0038645 A1 | 2/2014 | Wu | |
| 2014/0056239 A1 | 2/2014 | Zhang | |
| 2014/0071894 A1 | 3/2014 | Kairouz | |
| 2014/0079155 A1 | 3/2014 | Wang | |
| 2014/0112267 A1 | 4/2014 | Chen | |
| 2014/0133319 A1 | 5/2014 | Chen | |
| 2014/0219117 A1 | 8/2014 | Meshkati | |
| 2014/0219243 A1 | 8/2014 | Meshkati | |
| 2014/0247814 A1 | 9/2014 | Zhang | |
| 2014/0269554 A1* | 9/2014 | Shapira | H04B 17/11 |
| | | | 370/329 |
| 2014/0269616 A1 | 9/2014 | Black | |
| 2014/0273884 A1 | 9/2014 | Mantravadi | |
| 2014/0285684 A1 | 9/2014 | Huang | |
| 2014/0362744 A1 | 12/2014 | Yan | |
| 2015/0063150 A1 | 3/2015 | Sadek | |
| 2015/0063151 A1 | 3/2015 | Sadek | |
| 2015/0063323 A1 | 3/2015 | Sadek | |
| 2015/0065152 A1 | 3/2015 | Sadek | |
| 2015/0085686 A1 | 3/2015 | Chande | |
| 2015/0133184 A1 | 5/2015 | Sadek | |
| 2015/0139015 A1 | 5/2015 | Kadous | |
| 2015/0163823 A1 | 6/2015 | Sadek | |
| 2015/0223077 A1 | 8/2015 | Fan | |
| 2015/0280803 A1 | 10/2015 | Chen | |
| 2015/0282077 A1 | 10/2015 | Yavuz | |
| 2015/0319702 A1 | 11/2015 | Patel | |
| 2015/0326382 A1 | 11/2015 | Li | |
| 2015/0350919 A1 | 12/2015 | Patel | |
| 2016/0014619 A1 | 1/2016 | Kang | |
| 2016/0088625 A1 | 3/2016 | Kadous | |
| 2016/0095039 A1 | 3/2016 | Valliappan | |
| 2016/0095040 A1 | 3/2016 | Valliappan | |
| 2016/0128130 A1 | 5/2016 | Sadek | |
| 2016/0353482 A1 | 12/2016 | Valliappan | |
| 2017/0005741 A1 | 1/2017 | Wu | |
| 2017/0012681 A1* | 1/2017 | Buliga | H04L 27/04 |
| 2017/0019814 A1 | 1/2017 | Determan | |
| 2017/0027017 A1 | 1/2017 | Black | |
| 2017/0048047 A1 | 2/2017 | Kadous | |
| 2017/0055260 A1 | 2/2017 | Valliappan | |
| 2017/0055285 A1 | 2/2017 | Valliappan | |
| 2017/0064657 A1 | 3/2017 | Chendamarai | |
| 2017/0064729 A1 | 3/2017 | Sadek | |
| 2017/0093545 A1 | 3/2017 | Kadous | |
| 2017/0094680 A1 | 3/2017 | Patel | |
| 2017/0135029 A1 | 5/2017 | Chendamarai | |
| 2017/0142705 A1 | 5/2017 | Chendamarai | |
| 2017/0142713 A1 | 5/2017 | Chendamarai Kannan | |
| 2017/0202022 A1 | 7/2017 | Chendamarai Kannan | |
| 2017/0222771 A1 | 8/2017 | Chendamarai Kannan | |
| 2017/0223737 A1 | 8/2017 | Patel | |
| 2017/0251473 A1 | 8/2017 | Xue | |
| 2017/0280382 A1 | 9/2017 | Radulescu | |
| 2017/0311316 A1 | 10/2017 | Chendamarai Kannan | |
| 2017/0311343 A1 | 10/2017 | Chendamarai Kannan | |
| 2017/0311346 A1 | 10/2017 | Chendamarai Kannan | |
| 2017/0318586 A1 | 11/2017 | Wang | |
| 2017/0332288 A1 | 11/2017 | Sadek | |
| 2017/0359263 A1 | 12/2017 | Barghi | |
| 2017/0359815 A1 | 12/2017 | Chendamarai Kannan | |
| 2018/0042018 A1 | 2/2018 | Bhushan | |
| 2018/0054348 A1 | 2/2018 | Luo | |
| 2018/0054382 A1 | 2/2018 | Luo | |
| 2018/0054762 A1 | 2/2018 | Kadous | |
| 2018/0054780 A1 | 2/2018 | Radulescu | |
| 2018/0054783 A1 | 2/2018 | Luo | |
| 2018/0054811 A1 | 2/2018 | Luo | |
| 2018/0054812 A1 | 2/2018 | Luo | |
| 2018/0054830 A1 | 2/2018 | Luo | |
| 2018/0054832 A1 | 2/2018 | Luo | |
| 2018/0063799 A1 | 3/2018 | Sadek | |
| 2018/0070243 A1 | 3/2018 | Liu | |
| 2018/0084430 A1 | 3/2018 | Patel | |
| 2018/0098225 A1 | 4/2018 | Damnjanovic | |
| 2018/0098335 A1 | 4/2018 | Sun | |
| 2018/0103461 A1 | 4/2018 | Sun | |
| 2018/0103472 A1 | 4/2018 | Zhang | |
| 2018/0109957 A1 | 4/2018 | Fan | |
| 2018/0110022 A1 | 4/2018 | Fan | |
| 2018/0110063 A1 | 4/2018 | Fan | |
| 2018/0115907 A1 | 4/2018 | Damnjanovic | |
| 2018/0115933 A1 | 4/2018 | Radulescu | |
| 2018/0115973 A1 | 4/2018 | Black | |
| 2018/0123859 A1 | 5/2018 | Liu | |
| 2018/0124770 A1 | 5/2018 | Yerramalli | |
| 2018/0124776 A1 | 5/2018 | Yerramalli | |
| 2018/0124777 A1 | 5/2018 | Yerramalli | |
| 2018/0124789 A1 | 5/2018 | Yerramalli | |
| 2018/0124820 A1 | 5/2018 | Sun | |
| 2018/0132236 A1 | 5/2018 | Kadous | |
| 2018/0139616 A1 | 5/2018 | Khoshnevisan | |
| 2018/0139618 A1 | 5/2018 | Yerramalli | |
| 2018/0139782 A1 | 5/2018 | Sadek | |
| 2018/0146480 A1 | 5/2018 | Chendamarai Kannan | |
| 2018/0160328 A1 | 6/2018 | Chendamarai Kannan | |
| 2018/0160389 A1 | 6/2018 | Yerramalli | |
| 2018/0167848 A1 | 6/2018 | Lei | |
| 2018/0167968 A1 | 6/2018 | Liu | |
| 2018/0175986 A1 | 6/2018 | Chendamarai Kannan | |
| 2018/0176946 A1 | 6/2018 | Sun | |
| 2018/0198518 A1 | 7/2018 | Wu | |
| 2018/0213560 A1 | 7/2018 | Naghshvar | |
| 2018/0220428 A1 | 8/2018 | Sun | |
| 2018/0227011 A1 | 8/2018 | Yerramalli | |
| 2018/0227771 A1 | 8/2018 | Malik | |
| 2018/0227797 A1 | 8/2018 | Liu | |
| 2018/0227936 A1 | 8/2018 | Yerramalli | |
| 2018/0227944 A1 | 8/2018 | Yerramalli | |
| 2018/0241494 A1 | 8/2018 | Chendamarai Kannan | |
| 2018/0241526 A1 | 8/2018 | Chendamarai Kannan | |
| 2018/0242163 A1 | 8/2018 | Patel | |
| 2018/0242223 A1 | 8/2018 | Chendamarai Kannan | |
| 2018/0242232 A1 | 8/2018 | Chendamarai Kannan | |
| 2018/0242348 A1 | 8/2018 | Chendamarai Kannan | |
| 2018/0249380 A1 | 8/2018 | Zhang | |

(56) References Cited

U.S. PATENT DOCUMENTS

| | | |
|---|---|---|
| 2018/0249496 A1 | 8/2018 | Radulescu |
| 2018/0255561 A1 | 9/2018 | Barghi |
| 2018/0255584 A1 | 9/2018 | Sun |
| 2018/0269962 A1 | 9/2018 | Liu |
| 2018/0278363 A1 | 9/2018 | Bhushan |
| 2018/0279134 A1 | 9/2018 | Malik |
| 2018/0279156 A1 | 9/2018 | Malik |
| 2018/0279212 A1 | 9/2018 | Malik |
| 2018/0279292 A1 | 9/2018 | Luo |
| 2018/0287762 A1 | 10/2018 | Sun |
| 2018/0287840 A1 | 10/2018 | Akkarakaran |
| 2018/0287870 A1 | 10/2018 | Yerramalli |
| 2018/0288747 A1 | 10/2018 | Sun |
| 2018/0288749 A1 | 10/2018 | Sun |
| 2018/0288781 A1 | 10/2018 | Akkarakaran |
| 2018/0294911 A1 | 10/2018 | Sun |
| 2018/0295622 A1 | 10/2018 | Sadek |
| 2018/0302186 A1 | 10/2018 | Reddy |
| 2018/0302201 A1 | 10/2018 | Yoo |
| 2018/0302796 A1 | 10/2018 | Zhang |
| 2018/0309479 A1 | 10/2018 | Yerramalli |
| 2018/0310267 A1 | 10/2018 | Liu |
| 2018/0310341 A1 | 10/2018 | Yerramalli |
| 2018/0317093 A1 | 11/2018 | Li |
| 2018/0317259 A1 | 11/2018 | Islam |
| 2018/0324713 A1 | 11/2018 | Yoo |
| 2018/0331870 A1 | 11/2018 | Sun |
| 2018/0332551 A1 | 11/2018 | Liu |
| 2018/0343156 A1 | 11/2018 | Malik |
| 2018/0343588 A1 | 11/2018 | Sadek |
| 2018/0343676 A1 | 11/2018 | Yerramalli |
| 2018/0352563 A1 | 12/2018 | Liu |
| 2018/0359656 A1 | 12/2018 | Liu |
| 2018/0359685 A1 | 12/2018 | Li |
| 2018/0367362 A1 | 12/2018 | Sun |
| 2018/0368089 A1 | 12/2018 | Yerramalli |
| 2018/0376392 A1 | 12/2018 | Wu |
| 2018/0376393 A1 | 12/2018 | Wu |
| 2018/0376503 A1 | 12/2018 | Sun |
| 2019/0007946 A1 | 1/2019 | Yerramalli |
| 2019/0014481 A1 | 1/2019 | Yerramalli |
| 2019/0014507 A1 | 1/2019 | Zhang |
| 2019/0014589 A1 | 1/2019 | Yerramalli |
| 2019/0020424 A1 | 1/2019 | Yerramalli |
| 2019/0020461 A1 | 1/2019 | Yerramalli |
| 2019/0020522 A1 | 1/2019 | Sun |
| 2019/0020527 A1 | 1/2019 | Lei |
| 2019/0020528 A1 | 1/2019 | Lei |
| 2019/0020529 A1 | 1/2019 | Lei |
| 2019/0021080 A1 | 1/2019 | Lei |
| 2019/0028999 A1 | 1/2019 | Yerramalli |
| 2019/0029019 A1 | 1/2019 | Zhang |
| 2019/0037376 A1 | 1/2019 | Liu |
| 2019/0037427 A1 | 1/2019 | Yerramalli |
| 2019/0037481 A1 | 1/2019 | Zhang |
| 2019/0037482 A1 | 1/2019 | Damnjanovic |
| 2019/0037525 A1 | 1/2019 | Liu |
| 2019/0037603 A1 | 1/2019 | Damnjanovic |
| 2019/0053269 A1 | 2/2019 | Lei |
| 2019/0059001 A1 | 2/2019 | Yerramalli |
| 2019/0059102 A1 | 2/2019 | Yerramalli |
| 2019/0069325 A1 | 2/2019 | Yerramalli |
| 2019/0075597 A1 | 3/2019 | Yerramalli |
| 2019/0081768 A1 | 3/2019 | Zhang |
| 2019/0082333 A1 | 3/2019 | Malik |
| 2019/0090178 A1 | 3/2019 | Liu |
| 2019/0090256 A1 | 3/2019 | Liu |
| 2019/0090273 A1 | 3/2019 | Yoo |
| 2019/0098663 A1 | 3/2019 | Zhang |
| 2019/0104416 A1 | 4/2019 | Yerramalli |
| 2019/0104514 A1 | 4/2019 | Chendamarai Kannan |
| 2019/0104542 A1 | 4/2019 | Chendamarai Kannan |
| 2019/0104546 A1 | 4/2019 | Chendamarai Kannan |
| 2019/0110208 A1 | 4/2019 | Xue |
| 2019/0110254 A1 | 4/2019 | Yerramalli |
| 2019/0110302 A1 | 4/2019 | Zhang |
| 2019/0110317 A1 | 4/2019 | Zhang |
| 2019/0116585 A1 | 4/2019 | Chakraborty |
| 2019/0116599 A1 | 4/2019 | Xue |
| 2019/0124595 A1 | 4/2019 | Lei |
| 2019/0124613 A1 | 4/2019 | Liu |
| 2019/0124663 A1 | 4/2019 | Liu |
| 2019/0124694 A1 | 4/2019 | Chendamarai Kannan |
| 2019/0132817 A1 | 5/2019 | Liu |
| 2019/0141707 A1 | 5/2019 | Yerramalli |
| 2019/0141723 A1 | 5/2019 | Zhang |
| 2019/0141734 A1 | 5/2019 | Lei |
| 2019/0141744 A1 | 5/2019 | Naghshvar |
| 2019/0141783 A1 | 5/2019 | Malik |
| 2019/0149190 A1 | 5/2019 | Liu |
| 2019/0150088 A1 | 5/2019 | Sun |
| 2019/0150198 A1 | 5/2019 | Sun |
| 2019/0158333 A1 | 5/2019 | Zhang |
| 2019/0159280 A1 | 5/2019 | Chakraborty |
| 2019/0166621 A1 | 5/2019 | Yerramalli |
| 2019/0173521 A1 | 6/2019 | Liu |
| 2019/0173611 A1 | 6/2019 | Liu |
| 2019/0174542 A1 | 6/2019 | Lei |
| 2019/0181995 A1 | 6/2019 | Liu |
| 2019/0182826 A1 | 6/2019 | Yerramalli |
| 2019/0182845 A1 | 6/2019 | Xue |
| 2019/0190668 A1 | 6/2019 | Lei |
| 2019/0223215 A1 | 7/2019 | Tian |
| 2019/0229788 A1 | 7/2019 | Zhang |
| 2019/0238177 A1 | 8/2019 | Liu |
| 2019/0238219 A1 | 8/2019 | Liu |
| 2019/0238284 A1 | 8/2019 | Liu |
| 2019/0239202 A1 | 8/2019 | Bhattad |
| 2019/0246410 A1 | 8/2019 | Zhang |
| 2019/0246425 A1 | 8/2019 | Zhang |
| 2019/0253219 A1 | 8/2019 | Fan |
| 2019/0261354 A1 | 8/2019 | Fakoorian |
| 2019/0268907 A1 | 8/2019 | Bhattad |
| 2019/0268933 A1 | 8/2019 | Sun |
| 2019/0274162 A1 | 9/2019 | Zhang |
| 2019/0280836 A1 | 9/2019 | Bhattad |
| 2019/0305882 A1 | 10/2019 | Wang |
| 2019/0306878 A1 | 10/2019 | Zhang |
| 2019/0306881 A1 | 10/2019 | Fakoorian |
| 2019/0312671 A1 | 10/2019 | Lin |
| 2019/0312763 A1 | 10/2019 | Lei |
| 2019/0313260 A1 | 10/2019 | Zhang |
| 2019/0313419 A1 | 10/2019 | Fakoorian |
| 2019/0319767 A1 | 10/2019 | Sun |
| 2019/0320420 A1 | 10/2019 | Zhang |
| 2019/0320424 A1 | 10/2019 | Yerramalli |
| 2019/0320452 A1 | 10/2019 | Zhang |
| 2019/0327047 A1 | 10/2019 | Liu |
| 2019/0334577 A1 | 10/2019 | Damnjanovic |
| 2019/0334666 A1 | 10/2019 | Damnjanovic |
| 2019/0335337 A1 | 10/2019 | Damnjanovic |
| 2019/0335456 A1 | 10/2019 | Yerramalli |
| 2019/0335500 A1 | 10/2019 | Zhang |
| 2019/0335504 A1 | 10/2019 | Chakraborty |
| 2019/0342035 A1 | 11/2019 | Zhang |
| 2019/0342045 A1 | 11/2019 | Radulescu |
| 2019/0349969 A1 | 11/2019 | Chakraborty |
| 2019/0349992 A1 | 11/2019 | Zhang |
| 2019/0349998 A1 | 11/2019 | Bhattad |
| 2019/0357252 A1 | 11/2019 | Sun |
| 2019/0357255 A1 | 11/2019 | Sun |
| 2019/0363773 A1 | 11/2019 | Yerramalli |
| 2019/0364468 A1 | 11/2019 | Yerramalli |
| 2019/0364579 A1 | 11/2019 | Zhang |
| 2019/0373571 A1 | 12/2019 | Damnjanovic |
| 2019/0373640 A1 | 12/2019 | Sun |
| 2019/0379561 A1 | 12/2019 | Zhang |
| 2019/0380147 A1 | 12/2019 | Zhang |
| 2019/0386737 A1 | 12/2019 | Liu |
| 2019/0387532 A1 | 12/2019 | Liu |
| 2019/0394790 A1 | 12/2019 | Damnjanovic |
| 2020/0008107 A1 | 1/2020 | Zhang |
| 2020/0008131 A1 | 1/2020 | Chakraborty |
| 2020/0015268 A1 | 1/2020 | Zhang |

(56) References Cited

U.S. PATENT DOCUMENTS

| | | |
|---|---|---|
| 2020/0021423 A1 | 1/2020 | Liu |
| 2020/0022029 A1 | 1/2020 | Sadek |
| 2020/0029221 A1 | 1/2020 | Xue |
| 2020/0037336 A1 | 1/2020 | Sun |
| 2020/0045556 A1 | 2/2020 | Xue |
| 2020/0045744 A1 | 2/2020 | Sun |
| 2020/0052870 A1 | 2/2020 | Yerramalli |
| 2020/0053599 A1 | 2/2020 | Damnjanovic |
| 2020/0053739 A1 | 2/2020 | Xue |
| 2020/0059854 A1 | 2/2020 | Li |
| 2020/0067627 A1 | 2/2020 | Bhushan |
| 2020/0067748 A1 | 2/2020 | Zhang |
| 2020/0068435 A1 | 2/2020 | Zhang |
| 2020/0084759 A1 | 3/2020 | Liu |
| 2020/0099436 A1 | 3/2020 | Malik |
| 2020/0100116 A1 | 3/2020 | Chakraborty |
| 2020/0100247 A1 | 3/2020 | Zhang |
| 2020/0100250 A1 | 3/2020 | Zhang |
| 2020/0107335 A1 | 4/2020 | Xue |
| 2020/0107360 A1 | 4/2020 | Xue |
| 2020/0107364 A1 | 4/2020 | Xue |

OTHER PUBLICATIONS

Written Opinion for International Application No. PCT/US2020/040534, dated Oct. 15, 2020.
Rogalin, et al., "Scalable Synchronization and Reciprocity Calibration for Distributed Multiuser MIMO," pp. 1-35, Apr. 1, 2015.
Shepard, et al., "Argos: Practical Many-Antenna Base Stations," MobiCom '12, Aug. 22-26, 2012.
Mudumbai, et al., "Distributed Transmit Beamforming: Challenges and Recent Progress," IEEE Communications Magazine, pp. 102-110, Feb. 2009.
Jiang, "Massive MIMO: turning concept into reality into reality by exploiting the channel reciprocity," submitted to HAL achives-ouvertes.fr on Jan. 10, 2018.
3GPP RP-170750, New WID: Further Enhancements to Coordinated Multi-Point (CoMP) Operation for LTE, Mar. 2017.
3GPP TR 36.741, Study on Further Enhancements to Coordinated Multi-Point (CoMP) Operation for LTE, V14.0.0, Mar. 2017.
Agrawal, et al., Dynamic Point Selection for LTE-Advanced: Algorithms and Performance, Wireless Communications and Networking Conference (WCNC), 2014 IEEE, Istanbul, Turkey, Apr. 2014, pp. 1392-1397.
Andrews, et al., Are We Approaching the Fundamental Limits of Wireless Network Densification?, IEEE Communications Magazine, vol. 54, No. 10, pp. 184-190, Oct. 2016.
Björnson, et al., Cooperative Multicell Precoding: Rate Region Characterization and Distributed Strategies with Instantaneous and Statistical CSI, IEEE Transactions on Signal Processing, vol. 58, No. 8, pp. 4298-4310, Aug. 2010.
Buzzi, et al., Cell-Free Massive MIMO: User-Centric Approach, IEEE Wireless Communications Letters, vol. 6, No. 6, pp. 706-709, Dec. 2017.
Checko, et al., Cloud RAN for Mobile Networks—a Technology Overview, IEEE Communications Surveys & Tutorials, vol. 17, No. 1, Sep. 2014.
Chen, et al., Channel Hardening and Favorable Propagation in Cell-Free Massive MIMO with Stochastic Geometry, version 1, 2017. Available at: http://arxiv.org/abs/1710.00395.
Chen, et al., Channel Hardening and Favorable Propagation in Cell-Free Massive MIMO with Stochastic Geometry, version 2, 2018. Available at: http://arxiv.org/abs/1710.00395.
Davydov, et al., Evaluation of Joint Transmission CoMP in C-RAN based LTE-A HetNets with Large Coordination Areas, Proc. GLOBECOM'14, Atlanta, U.S., Dec. 2013, pp. 801-806.
Forenza, et al., Achieving Large Multiplexing Gain in Distributed Antenna Systems via Cooperation with pCell Technology, 49th Asilomar Conference on Signals, Systems and Computers, Nov. 2015, IEEE, pp. 286-293.
Gesbert, et al., Multi-cell MIMO Cooperative Networks: A New Look at Interference, IEEE Journal on Selected Areas in Communications, vol. 28, No. 9, pp. 1380-1408, Dec. 2010.
Gilhousen, et al., On the Capacity of a Cellular CDMA system, IEEE Transactions on Vehicular Technology, vol. 40, No. 2, pp. 303-311, May 1991.
Interdonato, et al., How Much Do Downlink Pilots Improve Cell-Free Massive MIMO?, IEEE, 2016, 7 pages.
Larsson, et al., Massive MIMO for Next Generation Wireless Systems, Jan. 2014.
Marzetta, et al., Fundamentals of Massive MIMO, Cambridge University Press, Dec. 2016, Table of Contents.
Nayebi, et al., Precoding and Power Optimization in Cell-Free Massive MIMO Systems, IEEE Transactions on Wireless Communications, vol. 16, No. 7, pp. 4445-4459, Jul. 2017.
Ngo, et al., Cell-Free Massive MIMO Versus Small Cells, IEEE Transactions on Wireless Communications, vol. 16, No. 3, pp. 1834-1850, Mar. 2017.
Ngo, et al., On the Total Energy Efficiency of Cell-Free Massive MIMO, IEEE Transactions on Green Communications and Networking, vol. 2, No. 1, pp. 25-39, Mar. 2018.
Osseiran, et al., 5G Mobile and Wireless Communications Technology, Cambridge University Press, Oct. 2016, Ch. 9, Coordinated multi-point transmission in 5G.
Rohde & Schwarz, LTE Transmission Modes and Beamforming, White Paper, Jul. 2015.
Shamai, et al., Enhancing the Cellular Downlink Capacity via Co-processing at the Transmitting End, Proceedings of IEEE VTC-Spring, vol. 3, 2001, pp. 1745-1749.
Sun, et al., Performance Evaluation of CS/CB for Coordinated Multipoint Transmission in LTE-A Downlink, Proceedings of IEEE PIMRC'12, Sydney, Australia, Sep. 2012, pp. 1061-1065.
Tanghe, et al., The Industrial Indoor Channel: Large-Scale and Temporal Fading at 900, 2400, and 5200 MHz, IEEE Transactions on Wireless Communications, vol. 7, No. 7, pp. 2740-2751, Jul. 2008.
Wu, et al., Cloud Radio Access Network (C-RAN): A Primer, IEEE Network, vol. 29, No. 1, pp. 35-41, Jan./Feb. 2015.
Wu, et al., Centralized and Distributed Schedulers for Non-Coherent Joint Transmission, Sep. 2018.
Zhou, et al., Distributed Wireless Communication System: A New Architecture for Future Public Wireless Access, IEEE Communications Magazine, vol. 41, No. 3, pp. 108-113, Mar. 2003.
3GPP TS 36.211, "LTE; Evolved Universal Terrestrial Radio Access (E-UTRA); Physical channels and modulation," version 14.2.0, Release 14, Apr. 2017.
3GPP TS 38.211, "5G; NR; Physical channels and modulation," version 15.2.0, Release 15, Jul. 2018.
Love, R. and Nangia, V., "Uplink Reference Signals," Chapter 15 of LTE—The UMTS Long Term Evolution: From Theory to Practice, edited by Sesia, S, et al., 2nd Edition, Wiley, 2011.

* cited by examiner

TIME-DIVISION DUPLEX MULTIPLE INPUT MULTIPLE OUTPUT CALIBRATION

BACKGROUND

Technical Field

Embodiments of this disclosure relate to calibration in communications systems.

Description of Related Technology

The types of modern computing devices continues to increase along with the differing and dynamic needs of each device. The wireless communication systems providing services to such devices are facing increasing constraints on resources and demands for quality and quantities of service. Multiple-input multiple-output (MIMO) systems can achieve high throughputs with beamforming and/or other advanced precoding schemes. Precoding can involve knowledge of channel state information (CSI). In time-division duplex (TDD) wireless communication systems, downlink CSI can be estimated based on estimated uplink channel. Due to differences in downlink and uplink signal chains, it can be desirable to calibrate a TDD MIMO system to account for such differences.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a time-division duplex (TDD) multiple-input multiple-output (MIMO) system. The TDD MIMO system comprises remote radio units comprising a plurality of antennas and a baseband unit in communication with the remote radio units. The plurality of antennas comprises a first group of antennas and a second group of antennas. The baseband unit is configured to cause the first group of antennas to transmit first reference signals to the second group of antennas over designated physical resources during a first time slot, in which the first time slot is synchronized between the first group of antennas and the second group of antennas. The base band unit is configured to cause the second group of antennas to transmit second reference signals to the first group of antennas over the designated physical resources during a second time slot, in which the second time slot is synchronized between the first group of antennas and the second group of antennas. The base band unit is configured to generate channel estimates based on the first reference signals received by the second group of antennas and the second reference signals received by the first group of antennas. The base band unit is configured to jointly process the channel estimates to generate calibration coefficients associated with antennas of the first and second groups, in which each of the calibration coefficients represents a ratio for compensating for a difference between a transmit coefficient and a receive coefficient.

The first reference signals can comprise a sounding reference signal. The first reference signals can comprise cyclically shifted signals. The first reference signals can comprise frequency division multiplexed signals.

The first time slot can be within a TDD guard period. The first time slot can be within a dedicated uplink time slot without assigned uplink traffic. The first time slot can be within a dedicated downlink time slot without assigned downlink traffic.

The first group of antennas can comprise a reference antenna, and the baseband unit can be configured to generate the calibration coefficients using a single link calibration that comprises determining the calibration coefficients based on a single link from respective antennas of the second group to the reference antenna.

The baseband unit can be configured to generate the calibration coefficients with an iterative calibration that comprises applying an iterative algorithm on a factor graph of multiple paths between antennas of the first and second groups.

The baseband unit can be configured to generate the calibration coefficients with a least squares regression of determining the calibration coefficients for the antennas of the first and second groups.

The baseband unit can be configured select an algorithm of a plurality of algorithms to generate the calibration coefficients, in which the plurality of algorithms comprises at least two algorithms having different computational complexity and different accuracy.

The baseband unit can be configured to divide the plurality of antennas into at least the first group and the second group based on at least one of spatial location or signal quality.

The plurality of antennas can comprise a third group of antennas, and the baseband unit can be configured to cause the third group of antennas to transmit third reference signals to the first and second groups of antennas during a third time slot and generate the channel estimates based on the third reference signals received by the first and second groups of antennas.

The plurality of antennas can comprise a third group of antennas, and the baseband unit can be configured to cause the first group of antennas to transmit additional first reference signals to the third group of antennas during the first time slot, cause the second group of antennas to transmit additional second reference signals to the third group of antennas during the second time slot, and generate the channel estimates based on the additional first reference signals and additional second references received by the third group of antennas.

Each of the calibration coefficients can represents a phase and a gain. The baseband unit can be configured to apply each of the calibration coefficients to a respective signal path associated with an antenna of the antennas of the first and second groups to thereby compensate for respective differences between respective transmit coefficients and receive coefficients. The designated physical resources can be orthogonal physical resources.

Another aspect of this disclosure is a method of calibration in a time-division duplex (TDD) multiple-input multiple-output (MIMO) system. The method comprises transmitting, by a first group of antennas, first reference signals over designated physical resources during a first time slot; receiving, by a second group of antennas, the first reference signals from the first group of antennas during the first time slot, wherein the first time slot is synchronized between the first group of antennas and the second group of antennas; transmitting, by the second group of antennas, second reference signals over the designated physical resources during a second time slot; receiving, by the first group of antennas, the second reference signals from the second group of antennas during the second time slot, wherein the second time slot is synchronized between the first group of antennas and the second group of antennas; generating channel estimates associated with antennas of the first and second groups of antennas based on the first reference signals received by the second group of antennas and the second reference signals received by the first group of antennas; and jointly process the channel estimates to generate calibration coefficients associated with respective antennas of the first and second groups of antennas, wherein each of the calibration coefficients represents a ratio for compensating for a difference between a transmit coefficient and a receive coefficient.

The method can further comprise selecting an algorithm of a plurality of algorithms to generate the calibration coefficients. The plurality of algorithms can comprise at least two of: a single link calibration that comprises determining calibration coefficients associated with antennas of the second group based on a single link from each of the antennas of the second group to a reference antenna of the first group; an iterative calibration that comprises applying an iterative algorithm on a factor graph of multiple paths between antennas of the first and second groups; or a least squares regression of determining the calibration coefficients for the antennas of the first and second groups.

The first time slot and the second time slot can be within a TDD guard period.

Another aspect of this disclosure is non-transitory computer-readable storage comprising memory storing computer-executable instructions. The computer-executable instructions, when executed by a baseband unit of a time-division duplex (TDD) multiple-input multiple-output (MIMO) system, cause the TDD MIMO system to perform operations comprising: transmitting, by a first group of antennas, first reference signals over designated physical resources to a second group of antennas during a first time slot, wherein the first time slot is synchronized between the first group of antennas and the second group of antennas; transmitting, by the second group of antennas, second reference signals over the designated physical resources to the first group of antennas during a second time slot, wherein the second time slot is synchronized between the first group of antennas and the second group of antennas; generating channel estimates associated with antennas of the first and second groups of antennas based on the first reference signals received by the second group of antennas and the second reference signals received by the first group of antennas; and jointly process the channel estimates to generate calibration coefficients associated with respective antennas of the first and second groups of antennas, wherein each of the calibration coefficients represents a ratio for compensating for a difference between a transmit coefficient and a receive coefficient.

Another aspect of this disclosure is a time-division duplex (TDD) multiple-input multiple-output (MIMO) system comprising a plurality of nodes and a processing unit in communication with the plurality of nodes. The plurality of nodes comprises a first group of antennas and a second group of antennas. Each node of the plurality of nodes is configured to wirelessly transmit and wirelessly receive signals. The processing unit configured to cause the first group of antennas to transmit first reference signals to the second group of antennas over designated physical resources during a first time slot. The processing unit is configured to cause the second group of antennas to transmit second reference signals to the first group of antennas over the designated physical resources during a second time slot. The processing unit is configured to generate channel estimates based on the first reference signals received by the second group of antennas and the second reference signals received by the first group of antennas. The processing unit is configured to jointly process the channel estimates to generate, for at least each antenna of the first and second groups of antennas, a calibration coefficient representing a ratio for compensating for a difference between a transmit coefficient and a receive coefficient.

The plurality of nodes can comprise remote radio units. Information associated with reference signals received by the remote radio units can be exchanged using wired backhaul. The plurality of nodes can further comprise a user equipment arranged to operate as a virtual network node. Information associated with one or more reference signals received by the user equipment can be exchanged using a wireless peer-to-peer interface. Alternatively or additionally, information associated with one or more reference signals received by the user equipment can be exchanged using a wireless backhaul between a network system and the user equipment.

The plurality of nodes can comprise a user equipment arranged to operate as a virtual network node. The plurality of nodes can comprise a first user equipment and a second user equipment, in which the first user equipment and the second user equipment are configured to communicate with each other via a peer-to-peer link. Information associated with one or more reference signals received by the second user equipment can be exchanged with the first user equipment using the wireless peer-to-peer interface.

The designated physical resources can be orthogonal physical resources.

Another aspect of this disclosure is a method of calibration in a time-division duplex (TDD) multiple-input multiple-output (MIMO) system. The method comprises: causing transmission, from a first group of antennas, of first reference signals to a second group of antennas over designated physical resources during a first time slot; causing transmission, from the second group of antennas, of second reference signals to the first group of antennas over the designated physical resources during a second time slot; generating channel estimates associated with the first and second groups of antennas based on the first reference signals received by the second group of antennas and the second reference signals received by the first group of antennas; and jointly processing the channel estimates to generate, for each antenna of the first and second groups, a calibration coefficient representing a ratio for compensating for channel gain mismatch between a transmit coefficient and a receive coefficient.

Remote radio units can comprise an antenna of the first group and an antenna of the second group. In some of these instances, a user equipment arranged to operate as a virtual network node can comprise another antenna of the first group. In certain applications, a remote radio unit can comprise an antenna of the first group and a user equipment can comprise an antenna of the second group.

A user equipment arranged to operate as a virtual network node can comprise an antenna of the first group.

A first user equipment can comprise an antenna of the first group, a second user equipment can comprise an antenna of the second group, and the method can comprise transmitting information associated with the first reference signals received by the second antennas of the second user equipment to the first user equipment via a peer-to-peer link between the first user equipment and the second user equipment.

The designated physical resources can be orthogonal physical resources.

The first group of antennas can comprise a reference antenna, and the jointly processing can comprise a single link calibration that comprises determining the calibration coefficients based on a single link from the antennas of the second group to the reference antenna.

The jointly processing can comprise generating the calibration coefficients with an iterative calibration that comprises applying an iterative algorithm on a factor graph of multiple paths between antennas of the first and second groups.

The jointly processing can comprise generating the calibration coefficients with a least squares regression of determining the calibration coefficients for the antennas of the first and second groups.

The method can comprise selecting an algorithm of a plurality of algorithms for the jointly processing, in which the plurality of algorithms have different computational complexity and different accuracy.

The method can further comprise causing transmission, from the first group of antennas, of additional first reference signals to a third group of antennas during the first time slot; and causing transmission, from the second group of antennas, of additional second reference signals to the third group of antennas during the second time slot; and wherein the generating the channel estimates is based on the additional first reference signals and the additional second reference signal received by the third group of antennas.

The method can comprise causing a third group of antennas to transmit third reference signals to the first and second groups of antennas during a third time slot; wherein the generating the channel estimates is based on the third reference signals received by the first and second groups of antennas.

The method can further comprise applying each of the calibration coefficients to a respective signal path associated with the antennas of the first and second groups to compensate for channel gain mismatches between respective transmit and receive coefficients.

The jointly processing can comprise determining the calibration coefficients relative to a calibration coefficient associated with a reference antenna of the first group of antennas. The reference antenna can be included in a higher level subset of antennas, and the higher level subset of antennas can include a first higher level subset group of antennas and a second higher level subset group of antennas. The method can further comprise causing the first higher level subset group of antennas to transmit first higher level subset reference signals to the second higher level subset group of antennas during a first higher level subset time slot; causing the second level subset group of antennas to transmit second higher level subset reference signals to the first higher level subset group of antennas during a second higher level subset time slot; generating higher level subset channel estimates based on the first higher level subset reference signals received by the second higher level subset group of antennas and the second higher level subset reference signals received by the first higher level subset group of antennas; and jointly processing the higher level subset channel estimates to generate, for at least each antenna of the first and second higher level subset groups, a higher level subset calibration coefficient representing a ratio associated with a transmit coefficient and a receive coefficient. The jointly processing the higher level subset channel estimates can be performed before jointly processing the channel estimates in some instances.

Another aspect of this disclosure is non-transitory computer-readable storage comprising memory storing computer-executable instructions. The computer-executable instructions, when executed by a processing unit of a time-division duplex (TDD) multiple-input multiple-output (MIMO) system, cause the TDD MIMO system to perform operations comprising: causing transmission, from a first group of antennas, of first reference signals to a second group of antennas over designated physical resources during a first time slot; causing transmission, from the second group of antennas, of second reference signals to the first group of antennas over the designated physical resources during a second time slot; generating channel estimates associated with the first and second groups of antennas based on the first reference signals received by the second group of antennas and the second reference signals received by the first group of antennas; and jointly processing the channel estimates to generate, for each antenna of the first and second groups, a calibration coefficient representing a ratio for compensating for channel gain mismatch between a transmit coefficient and a receive coefficient.

Another aspect of this disclosure is a user equipment (UE) comprising first antennas, a peer-to-peer interface, and a baseband processor in communication with the first antennas and the peer-to-peer interface. The baseband processor is configured to: cause the first antennas to transmit first reference signals to second antennas of a second UE over designated physical resources during a first time slot, wherein the first time slot is synchronized between the UE and the second UE; receive second reference signals, via the first antennas, from the second antennas of the second UE during a second time slot, wherein the second time slot is synchronized between the UE and the second UE; receive, via the peer-to-peer interface, information associated with the first reference signals received by the second antennas of the second UE; and jointly process channel estimates associated with the first antennas of the UE and the second antennas of second UE to generate calibration coefficients associated with the first antennas of the UE and the second antennas of the second UE, wherein the calibration coefficients each represent a ratio to compensate for a difference between a transmit coefficient and a receive coefficient.

The baseband processor can be configured to cause the calibration coefficients associated with the second antennas of the second UE to be transmitted to the second UE via the peer-to-peer interface.

The information associated with the first reference signals can comprise channel estimates associated with the second antennas.

The UE can be arranged to receive downlink data in a coordinated manner with the second UE using the calibration coefficients. The baseband processor can be configured to aggregate a first part of a MIMO downlink data transmission received via the first antennas together with a second part of the MIMO downlink data transmission received via the peer-to-peer interface. The first antennas can be configured to receive MIMO downlink data at up to a downlink peak data rate, and the baseband processor can be configured to receive a first part of a MIMO downlink data transmission from the first antennas and a second part of the MIMO downlink data transmission from the peer-to-peer wireless interface such that the baseband processor is configured to process the MIMO downlink data transmission at a data rate that is higher than the downlink peak data rate.

The designated physical resources can be orthogonal physical resources.

The baseband processor can be configured to generate the calibration coefficients with a single link calibration that comprises determining the calibration coefficients based on a single link from antennas of either the first and second antennas to a reference antenna.

The baseband processor can be configured to generate the calibration coefficients with an iterative calibration that comprises applying an iterative algorithm on a factor graph of multiple paths between the first antennas and the second antennas.

The baseband processor can be configured to generate the calibration coefficients with a least squares regression of determining the calibration coefficients for the antennas of the first antennas and the second antennas.

The baseband processor can be configured to select an algorithm of a plurality of algorithms to generate the calibration coefficients, wherein the plurality of algorithms comprises at least two algorithms having different computational complexity and different accuracy.

The UE can comprise a transceiver that comprises signal paths, in which the baseband processor is configured to apply the calibration coefficients associated with the first antennas to a respective signal path of the signal paths of the transceiver associated with the first antennas.

Another aspect of this disclosure is a method of user equipment (UE) antenna calibration comprising: transmitting, by first antennas of a first of UE, first reference signals to second antennas of a second UE over designated physical resources during a first time slot, wherein the first time slot is synchronized between the first UE and the second UE; receiving, by the first antennas of the first UE, second reference signals transmitted by the second antennas of the second UEs over the designated physical resources during a second time slot, wherein the second time slot is synchronized between the first UE and the second UE; receiving, by the first UE, information associated with the first reference signals received by the second UE over a peer-to-peer link between the second UE and the first UE; and jointly processing, by the first UE, channel estimates associated with the first antennas of the first UE and the second UE to generate calibration coefficients associated with the first antennas of the first UE and the second antennas of the second UE, wherein the calibration coefficients each represent a ratio to compensate for a difference between a transmit coefficient and a receive coefficient.

The method can further comprise transmitting, by the first UE, the calibration coefficients associated the second antennas to the second UE. This transmitting can be via the peer-to-peer link.

The information associated with the first reference signals can comprise channel estimates associated with the second antennas. The designated physical resources can be orthogonal physical resources.

The plurality of UEs can be arranged to receive downlink data in a coordinated manner using the calibration coefficients generated by the jointly processing.

The method can further comprise receiving, by the first UE, second calibration coefficients generated by the second UE from the second UE; and comparing the calibration coefficients generated by the first UE with the second calibration coefficients generated by the second UE.

Another aspect of this disclosure is non-transitory computer-readable storage comprising memory storing computer-executable instructions. The computer-executable instructions, when executed by a baseband processor of a user equipment (UE), cause the UE to perform operations comprising: transmitting, by first antennas of a first of UE, first reference signals to second antennas of a second UE over designated physical resources during a first time slot, wherein the first time slot is synchronized between the first UE and the second UE; receiving, by the first antennas of the first UE, second reference signals transmitted by the second antennas of the second UEs over the designated physical resources during a second time slot, wherein the second time slot is synchronized between the first UE and the second UE; receiving, by the first UE, information associated with the first reference signals received by the second UE over a peer-to-peer link between the second UE and the first UE; and jointly processing, by the first UE, channel estimates associated with the first antennas of the first UE and the second UE to generate calibration coefficients associated with the first antennas of the first UE and the second antennas of the second UE, wherein the calibration coefficients each represent a ratio to compensate for a difference between a transmit coefficient and a receive coefficient.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
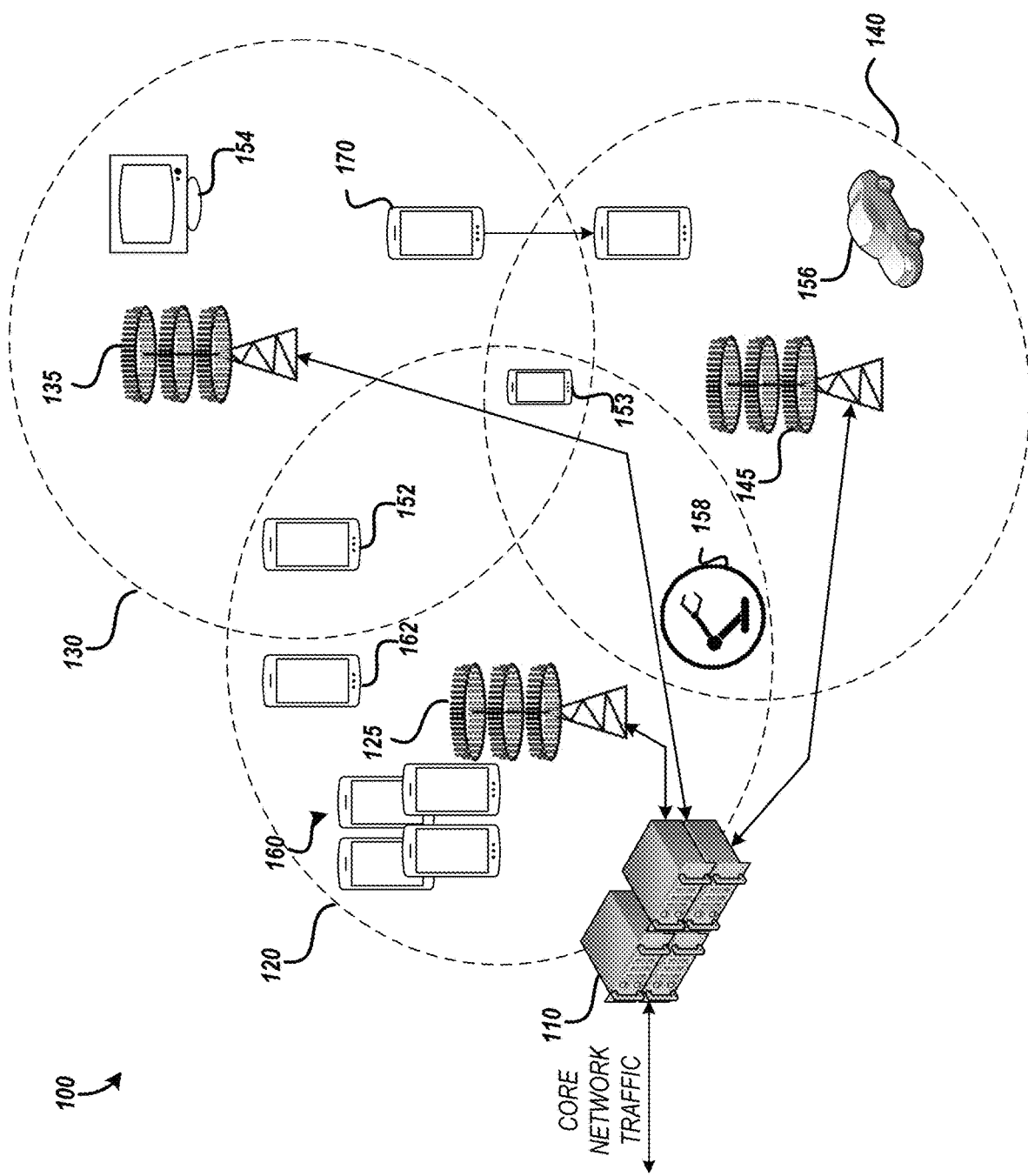
FIG. 1 is a diagram illustrating an example multiple-input multiple-output (MIMO) network environment in which calibration can be performed according to an embodiment.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

Multiple-input multiple-output (MIMO) systems with distributed antennas can achieve high throughputs with beamforming and/or other advanced precoding schemes. MIMO systems can include a base station and a plurality of distributed remote radio units. The precoding typically involves knowledge of channel state information (CSI). For time-division duplex (TDD) wireless communication systems, the estimate of downlink CSI can be based on the estimated uplink channel for faster estimation. An alternative is for a base station to wait for feedback of downlink channel estimates from user equipments, which is typically slower. The faster channel estimation can enable more accurate downlink beamforming before channel aging. Another advantage can be reduced uplink overhead due to explicit feedback of the downlink channel estimates.

Even though a transmit channel and a receive channel can share the same over-the-air channel, there can be different phase ramping and/or amplitude distortion for the transmit channel and the receive channel. To leverage the channel reciprocity property in estimating the downlink channel, calibration can be performed to overcome asymmetry between the transmit (Tx) and receive (Rx) signal chains. The asymmetry may result from a difference in radio frequency (RF) hardware, different path delays, residual frequency and/or time offsets across the antennas, different gain settings, the like, or any suitable combination thereof. With calibration disclosed herein, downlink channels can be estimates based on uplink channel estimates in a manner that accounts for asymmetry between the uplink and downlink channels.

Robust schemes to perform reciprocity calibration for communications systems (e.g., Orthogonal Frequency Division Multiplexing (OFDM) systems) with distributed antennas are disclosed herein. In certain embodiments, transmit antennas are divided into multiple groups. In a specified time slot, all antennas in one group can transmit reference signals concurrently through designated physical channel resources (e.g., orthogonal physical channel resources), while antennas in all other groups receive the reference signals. Channel estimation can then be performed based on the received signals from the transmit group to all receive antennas. This process can be repeated until all groups have participated as a transmit group. The reference signal for calibration can leverage the Sounding Reference Signal (SRS) in Long Term Evolution (LTE) and/or New Radio (NR) systems in certain instances. According to some other instances, the reference signals can include frequency division multiplexing (FDM) signals. With FDM reference signals, channel estimation can be simplified. The transmit reference signals can be constructed so that each transmit antenna within a transmit group can be uniquely identified at the receive antennas in order to estimate the channel from each transmit antenna to a given receive antenna. After all groups of antennas finish transmitting reference signals in respective time slots, a joint calibration process in a baseband processing unit can be executed based on the channel estimation results.

Several calibration algorithms are disclosed to jointly process channel estimates to generate calibration coefficients. The calibration coefficients can each represent a ratio associated with a transmit coefficient and a receive coefficient. The calibration coefficients can include phase shift information and amplitude adjustment information. The calibration algorithms have different tradeoffs between performance and complexity. A calibration algorithm can be selected based on tradeoffs between performance and/or complexity. Accordingly, the calibration schemes can balance tradeoffs between complexity and performance. Calibration processing disclosed herein can leverage hardware-related properties of the calibration coefficients to achieve a better performance.

The disclosed calibration schemes can be applied to LTE and/or NR systems. The disclosed calibration schemes can also be applied to any other suitable systems, such as WiFi systems. Applying the principles and advantages of calibration disclosed herein to LTE and/or NR systems can be performed with a relatively limited scope of changes.

MIMO Environment

FIG. 1 is a diagram illustrating an example multiple-input multiple-output (MIMO) network environment 100 in which calibration can be performed according to an embodiment. Various UEs can wirelessly communicate with a network system in the MIMO network environment 100. Such wireless communications can achieve high throughputs. Antennas of MIMO network environment 100 for wirelessly communicating with UEs can be distributed. FIG. 1 illustrates an example of distributed antennas configured to wirelessly communicate with UEs. Calibration can be performed in the MIMO network environment 100 to overcome asymmetry between transmit and receive signal chains.

Various standards and/or protocols may be implemented in the MIMO network environment 100 to wirelessly communicate data between a base station and a wireless communication device. Some wireless devices may communicate using an orthogonal frequency-division multiplexing (OFDM) digital modulation scheme via a physical layer. Example standards and protocols for wireless communication in the environment 100 can include the third generation partnership project (3GPP) Long Term Evolution (LTE), Long Term Evolution Advanced (LTE Advanced), 3GPP New Radio (NR) also known as 5G, Global System for Mobile Communications (GSM), Enhanced Data Rates for GSM Evolution (EDGE), Worldwide Interoperability for Microwave Access (WiMAX), and the IEEE 802.11 standard, which may be known as Wi-Fi. In some systems, a radio access network (RAN) may include one or more base stations associated with one or more evolved Node Bs (also commonly denoted as enhanced Node Bs, eNodeBs, or eNBs), gNBs, or any other suitable Node Bs (xNBs). In some other embodiments, radio network controllers (RNCs) may be provided as the base stations. A base station provides a bridge between the wireless network and a core network such as the Internet. The base station may be included to facilitate exchange of data for the wireless communication devices of the wireless network.

A wireless communication device may be referred to as a user equipment (UE). The UE may be a device used by a user such as a smartphone, a laptop, a tablet computer, cellular telephone, a wearable computing device such as smart glasses or a smart watch or an ear piece, one or more networked appliances (e.g., consumer networked appliances or industrial plant equipment), an industrial robot with connectivity, or a vehicle. In some implementations, the UE may include a sensor or other networked device configured to collect data and wirelessly provide the data to a device (e.g., server) connected to a core network such as the Internet. Such devices may be referred to as Internet of Things (IoT) devices. A downlink (DL) transmission generally refers to a communication from the base transceiver station (BTS) or eNodeB to a UE. An uplink (UL) transmission generally refers to a communication from the UE to the BTS.

FIG. 1 illustrates a cooperative, or cloud radio access network (C-RAN) environment 100. In the environment 100, the eNodeB functionality is subdivided between a base band unit (BBU) 110 and multiple remote radio units (RRUs) (e.g., RRU 125, RRU 135, and RRU 145). The network system of FIG. 1 includes the BBU 110 and the RRUs 125, 135, and 145. An RRU may include multiple antennas, and one or more of the antennas may serve as a transmit-receive point (TRP). The RRU and/or a TRP may be referred to as a serving node. The BBU 110 may be physically connected to the RRUs such as via an optical fiber connection. The BBU 110 may provide operational information to an RRU to control transmission and reception of signals from the RRU along with control data and payload data to transmit. The RRU may provide data received from UEs within a service area associated with the RRU to the network. As shown in FIG. 1, the RRU 125 provides service to devices within a service area 120. The RRU 135 provides service to devices within a service area 130. The RRU 145 provides service to devices within a service area 140. For example, wireless downlink transmission service may be provided to the service area 140 to communicate data to one or more devices within the service area 140.

In the environment 100, a network system can wirelessly communicate with UEs via distributed MIMO. For example, the UE 153 can wirelessly communicate MIMO data with antennas of the network system that include at least one antenna of the RRU 125, at least one antenna of the RRU 135, and at least one antenna of the RRU 145. As another example, the UE 152 can wirelessly communicate MIMO data with distributed antennas that include at least one antenna of the RRU 125 and at least one antenna of the RRU 135. As one more example, the UE 158 can wirelessly communicate MIMO data with distributed antennas that include at least one antenna of the RRU 125 and at least one antenna of the RRU 145. Any suitable principles and advantages of the calibration disclosed herein can be implemented in such distributed MIMO applications, for example.

The illustrated RRUs 125, 135, and 145 include multiple antennas and can provide MIMO communications. For example, an RRU may be equipped with various numbers of transmit antennas (e.g., 2, 4, 8, or more) that can be used simultaneously for transmission to one or more receivers, such as a UE. Calibration associated with the antennas of the RRUs 125, 135, and 145 can be performed in accordance with any suitable principles and advantages disclosed herein. Receiving devices may include more than one receive antenna (e.g., 2, 4, etc.). An array of receive antennas may be configured to simultaneously receive transmissions from the RRU. Each antenna included in an RRU may be individually configured to transmit and/or receive according to a specific time, frequency, power, and direction configuration. Similarly, each antenna included in a UE may be individually configured to transmit and/or receive according to a specific time, frequency, power, and direction configuration. The configuration may be provided by the BBU 110. The direction configuration may be generated based on a network estimate using channel reciprocity and/or determined based on feedback from UE via selection of a beamforming codebook index, or a hybrid of the two.

The service areas shown in FIG. 1 may provide communication services to a heterogeneous population of user equipment. For example, the service area 120 may include a cluster of UEs 160 such as a group of devices associated with users attending a large event. The service area 120 can also include an additional UE 162 that is located away from the cluster of UEs 160. A mobile user equipment 170 may move from the service area 130 to the service area 140. Another example of a mobile user equipment is a vehicle 156 which may include a transceiver for wireless communications for real-time navigation, on-board data services (e.g., streaming video or audio), or other data applications. The environment 100 may include semi-mobile or stationary UEs, such as robotic device 158 (e.g., robotic arm, an autonomous drive unit, or other industrial or commercial robot) or a television 154, configured for wireless communications.

A user equipment 152 may be located with an area with overlapping service (e.g., the service area 120 and the service area 130). Each device in the environment 100 may have different performance needs which may, in some instances, conflict with the needs of other devices.

Calibration in the network environment 100, such as an antennas of RRUs, can improve signal quality and/or performance of wireless communication between a network system and UEs.

Calibration Schemes

An example TDD MIMO system includes N distributed antennas and M UEs, in which N and M are positive integers. Calibration will be discussed for this example TDD MIMO system. In downlink transmission, if the downlink channel state information (CSI) is available for channels between each Tx antenna and each serving UE, beamforming and/or other advanced precoding schemes can be applied to increase the receive power at a target UE and suppress the interference from one or more base stations (e.g., one or more eNBs and/or one or more gNBs) serving one or more other UEs. This can improve the signal-to-noise ratio (SNR) and high system throughputs can be achieved.

Figure 2:
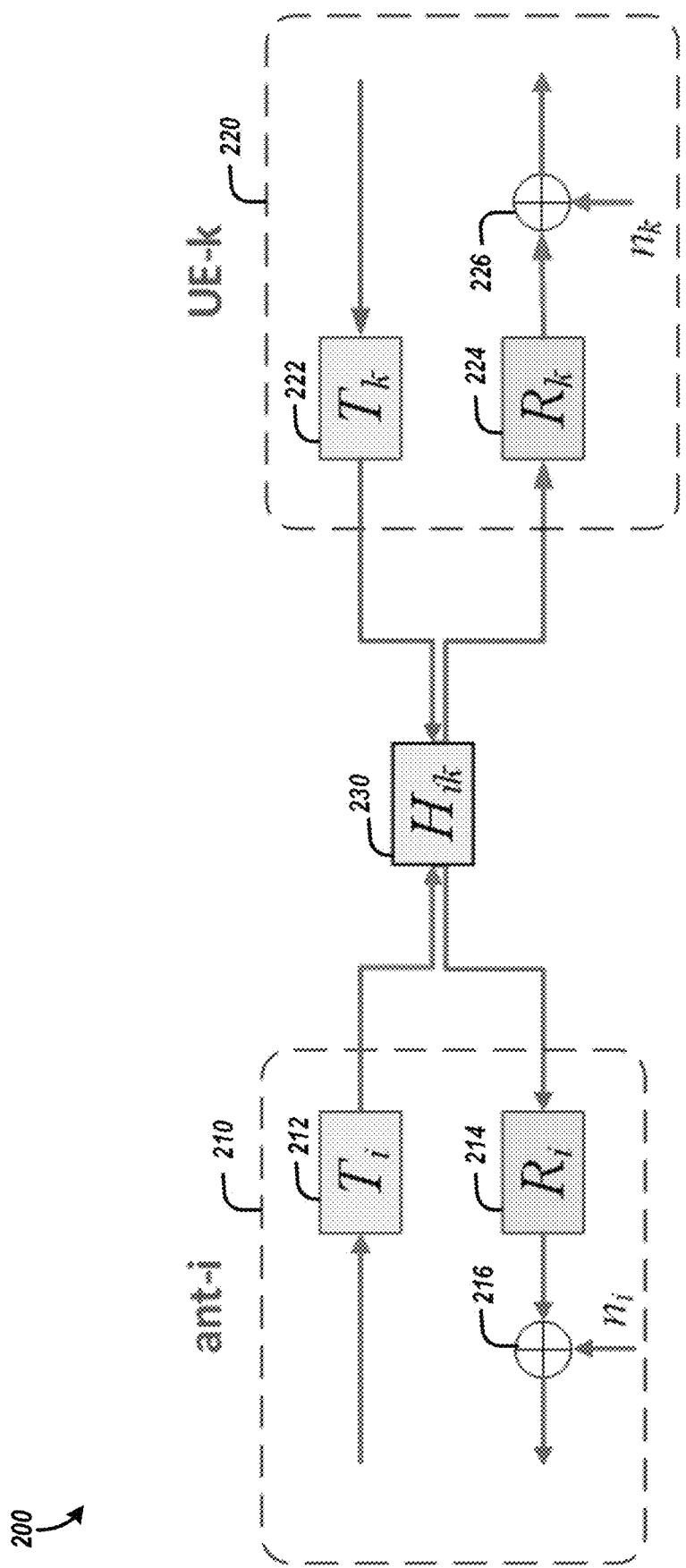
FIG. 2 is a diagram illustrating a channel between a network node and a user equipment (UE).

FIG. 2 is a diagram illustrating a channel between a network node and a user equipment (UE). The communication environment 200 of FIG. 2 includes a network node 210, a UE 220, and an over-the-air channel 230 between the network node 210 and the UE 220. The illustrated network node 210 includes a transmit circuit 212, a receive circuit 214, and an additive white Gaussian noise model 216 associated with wireless communication using a particular antenna. The illustrated UE 220 includes a transmit circuit 222, a receive circuit 224, and an additive white Gaussian noise model 226. In FIG. 2, a single link between the network node 210 that includes antenna-i of the network and UE-k 220 is shown. The antenna-i is one of the N distributed antennas of the example TDD MIMO system and the UE-k 220 is one of the M UEs communicating with the network system of the example TDD MIMO system.

In the communication environment 200, a downlink transmit signal propagates through the over-the-air channel 230, along with hardware of the network node 210 and the UE 220. In particular, the downlink transmit signal propagates through the transmit circuit 212 of a transmitter of the network node 210 and the receive circuit 224 of a receiver of the UE 220. The hardware of the network node 210 and the UE 220 can introduce additional phase and/or magnitude distortion into the downlink transmit signal. The additive Gaussian white noise model 226 is shown to model the effects of random processes that impact noise for the communication channel.

In the communication environment 200, an uplink transmit signal propagates through the over-the-air channel 230, along with hardware of the network node 210 and the UE 220. In particular, the uplink transmit signal propagates through the transmit circuit 222 of a transmitter of the UE 220 and the receive circuit 214 of a receiver of the network node 210. The hardware of the network node 210 and the UE 220 can introduce additional phase and/or magnitude distortion into the uplink transmit signal. The additive Gaussian white noise model 216 is shown to model the effects of random processes that impact noise for the communication channel For the i-th antenna of the example TDD MIMO system, $T_i$ and $R_i$ represent the transmit coefficient of a transmit signal chain and a receive coefficient of a receive signal chain, respectively. Similarly, for the k-th UE of the example TDD MIMO system, $T_k$ and $R_k$ represent the transmit coefficient of a transmit signal chain and a receive coefficient of a receive signal chain, respectively. The transmit coefficients and the receive coefficients are complex numbers with each representing a phase and a gain. The transmit and/or receive coefficients may be time-variant, for example, due to temperature change and/or slow drift in frequency. The transmit and/or receive coefficients may also be different across subcarriers in OFDM systems. Accordingly, a calibration can be run at a certain periodicity to remove the effect of variation of transmit and receive coefficients across different subcarriers. The over-the-air channel 230 has a coefficient $H_{ik}$ that can represent a phase and a gain of the over-the-air channel 230.

For antenna-i, the downlink pre-coding typically involves an estimate on $\hat{H}_{i \to k} = T_i \cdot H_{ik} \cdot R_k$, the effective downlink channel (CSI), which is the cascade of the transmit response, the actual over-the-air downlink channel and the receive response. If UE-k sends a reference signal to antenna-i, an uplink channel estimate at the base station can provide an estimate of $\hat{H}_{k \to i} = T_k \cdot H_{ik} \cdot R_i$, the effective uplink channel By ignoring the noise, the desired downlink CSI and the estimated uplink CSI can be related by Equation 1.

$$\hat{H}_{i \to k} = \frac{T_i}{R_i} \cdot \frac{R_k}{T_k} \cdot \hat{H}_{k \to i} \qquad (Eq. 1)$$
$$= \frac{c_i}{c_k} \cdot \hat{H}_{k \to i}$$

In Equation 1, the uplink channel estimate $\hat{H}_{k \to i}$ can be known. Thus, calibration can involve determining $$\frac{c_i}{c_k}.$$

In Equation 1, $$c_i = \frac{T_i}{R_i} \text{ and } c_k = \frac{T_k}{R_k}.$$

The calibration coefficient $b_{i|k}$ associated with antenna-i is represented by Equation 2. The ratio $$\frac{c_i}{c_k}$$

in Equation 2 represents a calibration coefficient that scales the uplink channel estimate $\hat{H}_{k \to i}$ to a downlink channel estimate $\hat{H}_{i \to k}$. The calibration coefficient can account for different phase ramping and/or amplitude distortion for the uplink channel and the downlink channel.

$$b_{i|k} = \frac{c_i}{c_k} \qquad (Eq. 2)$$

Because the ratio of $$\frac{c_i}{c_k}$$

is relatively stable compared to the channel between the antenna-i and the UE-k, the ratio $$\frac{c_i}{c_k}$$

can be estimated less frequently than the channel is determined. As one non-limiting example, a UE-k can send an uplink pilot to antenna-i from which an uplink channel estimate can be determined about every 5 milliseconds and the ratio $$\frac{c_i}{c_k}$$

can be estimated about every second. An SRS can be used to generate the uplink channel estimate, for example.

A calibration coefficient can be used to adjust the phase and/or amplitude of a downlink channel estimate, which is based on an uplink channel estimate. The calibration coefficient can be used in downlink beamforming and/or pre-coding. The calibration coefficient can be frequency dependent. Accordingly, calibration coefficients can be calculated at each of a plurality of discrete frequencies over a bandwidth of interest. For an OFDM system, the calibration coefficients can be estimated and applied at the resolution of the tone spacing. However, practically it can be decimated to a coarser resolution. In such cases, the calibration coefficients can be estimated and applied at a coarser resolution than the tone spacing. In a channel estimation module (not illustrated), a downlink channel can be estimated based on an uplink channel and a calibration coefficient. The downlink channel estimate can be used in pre-coding and/or beamforming. Based on the calibration coefficient, a phase and/or amplitude of a transmit signal transmitted by the network node 210 can be adjusted. The calibration coefficients generated by a calibration routine can be applied to a plurality of network nodes to thereby implement reciprocity calibration. Alternatively or additionally, the phase and/or amplitude can be adjusted in a receive signal chain based on a calibration coefficient.

Given $b_{i|k}$ for all the antennas, the downlink CSI can be derived from uplink channel estimates. A purpose of the calibration process is to estimate the calibration coefficients based on all the channel estimations.

Direct estimate on $b_{i|k}$ can involve heavy feedback information, because downlink channel estimation $\hat{H}_{i \to k}$ should be estimated in UE-k 220 and fed back to a base station for direct estimation. The overhead of the closed-loop calibration can soon become too high with an increasing number of UEs and network antennas. To simplify the calibration, notice that $c_k$ is a constant with respect to any antenna-i, and $c_k$ has no impact on beamforming as it is a common term. In fact, $c_k$ can be replaced by any other constant independent of i. The calibration can be directed to estimating $$c_i = \frac{T_i}{R_i}$$

for each antenna-i, because $c_i$ contains the phase and amplitude information to compensate for in deriving downlink CSI given uplink channel estimates. Additionally given the calibration of antenna-i is independent of the UE calibration coefficient $c_k$, it is not necessary that the UEs participate in the calibration process. Moreover, it is possible to calibrate between any pair(s) of antenna including but not limited to network nodes, UE nodes, dedicated calibration nodes, or any suitable combination thereof. An advantage of using network nodes is that CSI channels $\hat{H}_{i \to k}$ and $\hat{H}_{k \to i}$ are directly available for processing given that both are observed on the network side.

Based on the above observation, an open-loop master-slave approach can be performed. In that approach, a common reference (master) antenna, antenna-R, is introduced to all transmit antennas (slaves). The calibration coefficient can be redefined as shown in Equation 3.

$$b_{i|R} = \frac{c_i}{c_R} \quad \text{(Eq. 3)}$$

In Equation 3, $$c_R = \frac{T_R}{R_R}.$$

The term $b_{i|R}$ can be derived based on a pair of channel estimates between antenna-i and antenna-R as shown in Equation 4.

$$b_{i|R} = \hat{H}_{i \to R} / \hat{H}_{R \to i} \quad \text{(Eq. 4)}$$

Using the reference antenna, the calibration can become UE-independent. There is a chain rule in deriving calibration coefficients that allows indirect calibration without direct reciprocity transmissions between antenna-i and the reference. Suppose antenna-i is to be calibrated to antenna-R through antennas-$k_0, k_1, \ldots, k_{K-1}$, in sequence, then we have the relationship shown in Equation 5.

$$b_{i|R} = b_{i|K_0} \cdot b_{k_0|k_1} \cdot b_{k_1|k_2} \cdots \cdot b_{k_{K-1}|R} \quad \text{(Eq. 5)}$$

Figure 3:
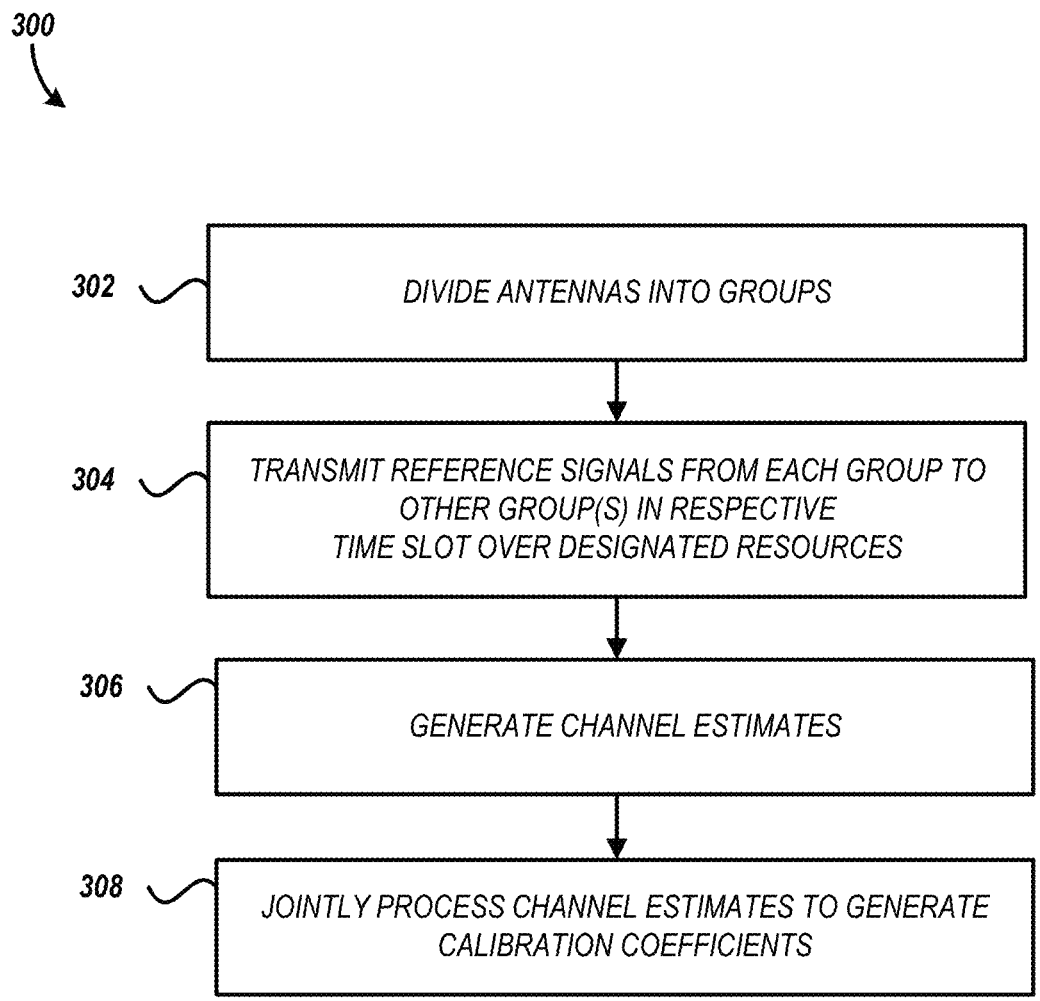
FIG. 3 is a flow diagram illustrating an example method of generating calibration coefficients according to an embodiment.

For robust calibration in the wireless environment, calibration schemes are disclosed herein. FIG. 3 is a flow diagram illustrating an example method 300 of generating calibration coefficients according to an embodiment. Any portion or all of any of the methods disclosed herein can be performed in association with specific instructions stored on a non-transitory computer-readable storage medium executed by one or more processors.

Distributed antennas of a network system in the example TDD MIMO system are divided into groups at block 302. The groups can be denoted as Group-0, Group-1, . . . , Group-(G−1). The antennas can be divided into groups based on spatial location and/or one or more channel properties. Examples of antenna groups are described with references to FIGS. 4A, 4B, and 4C. In some instances, antennas can be divided into 2 groups. Antennas can be divided into three or more groups in certain applications.

Each group of antennas can transmit reference signals to the antennas of other groups at block 304. The reference signals can be pilot signals. Antennas of a group can transmit reference signals concurrently in a specific time slot over designated physical resources. The designated physical resources can be orthogonal physical resources. There are G time slots for the transmission of reference signals from the G groups of antennas. Each time slot can be synchronized between the groups of antennas. This can involve synchronizing signal paths associated with the antennas to a common timing reference. Accordingly, the antennas can receive the reference signals in the desired time slots.

In time slot-0, all antennas in Group-0 transmit reference signals through designated physical resources. Antennas in Group-1, Group-2, . . . , (G−1) receive the reference signals from antennas of Group-0 in time slot-0. In time slot-1, all antennas in Group-1 transmit reference signals and antennas in other groups receive the reference signals from Group-1. The process continues until all G groups finish transmitting reference signals to antennas in other groups.

The reference signals for calibration can cover sub-carriers of interest in OFDM systems. The reference signals can leverage the same and/or a similar design as the sounding reference signal (SRS) in LTE or NR systems, such that the channel estimation for the calibration can reuse the channel estimation module for SRS. To use the reference signal designed for SRS, antennas in a specific group can be assigned with different cyclic shifts and/or different combs (frequency shifts). The reference signal can alternatively or additionally use frequency division multiplexing signals such that one sub-carrier of every D consecutive sub-carriers is assigned to an antenna for calibration. The reference signals can be orthogonal in time and/or frequency.

Reference signals can be transmitted in guard periods of a TDD MIMO system. Reference signals can alternatively or additionally be transmitted in dedicated downlink or uplink subframes where there is no downlink or uplink traffic, respectively, assigned.

At block 306 of the method 300, channel estimates are generated based on the reference signals received during the time slots. The channel estimates can include CSI. After the last group of antennas finish the transmission of reference signals, channel estimation results can be obtained on each antenna. For OFDM systems, the channel estimates should be available for each sub-carrier and/or each block of sub-carriers. Channel estimates can be updated to account for changes in one or more channel conditions. The channel estimates can be updated a longer time interval than time coherence of a channel. In some instances, channel estimates can be updated on the order of several hundred milliseconds.

Joint processing for calibration can be performed in a baseband processing unit of a network system based on the channel estimates at block 308. Calibration coefficients are generated by jointly processing the channel estimates. Each of the calibration coefficients can represent a ratio associated with a transmit coefficient for a transmit signal chain and a receive coefficient for a receive signal chain of a respective antenna. For example, the calibration coefficient can be $$c_i = \frac{T_i}{R_i}$$

discussed above for each antenna-i. As another example, the calibration coefficient can be $$\frac{R_i}{T_i}$$

for each antenna-i. The calibration coefficients can each include phase information and amplitude information. The phase information and amplitude information can be used to derive downlink CSI given uplink channel estimates. The calibration coefficient may include a common term associated with the reference antenna, which without loss of generality could be assumed to be 1.

Calibration algorithms are disclosed for joint baseband processing of channel estimates. There are different tradeoffs between performance and complexity for the calibration algorithms. Example calibration algorithms include a single-link algorithm, an iterative algorithm, and a least-square algorithm.

In a single-link algorithm, there can be a single link between each antenna and the reference antenna. All antennas are connected to the reference antenna either directly or via one or more other antennas. For a given antenna, a calibration coefficient can be determined by applying the chain rule for the calibration coefficient.

For an iterative algorithm, an antenna system can be represented by a factor graph that includes observations, variable nodes and constraint nodes. The observations are channel estimations obtained for each antenna, the variable nodes are calibration coefficients $b_i$ for each antenna, and the constraint nodes are relationship for each pair of $b_i$. A belief propagation algorithm can be applied to derive the calibration coefficients based on the factor graph.

There is a linear equation for each channel link without noise. There are a total of L linear equations with N−1 unknowns. The linear equations can be expressed in a general form shown in Equation 6.

$$Ab+n=u \qquad (Eq.\ 6)$$

In Equation 6, n accounts for the estimation noise due to imperfect channel estimations. The above equation has a least square solution represented by Equation 7. Solving for Equation 7 can provide a generalized least squares solution for calibration coefficients. In Equation 7, the term $\lambda I$ can account for the possible ill-conditioning of $A^H A$.

$$b=(A^H A+\lambda I)^{-1}A^H u,$$

$$\text{with } \lambda \geq 0 \qquad (Eq.\ 7)$$

The joint baseband processing can leverage the property that the calibration coefficients can change relatively slowly in the frequency domain. More specifically, after the calibration coefficients are obtained (e.g., for each sub-carrier), calibration coefficients can be processed with one or more of the following techniques. The calibration coefficients can be filtered and/or averaged in the frequency domain to be more resistant to noise. The calibration coefficients can be converted to time domain, applying minimum mean square error (MMSE) and/or other techniques to suppress the time domain noises, and then be converted back to frequency domain. Multiple observations of the calibrations can be combined using finite impulse response (FIR) and/or infinite impulse response (IIR) filtering methods to further reduce the error due to noise.

Antenna Groupings for Calibration

As discussed above, antennas can be divided into groups for calibration. Antennas of a TDD MIMO system can be divided into groups based on spatial location and channel properties, such as signal quality of links between different antennas. Antennas that are relatively close in spatial location can be more likely to be grouped in the same group. Antennas that are co-located on the same radio unit may not be designed to support simultaneous transmit and receive, due to the transceiver design that explicitly assumed all transit or all receive and/or due to lack of RF isolation. Such antennas can be assigned the same group. Conversely, antennas with spatial locations that are relatively far away from each other can be more likely to be grouped into different groups. Two antennas with a link having relatively high signal quality can be more likely to be in different groups. On the other hand, two antennas with a link having relatively low signal quality can be more likely to be included in the same groups. Less than all of the antennas arranged to serve UEs can be included in groups for calibration in various applications.

In some instances, mobility can be used in grouping antennas. Antennas that are more static can be more likely to be selected in a group. Mobility can be used to divide antennas into groups in instances where one or more network nodes are mobile. Alternatively or additionally, mobility can be used to divide antenna into groups in instances where antenna(s) of one or more UEs are arranged to wirelessly communicate as a virtual network node.

Figure 4A:
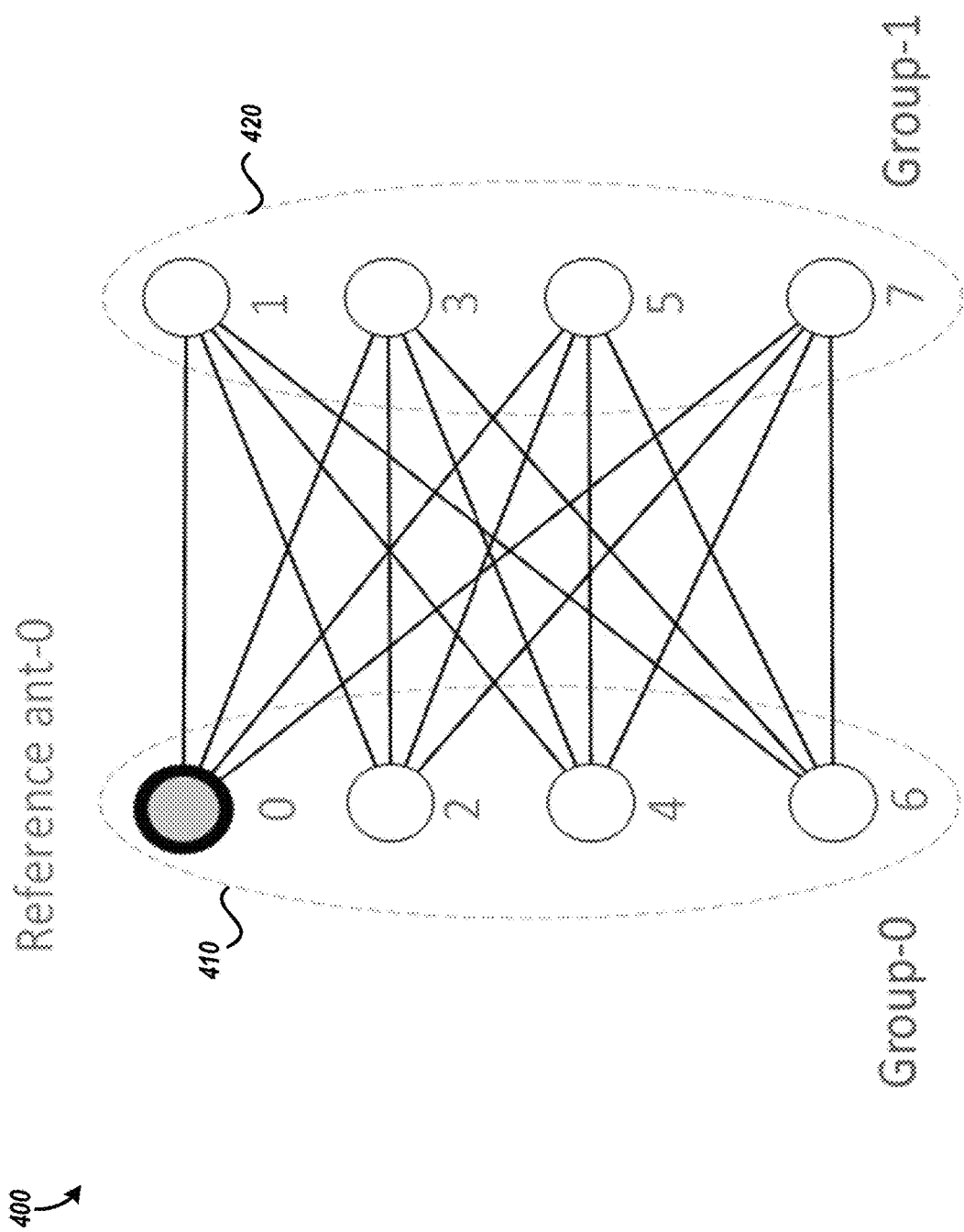
FIG. 4A is a diagram illustrating a network environment with a plurality of antennas divided into groups for performing calibration according to an embodiment.

FIG. 4A is a diagram illustrating a TDD MIMO network environment 400 with a plurality of antennas divided into groups for performing calibration according to an embodiment. As illustrated in FIG. 4A, the TDD MIMO network environment 400 includes 8 antennas. The 8 antennas can wirelessly transmit downlink data to one or more UEs and/or receive uplink data from the one or more UEs. Some or all of the 8 antennas can be distributed in space. Each antenna can be associated with a node configured to transmit and receive radio frequency signals. As an example, each node can be a remote radio unit. In certain applications, a UE can serve as a node. In some instances two or more antennas can be included in a single node. As illustrated, each of the antennas included in groups are in one group. Accordingly, the illustrated groups do not overlap with each other.

In the TDD MIMO network environment 400, the 8 antennas are divided into 2 groups with 4 antennas in each group. The first group of antennas 410 includes antennas 0, 2, 4, and 6. The second group of antennas 420 includes antennas 1, 3, 5, and 7. Without loss of generality, the antenna 0 can be designated as the master reference antenna. The master reference antenna can alternatively be referred to as a reference antenna. The calibration coefficient associated with the master reference antenna 0 can be a constant, such as 1. The antennas of the first group 410 can include antennas that are relatively close in spatial location, such as antennas 0 and 2. Similarly, the antennas of the second group 420 can include antennas that are relatively close in spatial location, such as antennas 5 and 7. There can be relatively good signal quality associated with links between antennas of the first group 410 and antennas of the second group 420. Although 4 links are shown associated with each antenna in FIG. 4A, certain calibration routines disclosed herein can be performed with a subset of the illustrated links. Alternatively, all illustrated links can be used in some calibration routines.

Figure 4B:
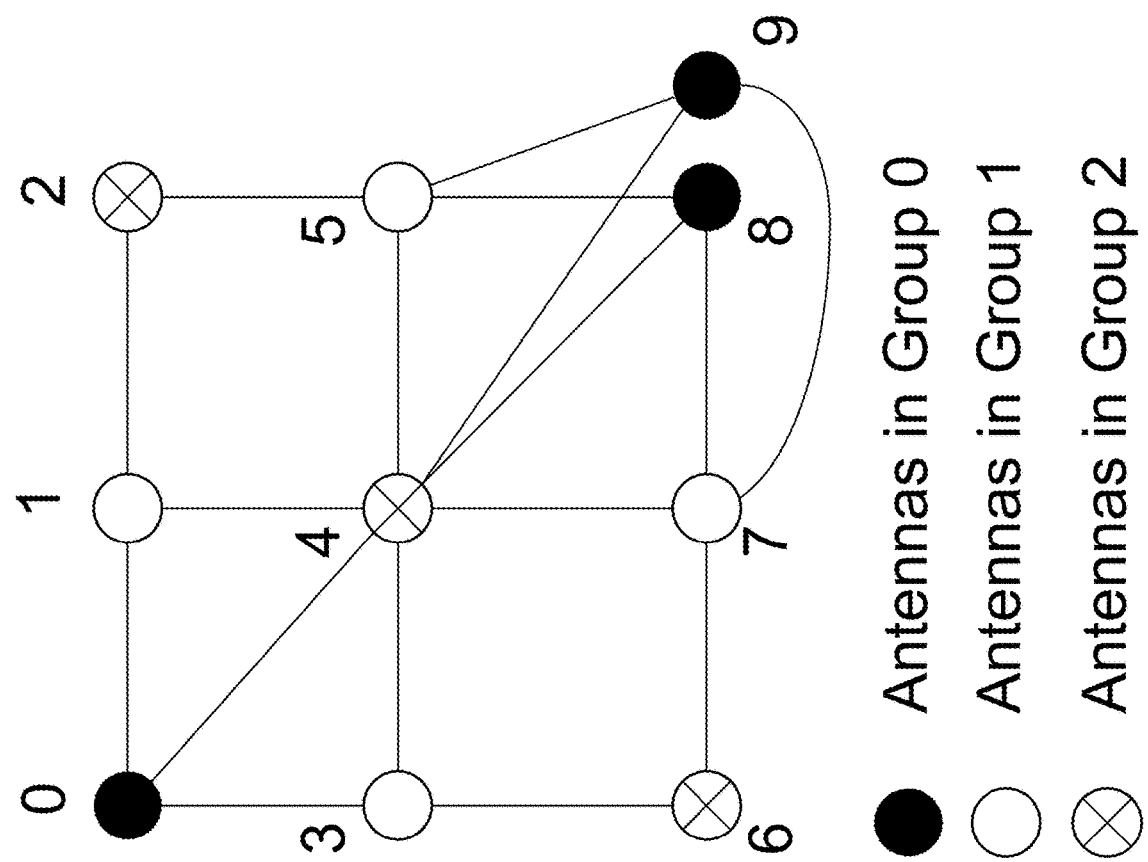
FIG. 4B is a diagram a network environment with a plurality of antennas divided into groups for performing calibration according to another embodiment.

FIG. 4B is a diagram illustrating a TDD MIMO network environment 430 with a plurality of antennas divided into groups for performing calibration according to an embodiment. FIG. 4B illustrates geographical locations of antennas in the network environment 430. In the network environment 430, the antennas of the network system are divided into three groups. A first group includes antennas 0, 8, and 9, a second group includes antennas 1, 3, 5, and 7, and a third group includes antennas 2, 4, and 6. As shown in FIG. 4B, groups of antennas for calibration can include different numbers of antennas in certain applications. In the network environment 430, antennas 8 and 9 can have relatively close spatial locations and are in the same group. Antennas 2 and 6 can each have links with relatively high signal quality to antenna 4 and also be included in the same group as antenna 4 in the network environment 430. Antenna 0 can be a reference antenna in the TDD MIMO network environment 430.

Figure 4C:
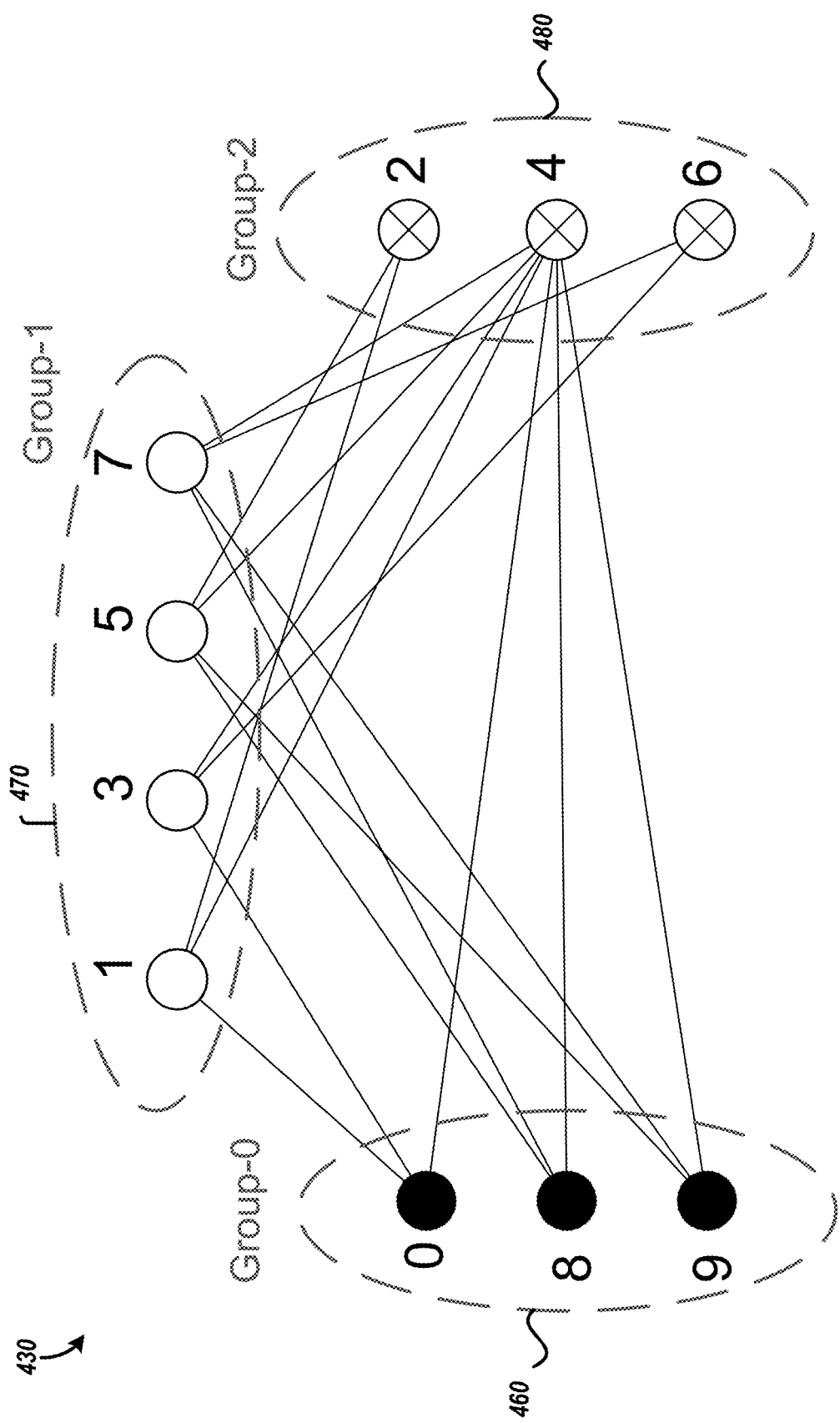
FIG. 4C is a diagram that illustrates communications between the plurality of antennas in the network environment of FIG. 4B for performing calibration according to another embodiment.

FIG. 4C is a diagram illustrating communications between antennas of TDD MIMO network environment 430 for performing calibration according to an embodiment. The network environment 430 includes three groups of antennas for calibration. The groups include a first group 460, a second group 470, and a third group 480. These groups correspond to the three groups identified in FIG. 4B. The first group 460 includes antennas 0, 8, and 9. The antennas 0, 8, and 9 of the first group 460 can communication with the antennas of the second group 470 and the third group 480. As illustrated, the second group 470 includes antennas 1, 3, 5, 7. The third group 480 includes antennas 2, 4, and 6. Antenna 4 can be a reference antenna in the TDD MIMO network environment 430. With the links shown in FIG. 4C, a calibration algorithm can be performed to determine calibration coefficients.

According to some applications, each group of antennas for calibration can include antennas in relatively close spatial locations and that can wirelessly communicate information with relatively high signal quality to antennas of other groups. In certain instances, each group of antennas for calibration can be included in a different RRU. As one example, antennas of a first group can be part of the RRU 125 of MIMO network environment 100 of FIG. 1, antennas of a second group can be part of the RRU 135 of MIMO network environment 100 of FIG. 1, and antennas of a third group can be part of the RRU 145 of MIMO network environment 100 of FIG. 1.

Although the examples of FIGS. 4A to 4C include two or three groups of antennas for calibration, antennas can be divided into any suitable number of groups to perform calibration in accordance with the principles and advantages disclosed herein. The principles and advantages disclosed herein can be applied to divide any suitable number of antennas into groups and perform calibration.

Timing of Calibration Signals

Calibration reference signals can be an SRS in LTE or NR systems, for example. For one antenna group of the TDD MIMO environment 400, four different cyclic shifts can be implemented, with each cyclic shift being assigned to one antenna. The reference signals can be FDM signals and four interlaced sets of sub-carriers can be assigned to four antennas. For LTE and/or NR TDD systems, the reference signals for calibration can be transmitted in a guard period and/or in an uplink time slot without assigned traffic. Reference signals for a calibration routine can be transmitted during one guard period or uplink time slot or downlink time slot in certain instances. Alternatively, reference signals can be transmitted in two or more guard periods and/or time slots in some other instances.

Figure 5A:
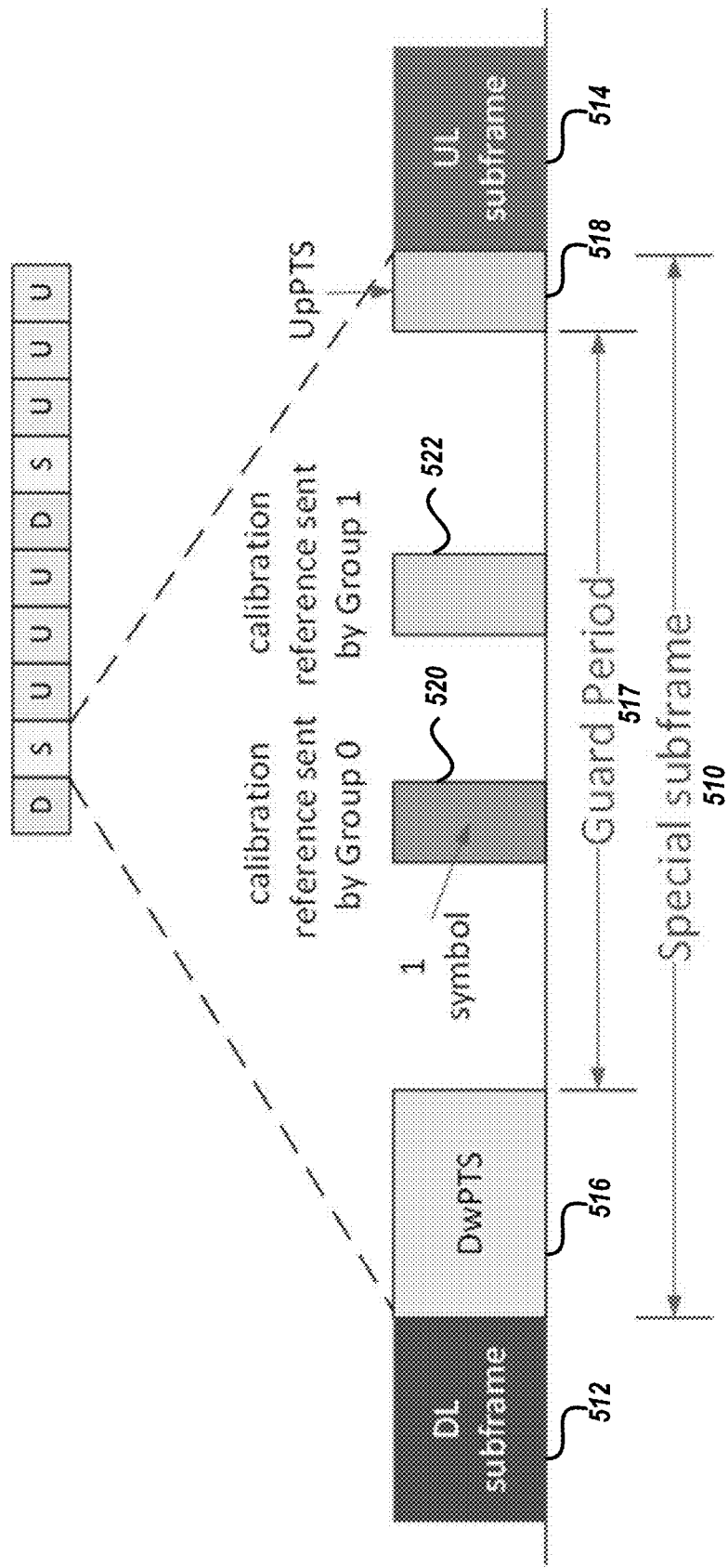
FIG. 5A is a timing diagram illustrating time slots for transmitting calibration reference signals according to an embodiment.

FIG. 5A is a timing diagram illustrating time slots during which calibration reference signals can be transmitted according to an embodiment. FIG. 5A illustrates time slots within a guard period during which calibration reference signal can be transmitted from the first group of antennas (e.g., the first group 410 of FIG. 4A) and the second group of antennas (e.g., the second group of antennas 420 of FIG. 4A) in LTE TDD systems.

As shown in FIG. 5A, a special subframe 510 can be included between a downlink subframe 512 and an uplink subframe 514. The special subframe 510 can facilitate switching from downlink transmission to uplink transmission in a TDD MIMO system. The illustrated special subframe 510 includes a downlink pilot time slot (DwPTS) 516, a guard period 517, and an uplink pilot time slot (UpPTS) 518. During a first time slot 520 of the guard period 517, calibration reference signals can be transmitted from the first group of antennas 410 and received by the second group of antennas 420 in the TDD MIMO environment 400 of FIG. 4A. The first time slot 520 can be synchronized between antennas of a TDD MIMO system. A calibration reference signal can have the duration of one or more symbol. In some instance, the calibration reference signal has a duration of one symbol. During a second time slot 522 of the guard period 517, calibration reference signals can be transmitted from the second group of antennas 420 and received by the first group of antennas 410 in the TDD MIMO environment 400 of FIG. 4A. The second time slot 522 can be synchronized between antennas of the TDD MIMO system.

The guard period 517 for switching from downlink to uplink can facilitate all uplink transmissions from multiple UEs arriving at the same time or approximately the same time at a base station, such as an eNodeB in an LTE system. The TDD MIMO environment 400 of FIG. 4A can operate without a guard period for switching from uplink to downlink in a variety of applications because the network can transmit downlink data to the UEs and the UEs may not have a desire for coordinated reception of downlink data from the network.

Figure 5B:
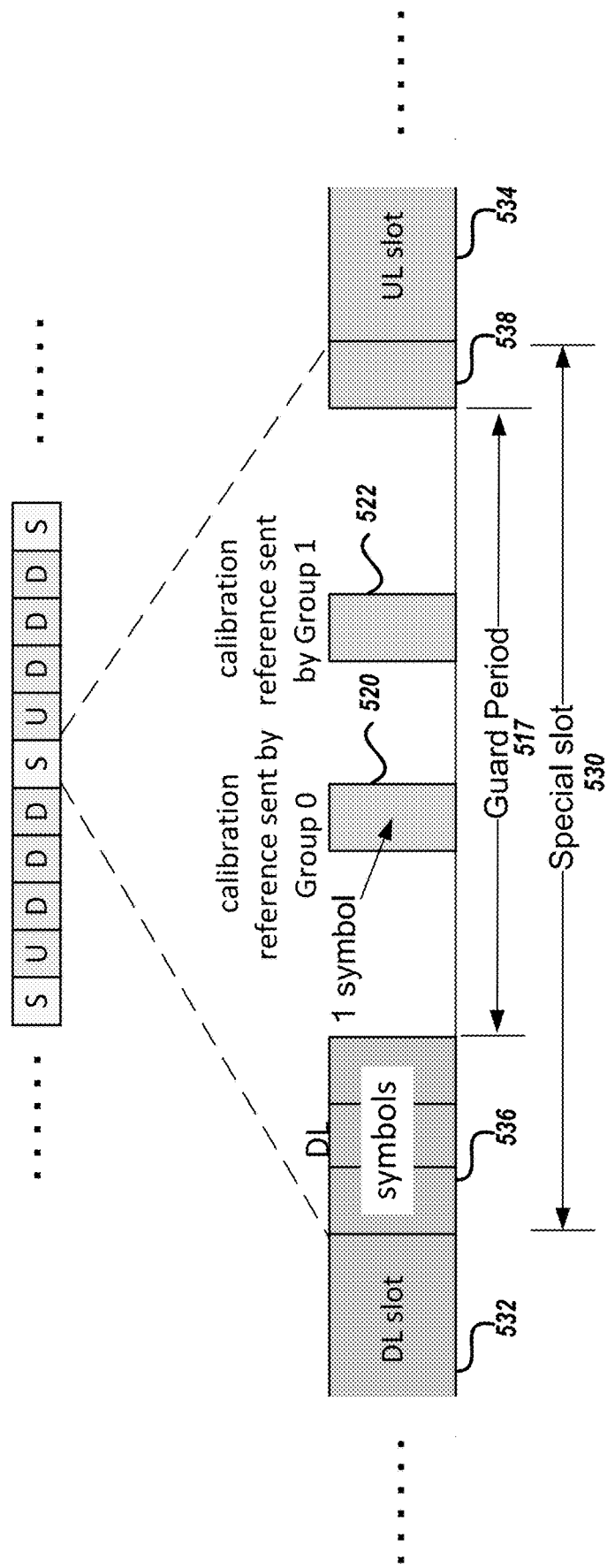
FIG. 5B is a timing diagram illustrating time slots within a guard during for transmitting calibration reference signals according to an embodiment.

FIG. 5B is a timing diagram illustrating time slots within a guard period during which calibration reference signals can be transmitted according to an embodiment. As shown in FIG. 5B, calibration reference signals can be transmitted and received during time slots 520 and 522 within a guard period 517 of a special slot 530. The special slot 530 can be between a downlink slot 532 and an uplink slot 534. The special slot 530 can begin with one or more downlink symbols 536. The special slot 530 can end with one or more uplink symbols 538. The guard period 517 can be between a downlink symbol 536 and an uplink symbol 538 of the special slot 530 as illustrated in FIG. 5B.

Although FIGS. 5A and 5B illustrate that calibration reference signals can be transmitted and received during a guard period, the reference signals can alternatively or additionally be transmitted in different time slots, such as dedicated uplink subframes or uplink time slots where there is no uplink traffic being scheduled and/or dedicated downlink subframes or downlink time slots where there is no downlink traffic being scheduled.

The calibration symbol exchange and calibration computation can be periodic at a fixed schedule interval, aperiodic depending on user activity, or adaptive based on observed changes on the calibration coefficients. The interval can be sufficient to track changes in the calibration coefficients. Aperiodic and adaptive schemes can have the advantage of reducing the calibration overhead/interval while still being sufficient to track changes in calibration coefficients.

Figure 5C:
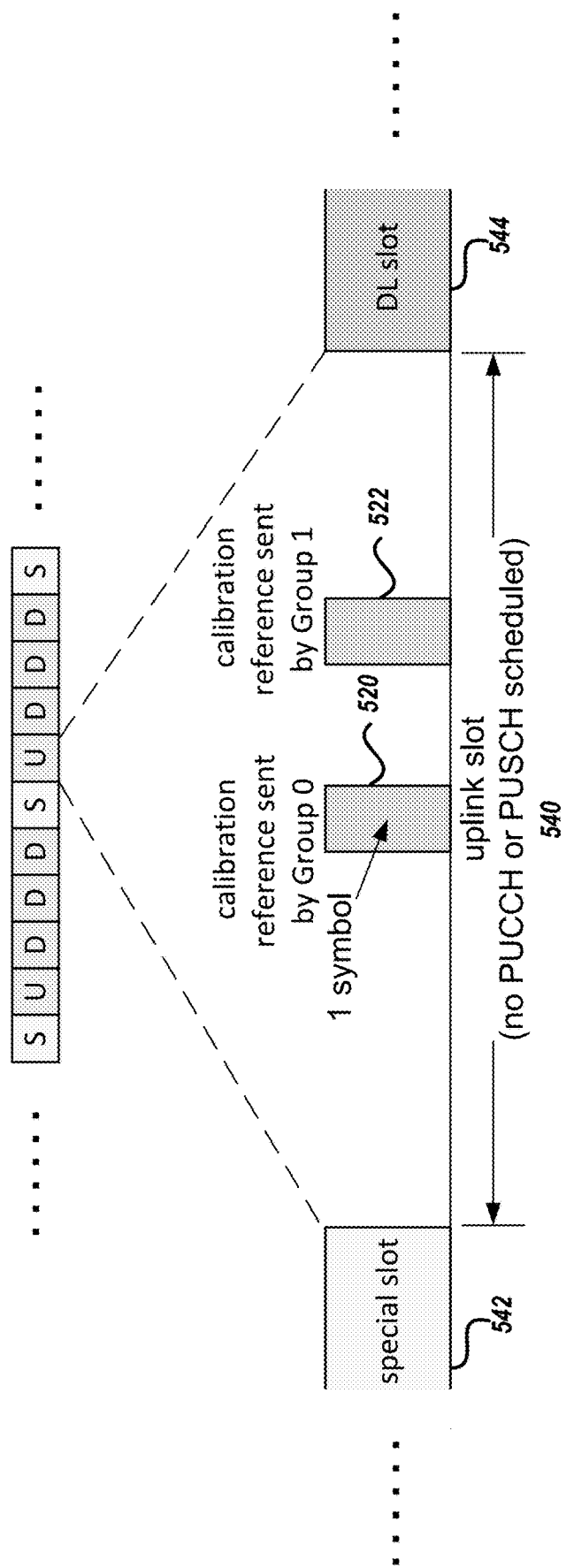
FIG. 5C is a timing diagram illustrating time slots within an uplink time slot for transmitting calibration reference signals according to an embodiment.

FIG. 5C is a timing diagram illustrating time slots within an uplink time slot during which calibration reference signals can be transmitted according to an embodiment. The uplink time slot 540 is shown as being between a special slot 542 and a downlink slot 544. The uplink time slot 540 can be an uplink subframe, for example. When calibration reference signals are transmitted in an uplink time slot 540, there can be no physical uplink control channel (PUCCH) or physical uplink shared channel (PUSCH) scheduled during the uplink time slot 540. The calibration reference signals can be transmitted and received in an uplink time slot 540 without assigned uplink traffic. As shown in FIG. 5C, calibration reference signals can be transmitted and received during time slots 520 and 522 within the uplink slot 540.

Figure 5D:
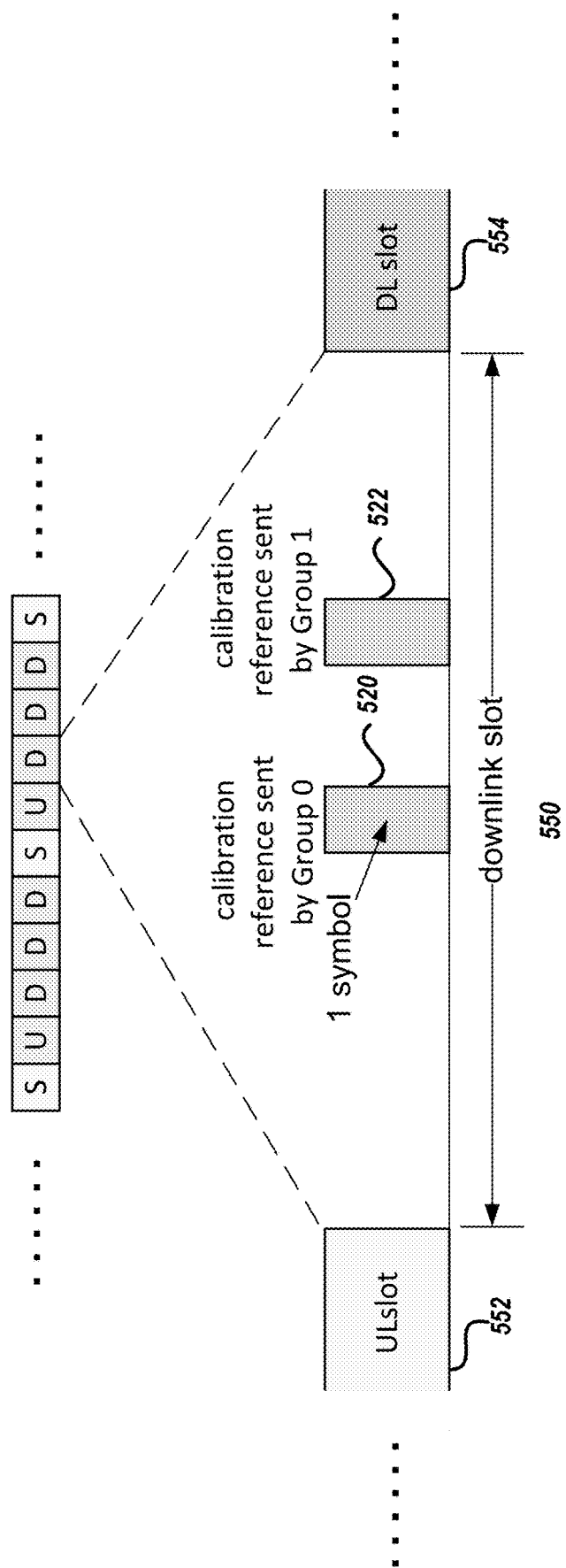
FIG. 5D is a timing diagram illustrating time slots within a downlink time slot for transmitting calibration reference signals according to an embodiment.

FIG. 5D is a timing diagram illustrating time slots within a downlink time slot during which calibration reference signals can be transmitted according to an embodiment. The downlink time slot 550 is shown as being between an uplink time slot 552 and another downlink slot 554. Alternatively or additionally, a downlink time slot between two other downlink time slots can be used for transmitting calibration reference signals. The downlink time slot 550 can be a downlink subframe, for example. When calibration reference signals are transmitted in a downlink time slot 550, there can be no physical downlink control channel (PDCCH) or physical downlink shared channel (PDSCH) scheduled during the downlink time slot 550. The calibration reference signals can be transmitted and received in a downlink time slot 550 without assigned uplink traffic. As shown in FIG. 5D, calibration reference signals can be transmitted and received during time slots 520 and 522 within the downlink slot 550.

CALIBRATION EXAMPLES

Figure 6:
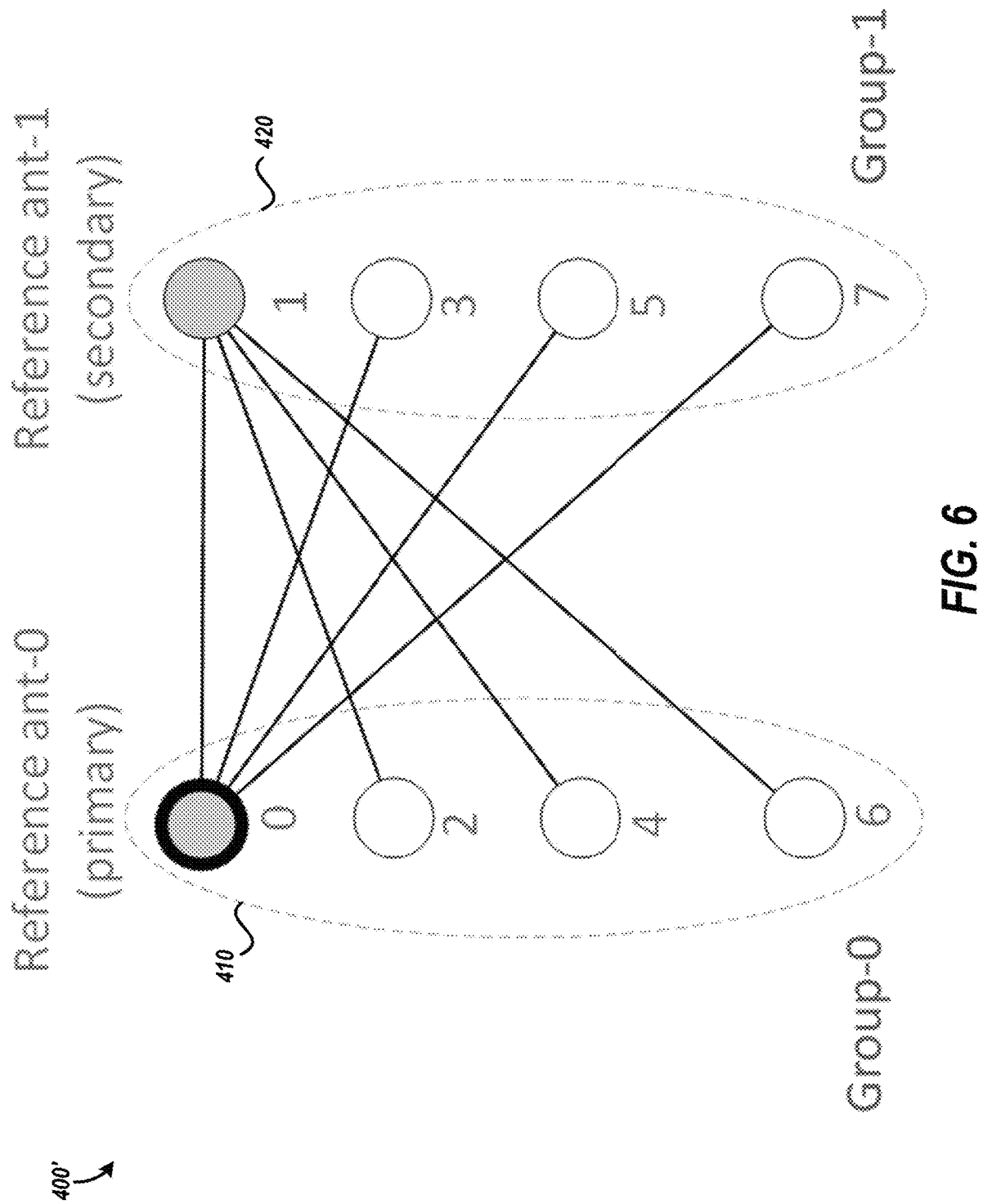
FIG. 6 is a diagram illustrating a time-division duplex (TDD) MIMO network environment with links between antennas for the group shown in FIG. 4A for a single-link calibration according to an embodiment.
Figure 7:
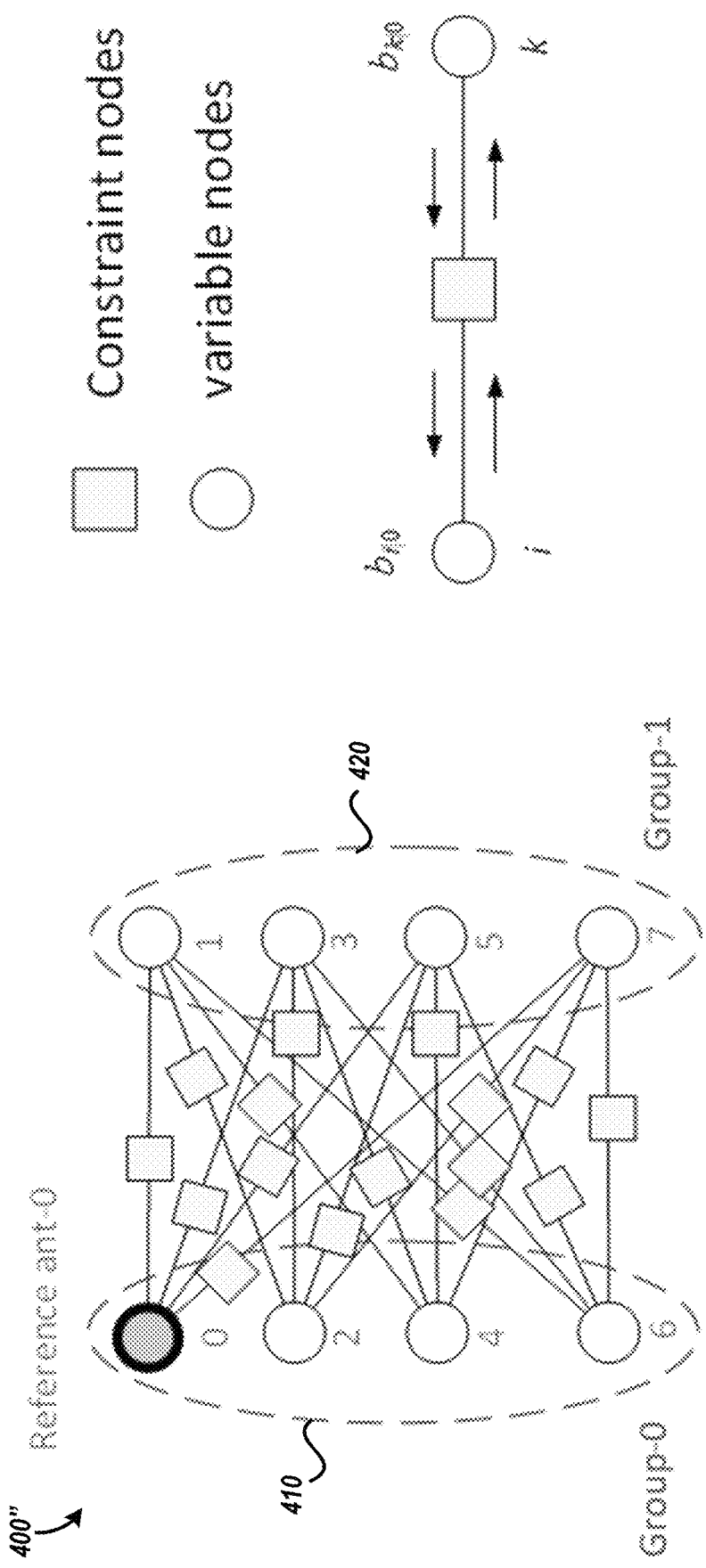
FIG. 7 is a diagram illustrating links between antennas for the groups shown in FIG. 4A and constraints for an iterative calibration according to an embodiment.

A calibration scheme and calibration algorithms will be described with reference to illustrative examples of FIGS. 4A, 6, and 7. The calibration algorithms can be executed by a processing unit (e.g., a baseband unit) in communication with antennas of a TDD MIMO system. These illustrative examples relate to a TDD MIMO environments with 8 antennas, although calibration can be performed with any suitable number of antennas. The antennas can be divided into groups as discussed with reference to FIG. 4A and as shown in FIGS. 4A, 6, and 7. An antenna (e.g., antenna 0) can be designated as the master reference antenna. The calibration coefficient associated with the master reference antenna can be set to a constant value. For example, the calibration coefficient associated with the master reference antenna can be 1.

Two time slots are allocated to transmit the reference signals for antenna calibration for the two groups of antennas 410 and 420. One or more of the time slots can be during a guard period of a special subframe or special time slot, for example, as shown in FIGS. 5A and/or 5B. Alternatively or additionally, one or more time slots can be during an uplink time slot without assigned uplink traffic, for example, as shown in FIG. 5C. In time slot 0, antennas in the first group 410 transmit reference signals over designated physical resources. The designated physical resources can be orthogonal physical resources. Antennas in the second group 420 are arranged to receive and associated transceivers can be set to the receive mode in time slot 0. Channel estimation can be run based on the reference signals received in time slot 0 by the antennas of the second group 420. In time slot 1, antennas in the second group 420 transmit reference signals over the designated physical resources. The antennas in the first group 410 are arranged to receive and associated transceivers can be set to the receive mode for time slot 1. Channel estimation can be run based on the reference signals received in time slot 1 by antennas of the first group 410. The channel estimates can be jointly processed to generate calibration coefficients. Example algorithms for the joint processing will now be discussed.

FIG. 6 is a diagram illustrating a TDD MIMO network environment 400' with links between antennas for the groups 410 and 420 of the TDD MIMO system shown in FIG. 4A for a single-link calibration according to an embodiment. The single-link calibration algorithm includes determining calibration coefficients associated with antennas based on a single link from each of the antennas to a reference antenna. The TDD MIMO network environment 400' is like the TDD MIMO network environment 400 of FIG. 4A except that fewer links between antennas are illustrated.

As shown in FIG. 6, there is a direct link between each of antennas 1, 3, 5, and 7 and the reference antenna 0. FIG. 6 also illustrates that antennas 2, 4, and 6 are each connected to the reference antenna 0 through respective links to antenna 1 and the link between antenna 1 and antenna 0.

Accordingly, antenna 1 can serve as a secondary reference antenna for single link calibration. In such cases, the reference antenna 0 can be referred to as a primary reference antenna. Channel estimation can be performed for only the links on the paths shown in FIG. 6 for single link calibration. This can make single-link calibration less computationally complex than other calibration algorithms.

The calibration coefficients associated with antennas 1, 3, 5, and 7 can be derived based on the channel estimations of the links connected to antenna 0. The calibration coefficients of antennas 2, 4, and 6 can be derived by applying the chain rule in Equation 8 for i=2, 4, and 6, respectively. Equation 8 is a specific case of Equation 5. The calibration coefficient for antenna 0 can be selected to a constant, such a 1. Using Equation 3 and $c_R=1$, $$c_i = \frac{T_i}{R_i}$$

can be determined from Equation 8.

$$b_{i|0} = b_{i|1} \cdot b_{1|0} \qquad \text{(Eq. 8)}$$

Single link calibration is less computationally complex than other calibration algorithms, such as iterative calibration and least squares. On the other hand, single link calibration can be less accurate than other calibration algorithms, such as iterative calibration and least squares. Accordingly, single link calibration can be used for applications in which relatively low computational complexity is desired and/or relatively lower accuracy can be tolerated.

FIG. 7 is a diagram illustrating links between antennas for the groups 410 and 420 shown in FIG. 4A and constraints for an iterative calibration according to an embodiment. The iterative calibration can include applying an iterative algorithm on a factor graph of multiple paths between antennas of the first group 410 and second group 420 of antennas in the TDD MIMO environment 400″. The TDD MIMO environment 400″ is like the TDD MIMO environment 400 of FIG. 4A except that constraint nodes are illustrated. Antennas of the TDD MIMO environment 400″ can be variable nodes and channels can be constraint nodes in the factor graph for applying an iterative algorithm.

Consider a link from antenna-i of the first group 410 to antenna-k of the second group 420. From Equation 1, the channel estimates $\hat{H}_{i \to k}$ and $\hat{H}_{k \to i}$ are related by Equation 9.

$$\hat{H}_{i \to k} \cdot c_k = \hat{H}_{k \to i} \cdot c_i \qquad \text{(Eq. 9)}$$

Dividing both sides by $c_0$ and noting that $$b_{k|0} = \frac{c_k}{c_0}$$

based on Equation 3, Equation 10 can be derived.

$$\hat{H}_{i \to k} \cdot b_{i|0} - \hat{H}_{k \to i} \cdot b_{i|0} = 0 \qquad \text{(Eq. 10)}$$

By denoting $b_{k|0}$ and $b_{i|0}$ as variable nodes, a factor graph can be generated with constraint nodes defined by Equation 10, as shown in FIG. 7. Consequently, $b_{k|0}$ and $b_{i|0}$ can be updated with an iterative algorithm, such as a belief propagation algorithm. The iterative algorithm can provide approximate calibration coefficients associated with each of the antennas for the first group 410 and the second group 420.

Iterative algorithms are more computationally complex than single link calibration and, in most cases, less computationally complex than least squares. Iterative calibration can be more accurate than single-link calibration and, in most cases, less accurate than least squares. Iterative calibration can be used for applications that are a match for the associated computational complexity and accuracy.

Least squares regression is another algorithm that can be used to determine calibration coefficients. A least squares regression will be described with reference to FIG. 4A. For simplicity, denote $H_{ik} = \hat{H}_{i \to k}$ and $H_{kj} = \hat{H}_{k \to j}$. Also denote $b = [b_{1|0}\ b_{2|0}\ b_{3|0}\ b_{4|0}\ b_{5|0}\ b_{6|0}\ b_{7|0}]^T$. Equation 10 can be used for the links between antennas of the first group 410 and antennas of the second group 420 of the network environment 400 of FIG. 4A. There are 16 equations with 7 unknowns in Equation 10, based on which the least squares solution can be obtained using Equation 7. For this example, the matrix A and the vector u in Equation 7 can be as shown below.

$$A = \begin{bmatrix} H_{01} & 0 & 0 & 0 & 0 & 0 & 0 \\ H_{21} & -H_{12} & 0 & 0 & 0 & 0 & 0 \\ H_{41} & 0 & 0 & -H_{14} & 0 & 0 & 0 \\ H_{61} & 0 & 0 & 0 & 0 & -H_{16} & 0 \\ 0 & 0 & H_{03} & 0 & 0 & 0 & 0 \\ 0 & -H_{32} & H_{23} & 0 & 0 & 0 & 0 \\ 0 & 0 & H_{43} & -H_{34} & 0 & 0 & 0 \\ 0 & 0 & H_{63} & 0 & 0 & -H_{36} & 0 \\ 0 & 0 & 0 & 0 & H_{05} & 0 & 0 \\ 0 & -H_{52} & 0 & 0 & H_{25} & 0 & 0 \\ 0 & 0 & 0 & -H_{54} & H_{45} & 0 & 0 \\ 0 & 0 & 0 & 0 & H_{65} & -H_{56} & 0 \\ 0 & 0 & 0 & 0 & 0 & 0 & H_{07} \\ 0 & -H_{72} & 0 & 0 & 0 & 0 & H_{27} \\ 0 & 0 & 0 & -H_{74} & 0 & 0 & H_{47} \\ 0 & 0 & 0 & 0 & 0 & -H_{76} & H_{67} \end{bmatrix}_{16 \times 7} \quad u = \begin{bmatrix} H_{10} \\ 0 \\ 0 \\ 0 \\ H_{30} \\ 0 \\ 0 \\ 0 \\ H_{50} \\ 0 \\ 0 \\ 0 \\ H_{70} \\ 0 \\ 0 \\ 0 \end{bmatrix}$$

Least squares regression can be more computationally complex and also more accurate than some other algorithms for determining calibration coefficients associated with antennas in a TDD MIMO environment. Least squares can be used in applications with sufficient computational resources and/or with a desire for relatively higher accuracy of calibration coefficients. The least squares approach can fully exploit the diversity of channel estimates to each node. For example, if the channel is frequency selective the single-link approach can yield poor calibration performance at local fades in the response. With the least squares approach, the multiplicity of observations to each channel provide diversity against such fades, which can ensure a higher probability of a good channel estimate at any given frequency.

Although example calibration algorithms may be described with reference to determining calibration coefficients associated with a particular number of antennas, any suitable principles and advantages disclosed herein can be applied to a system with any suitable number of antennas. While example calibration algorithms may be described with reference antennas divided into two groups, any suitable principles and advantages disclosed herein can be applied to systems in which antennas are divided into three or more groups. Any other suitable calibration algorithms for jointly processing channel estimates can alternatively or additionally be implemented. In some instances, a baseband processor can be arranged to implement a plurality of calibration algorithms and a particular algorithm can be selected (e.g., based on one or more of computational complexity, desired accuracy, desired latency, etc.). For example, a baseband processor can select from a single-link calibration algorithm, an iterative algorithm, or a least squares algorithm. As another example, a baseband processor can select from a plurality of algorithms that includes at least one of a single-link calibration algorithm, an iterative algorithm, or a least squares algorithm. According to certain applications, a hybrid of two or more algorithms can be used for determining calibration coefficients. Such a hybrid can be of two or more of a single-link calibration algorithm, an iterative algorithm, or a least squares algorithm.

Hierarchical Calibration

The calibration disclosed herein can be applied to systems with a relatively large number of antennas. In such systems, hierarchical calibration can be applied to reduce the complexity of the procedures, which can scale to first order by the number of square of the antenna within the calibration set. Hierarchical calibration also provides a way of calibrating sets of nodes that are only weakly connected in an RF sense. For example, in hierarchical calibration, almost disjoint nodes can first be calibrated, and then the nodes within overlapping coverage can be calibrated. Hierarchical and/or phased calibration can be used to reduce the dimensionality needs for the sounding signals to ensure orthogonality due to reduced antenna set size. Hierarchical and/or phased calibration can improve channel estimates by avoiding reuse interference by silencing some of the sets of nodes.

Hierarchical calibration can involve applying calibration techniques disclosed herein at two or more levels of hierarchy. For example, calibration coefficients can be determined for each subset that includes groups of antennas arranged to wirelessly communicate with UEs in accordance with any suitable principles and advantages described with reference to one or more of FIGS. 4A to 7. Calibration coefficients can be determined for a higher level subset of antennas of a TDD MIMO system and for lower level subsets of the antennas of the TDD MIMO system. The higher level subset can include the reference antennas of the lower level subsets. One of the antennas of the higher level subset can be a global reference antenna. The higher level subset can be calibrated and then the lower level subsets can be calibrated relative to respective reference antennas of the higher level subset.

Figure 8A:
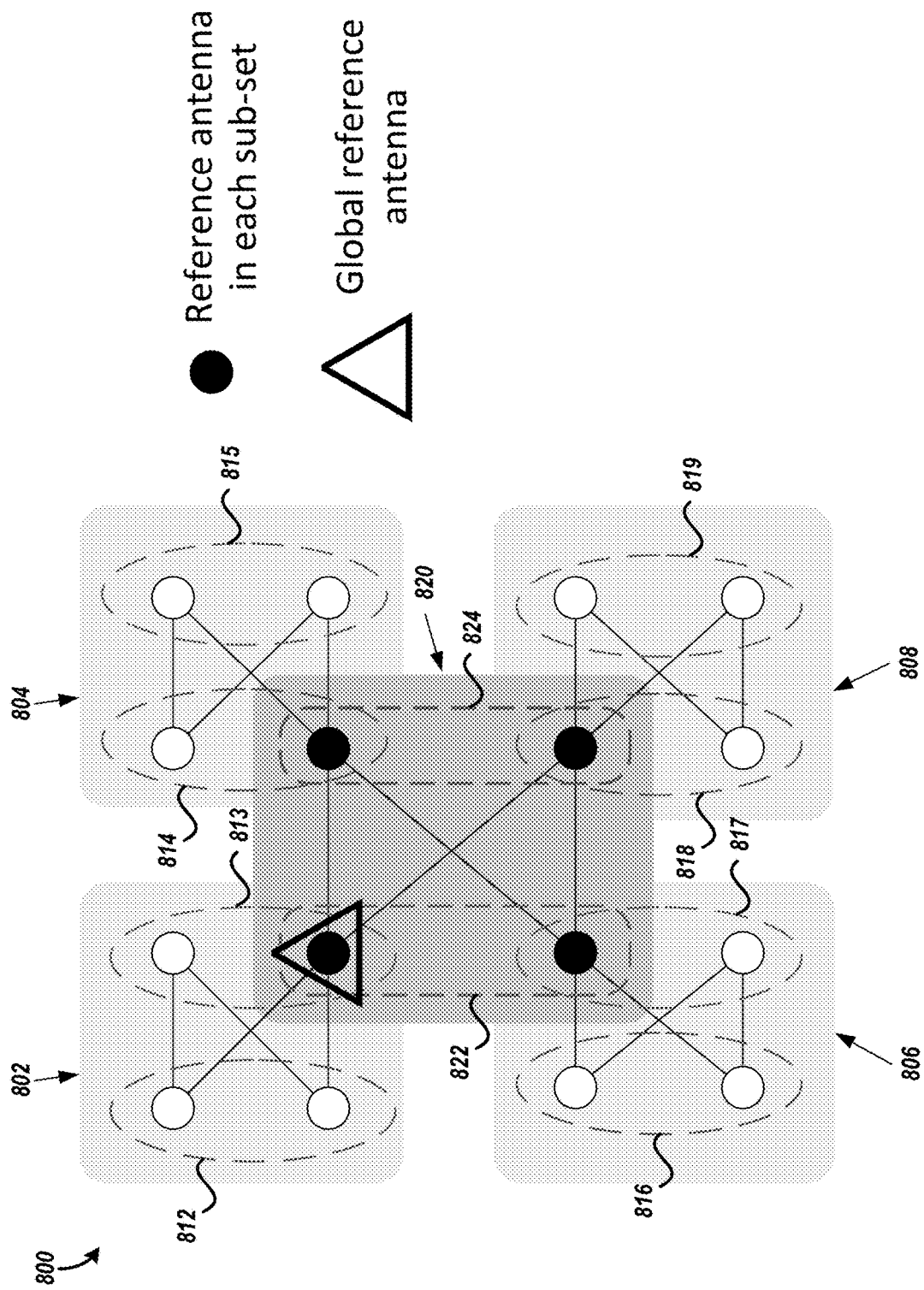
FIG. 8A illustrates a TDD MIMO environment for hierarchical calibration according to an embodiment.

FIG. 8A illustrates a TDD MIMO environment 800 for hierarchical calibration according to an embodiment. As illustrated, the TDD MIMO environment 800 includes 16 antennas divided into four subsets 802, 804, 806, and 808. Each of the subsets 802, 804, 806, and 808 is divided into groups for determining calibration coefficients. For example, the subset 802 includes antennas divided into a first group 812 and a second group 813. Similarly, the subset 804 includes antennas divided into a first group 814 and a second group 815, the subset 806 includes antennas divided into a first group 816 and a second group 817, and the subset 808 includes antennas divided into a first group 818 and a second group 819. Each of the subsets 802, 804, 806, and 808 includes a reference antenna. In the TDD MIMO environment 800, a higher level subset 820 includes the reference antenna from each of the subsets 802, 804, 806, and 808. The antennas of the higher level subset 802 are divided into groups 822 and 824. One of the antennas of the higher level subset 820 can serve as a global reference antenna.

Figure 8B:
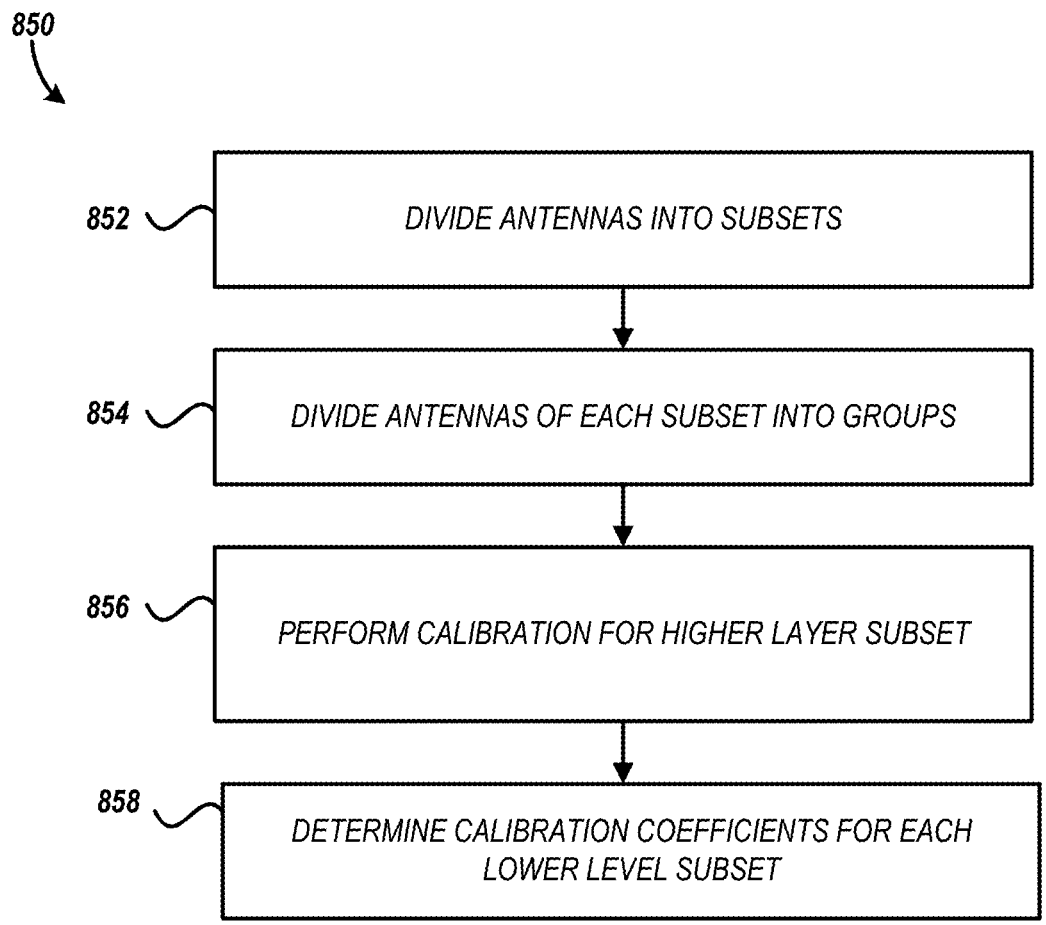
FIG. 8B is a flow diagram illustrating an example method of hierarchically generating calibration coefficients according to an embodiment.

FIG. 8B is a flow diagram illustrating an example method 850 of generating calibration coefficients with a hierarchical calibration according to an embodiment. The method 850 will be discussed with reference to the TDD MIMO environment 800 of FIG. 8A for illustrative purposes.

For a hierarchical calibration, antennas of a TDD MIMO system can be divided into subsets. At block 852, antennas of a TDD MIMO system are divided into subsets. For example, in TDD MIMO environment 800, the antennas can be divided into subsets 802, 804, 806, and 808. Antennas can be divided into subsets based on one or more of spatial location, link quality between antennas, or one or more other suitable factors. Each subset 802, 804, 806, and 808 includes a reference antenna.

The antennas of each subset are divided into groups at block 854. For example, antennas of the subset 802 are divided into a first group 812 and a second group 813. The antennas of a subset can be divided into groups in accordance with any suitable principles and advantages disclosed herein related to dividing antennas into groups. A higher level subset 820 can consist of the reference antennas of the subsets 802, 804, 806, and 808, for example, as shown in FIG. 8A. Antennas of the higher level subset 820 can also be divided into groups at block 854. One of the antennas of the higher level subset 820 can be a reference antenna for the higher level subset 820. The reference antenna for the higher level subset 820 serves as a global reference antenna in the TDD MIMO environment 800.

Calibration coefficients associated with each antenna of the higher level subset can be determined at block 856. For example, a method of calibration that includes any suitable combination of features described with reference to the method 300 of FIG. 3 can be performed for antennas of the higher level subset 820 and the antenna groups 822 and 824 of FIG. 8A.

Calibration coefficients associated with each antenna of the lower level subsets can be determined at block 858. For example, a method of calibration that includes any suitable combination of features described with reference to the method 300 of FIG. 3 can be performed for antennas of each of the subsets 802, 804, 806, and 808. Calibration for two or more of the lower level subsets can be performed concurrently. Alternatively or additionally, calibration for two or more of the lower level subsets can be performed at different times.

Although hierarchical calibration may be discussed with reference to two layers of hierarchy, hierarchical calibration can be performed with three or more layers of hierarchy. While the subsets are shown as each including two groups of antennas for illustrative purposes, one or more of the subsets can include three or more groups of antennas. In some instances, different subsets can include antennas divided into different numbers of groups.

While the method 850 shown in FIG. 8A illustrates determining calibration coefficients for a higher level subset and then determining calibration coefficients for lower level subsets for illustrative purposes, calibration coefficients for antennas of a higher level subset and lower level subsets can be determined in any suitable order in a hierarchical calibration. For example, in certain instances, calibration of a higher level subset can be performed before calibration of lower level subsets. According to some other instances, calibration of a higher level subset can be performed after calibration of lower level subsets. A higher level subset can be calibrated concurrently with one or more of the lower level subsets in various instances. Calibration coefficients associated with antennas of lower level subsets can be adjusted based on calibration coefficients for the higher level subset. This can account for relative differences in calibration coefficients for reference antennas in the higher level subset relative to a global reference antenna. Accordingly, calibration coefficient for each antenna in a lower level subset can be determined relative to the global reference antenna.

A hierarchical calibration can offer flexibility in decomposing the calibration process and/or scheduling calibration reference signals. For example the subsets 802, 804, 806 and 808 can exchange calibration reference signals concurrently and/or sequentially. The relative frequency of calibration of the subsets can be non-uniform. For example, the subset 802 can be calibrated at higher frequency than other subsets with more averaging than other subsets to reduce and/or minimize the propagation of calibration errors to second tier subsets.

Network System

Figure 9:
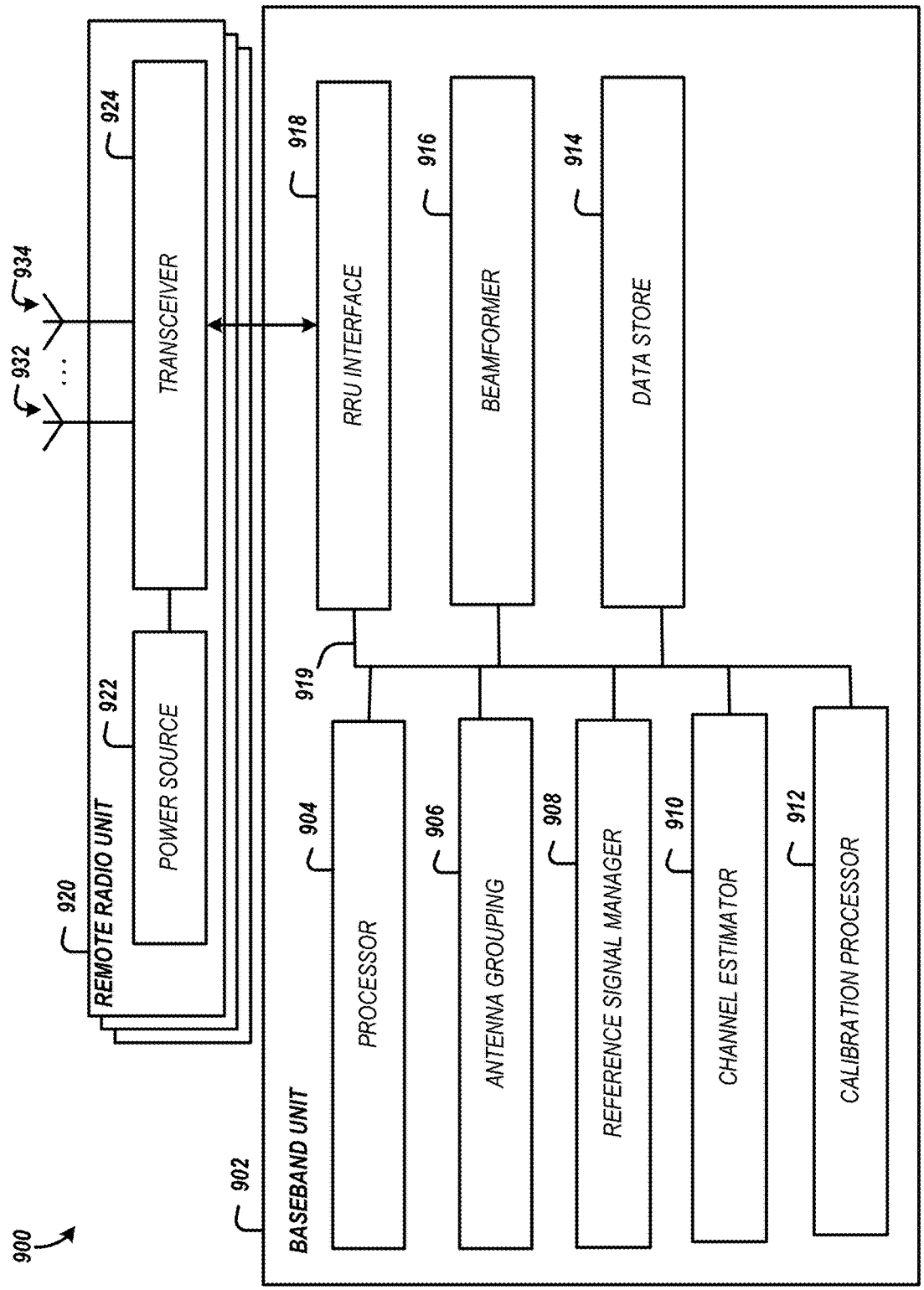
FIG. 9 is a block diagram illustrating a network system that includes an example base band unit and remote radio units according to an embodiment.

A network system can be configured to determine calibration coefficients in accordance with any suitable principles and advantages disclosed herein. The network system can apply the calibration coefficients to signal chains to thereby calibrate the network system for wireless communication with UEs. The network system can exchange TDD MIMO information with UEs. FIG. 9 illustrates an example network system. The network system can operate in any suitable number environment, such as the network environment 100 of FIG. 1 and/or any suitable network environment. The network system can include any suitable antenna groups and apply any suitable calibration algorithms disclosed herein.

FIG. 9 is a block diagram illustrating an example network system 900 that includes base band unit 902 and remote radio units 920 according to an embodiment. The network system 900 of FIG. 9 can perform calibration in accordance with any suitable principles and advantages disclosed herein. The base band unit 902 can be coupled with at least one remote radio unit 920. The base band unit 902 is an example of a processing unit that can determine calibration coefficients in accordance with any suitable principles and advantages disclosed herein. The base band unit 902 can be coupled with a plurality of remote radio units 920 as illustrated. Such remote radio units 920 can be distributed. The remote radio units 920 can include some or all of the antennas for calibration routines disclosed herein.

A remote radio unit 920 can include at least a first antenna 932 and a second antenna 934 for wireless communications, such as MIMO wireless communications. Any antenna disclosed herein, such as the antenna 932 or the antenna 934, can be referred to as antenna element. In certain instances, the antennas 932 and 934 can be included in the same group for calibration. A remote radio unit can include any suitable number of antennas and/or arrays of antennas. The antennas 932 and 934 of the RRU 920 are coupled with a transceiver 924. The transceiver 924 includes a receiver and a transmitter. The receiver can process signals received via the antennas 932 and/or 934. The receiver can include the receive circuit 214 of FIG. 2. The transceiver 924 can provide the processed signals to an RRU interface 916 included in the BBU 902. The transceiver 924 can include any suitable number of receive paths. The transmitter can process signals received from the BBU 902 for transmission via the antennas 932 and/or 934. The RRU 920 can include a power source 922, which can provide power to the transceiver 924. The transmitter of the transceiver 924 can provide signals to the antennas 932 and/or 934 for transmission. The transmitter can include the transmit circuit 212 of FIG. 2. The transceiver 924 can include any suitable number of transmit paths. The transceiver 924 can include different transmit and receive paths for each antenna 932 and 934. In some other instances, the BBU 902 can perform some or all of the signal processing of a transceiver.

A calibration coefficient can be associated with an antenna for a particular combination of a transmit path, a receive path, and an antenna of the network system 900.

As illustrated, the BBU 902 includes a processor 904, an antenna grouping block 906, a reference signal manager 908, a channel estimator 910, a calibration processor 912, data store 914, a beamformer 916, and an RRU interface 918, and a bus 919. The bus 919 can couple several elements of the BBU 902. Data can be communicated between elements of the BBU 902 over the bus 919.

The processor 904 can include any suitable physical hardware configured to perform the functionality described with reference to the processor 904. The processor 904 can manage communications between the network system 900 and UEs. For example, the processor 904 can schedule traffic and cause control information to be sent to UEs. The processor 904 can include a processor configured with specific executable instructions, a microprocessor, a microcontroller, a digital signal processor (DSP), an application specific integrated circuit (ASIC), a programmable logic device such as field programmable gate array (FPGA). the like, or any combination thereof designed to perform the functions described herein. The processor 904 can be implemented by any suitable combination of computing devices and/or discrete processing circuits in certain applications.

The antenna grouping block 906 can divide antennas arranged to wirelessly communicate with UEs into groups for performing calibration. For example, the antenna grouping block 906 can group antennas as illustrated in any of FIGS. 4A, 4B, 4C, 6, 7, and 8A. The antenna grouping block 906 can divide antennas into any suitable number of groups for performing calibration in accordance with the principles and advantages disclosed herein. In some instances, the antenna grouping block 906 can determine whether to include an antenna in a group of the groups. The antenna grouping block 906 can obtain any suitable information for dividing antennas into groups, such as one or more of location information, channel information, or mobility information (e.g., for UE is functioning as a virtual network node and/or for a network node is mobile). The antenna grouping block 906 can group antennas at any suitable time before calibration. The antenna grouping block 906 can update groups periodically, at set times, in response to one or more events, or any combination thereof. The antenna grouping block 906 can divide antennas into subsets and divide the subsets into groups for hierarchical calibration. The antenna grouping block 906 can be implemented by dedicated circuitry and/or by circuitry of the processor 904.

The reference signal manager 908 can coordinate transmission and/or reception of reference signals for calibration. For example, the reference signal manager 908 can determine a type of reference signal to transmit from a group of antennas to other groups of antennas. The reference signal manager 908 can coordinate the timing of the time slots for transmitting and receiving reference signals for calibration. For instance, the reference signal manager 908 can cause reference signals to be transmitted and received in any of the time slots shown in FIG. 5A, 5B, or 5C. The reference signal manager 908 can identify designated physical resources, such as orthogonal physical resources, over which to transmit reference signals. Received reference signal can be provided to the reference signal manger 908 for processing in certain instances. The reference signal manager 908 can be implemented by dedicated circuitry and/or by circuitry of the processor 904.

The channel estimator 910 can generate channel estimates based on reference signals received during a calibration routine. The channel estimator 910 can generate channel estimates for links between antennas in different groups. The channel estimator 910 can be implemented by dedicated circuitry and/or by circuitry of the processor 904. In some instances, the channel estimator 910 can include circuitry for channel estimation for SRS.

The channel estimator 910 can generate an uplink channel estimate based on an uplink pilot signal from a UE. The channel estimator 910 can generate a downlink channel estimate based on the uplink pilot signal and a calibration coefficient generated by a calibration routine.

The calibration processor 912 can generate calibration coefficients based on the channel estimates from the channel estimator 910. The calibration processor 912 can execute any suitable calibration algorithm for determining calibration coefficients, such as a single link calibration algorithm, an iterative calibration algorithm, or a least squares regression. The calibration processor 912 can be arranged to implement two or more different algorithms in a variety of applications.

In certain instances, the calibration processor 912 can select a particular calibration algorithm to implement for a specific application. The particular calibration algorithm can be selected based on a desired accuracy, available computational resources, a desired amount of time for completion, any other suitable factor, or any suitable combination thereof. For example, the calibration processor 912 can select from a single-link calibration algorithm, an iterative algorithm, or a least squares algorithm. As another example, the calibration processor 912 can select from a plurality of algorithms that includes at least one of a single-link calibration algorithm, an iterative algorithm, or a least squares algorithm. According to certain applications, a hybrid of two or more algorithms can be used for determining calibration coefficients. Such a hybrid can be of two or more of a single-link calibration algorithm, an iterative algorithm, or a least squares algorithm. The calibration processor 912 can be implemented by dedicated circuitry and/or by circuitry of the processor 904.

As illustrated, the processor 904 is in communication the data store 914. The data store 914 can store instructions that can be executed by one or more of the processor 904, the antenna grouping block 906, the reference signal manager 908, the channel estimator 910, or the calibration processor 912 to implement any suitable combination of the features described herein. The data store 914 can retain information associated with one or more of antennas for which calibration is desired, network conditions, or the like. The data store 914 can store network traffic information. The data store 914 can store any other suitable data for the baseband unit 902.

The beamformer 916 can generate parameters for serving nodes for UEs. The parameters can include one or more of transmission mode, time, frequency, power, beamforming matrix, tone allocation, or channel rank. The beamformer 916 can determine optimal parameters for RRUs 920 coupled with the BBU 902 that facilitate a network-wide optimization of downlink data transmissions. Similar functionality can be implemented for receiving uplink data transmission. The beamformer 916 is an example of an advanced precoding block that can enhance wireless communication in a TDD MIMO network. The beamformer 916 can apply calibration coefficients generated by any suitable calibration routine disclosed herein. For example, the beamformer 916 can generate a downlink channel estimate based on an uplink channel estimate and a calibration coefficient generated by a calibration routine. Such a downlink channel estimate can be generated in accordance with Equations 1 and 2 discussed above.

The illustrated processor 904 is in communication the RRU interface 918. The RRU interface 918 can be any suitable interface for proving signals to an RRU 920 and receiving signals from the RRU 920. As an example, the RRU interface 918 can be a Common Public Radio Interface.

Calibration for Group of UEs

The calibration disclosed herein can be applied to a groups of UEs communicating with a network system in a coordinated manner. Antennas of such UEs can be divided into groups and calibration can be performed in accordance with any suitable principles and advantages disclosed herein. Calibration can be applied in various MIMO network environments in which UEs establish peer-to-peer (P2P) links with each other and the reception and/or transmission capabilities of the UEs are used to increase the data rate and/or rank associated with one of the UEs. The groups of UEs can include two or more UEs.

Figure 10A:
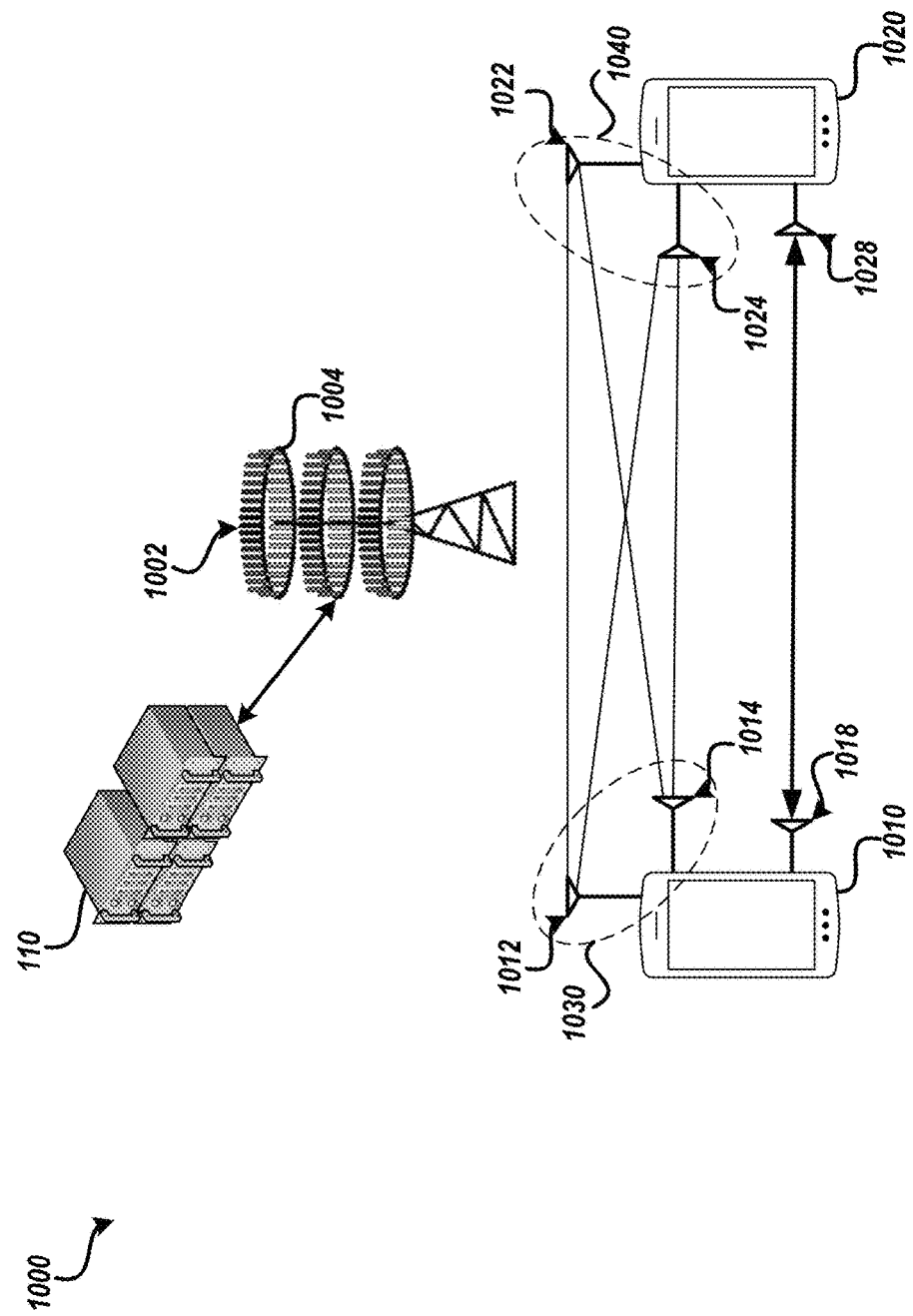
FIG. 10A is a diagram illustrating communications between UEs for performing calibration associated with antennas of the UEs according to an embodiment.

FIG. 10A is a diagram illustrating communications between UEs for performing calibration associated with antennas of the UEs according to an embodiment. The UEs are arranged for coordinated transmission and reception of MIMO data for one UE by two UEs communicating via a P2P.

The example MIMO wireless communication environment 1000 of FIG. 10A includes a BBU 110, an RRU 1002 with a plurality of antennas 1004, a first UE 1010, and a second UE 1020. The RRU 1002 can be implemented by distributed RRUs in certain applications. The antennas 1004 can be distributed in certain applications. The illustrated first UE 1010 includes transmit/receive antennas 1012 and 1014 and a P2P antenna 1018. The illustrated transmit/receive antennas 1012 and 1014 can transmit and/or receive MIMO data with rank 2. The illustrated second UE 1020 includes transmit/receive antennas 1022 and 1024 and a P2P antenna 1028. The illustrated transmit/receive antennas 1022 and 1024 can transmit and/or receive MIMO data with rank 2. A P2P link can be established between the UEs 1010 and 1020 using the antennas 1018 and 1028. In various applications, the first UE 1010 and the second UE 1020 can have different numbers of antennas.

The transmit/receive antennas of the first UE 1010 and the second UE 1020 collectively include antennas 1012, 1014, 1022, and 1024. The antennas 1012, 1014, 1022, and 1024 can be divided into groups. As shown in FIG. 10A, a first group 1030 includes antennas 1012 and 1014 and a second group 1040 includes antennas 1022 and 1024.

For calibration, antennas of the first group 1030 can transmit first reference signals to antennas of the second group 1040 over designated physical resources in a first time slot. The antennas of the second group 1040 can receive the first reference signals in the first time slot. Antennas of the second group 1040 can transmit second reference signals to antennas of the first group 1030 over designated physical resources in a second time slot. The antennas of the first group 1030 can receive the second reference signals in the second time slot. The first time slot and the second time slot can each be synchronized between the first UE 1010 and the second UE 1020. The first UE 1010 can provide synchronization information to the second UE 1020 via a P2P link for such synchronization in certain applications.

The first UE 1010 can generate channel estimates based on the received second reference signals. The second UE 1020 can generated channel estimates based on the received first reference signals.

The first UE 1010 can receive information associated with the first reference signals received by the second UE 1020 over a peer-to-peer (P2P) link between the second UE 1020 and the first UE 1010. For example, the first UE 1010 can receive channel estimates generated by the second UE 1020 from the received first reference signals via the P2P link. As another example, the first UE 1010 can receive information associated with the received first reference signals from the second UE 1020 via the P2P link, and the first UE 1010 can generate channel estimates from the information from the second UE 1020.

The first UE can jointly process channel estimates associated with the antennas of the first UE 1010 and the second UE 1020 to generate calibration coefficients associated with each of the antennas of the first UE 1010 and the second UE 1020 that are included in the first group 1030 and the second group 1040. The calibration coefficients can each represent a ratio of a transmit coefficient and a receive coefficient. The calibration coefficients can each be associated with a particular transmit path, receive path, and antenna of a UE. The first UE 1010 can apply calibration coefficients associated with antennas of the first UE 1010 to thereby calibrate the first UE 1010. The first UE 1010 can transmit calibration coefficients for antennas of the second group 1040 to the second UE 1020 via the P2P link. The second UE 1020 can apply the calibration coefficients for the second UE 1020 received via the P2P link to calibrate the second UE 1020.

In some instances, the second UE 1020 can also determine calibration coefficients for antennas of the first group 1030 and antennas of the second group 1040. In such instances, the first UE 1010 can transmit information associated with the received second reference signals (e.g., channel estimates or information from which channel estimates can be generated) over the P2P link. The calibration coefficients generated by the UEs 1010 and 1020 can be compared with each other in some applications. Based on the comparison one or more calibration coefficients can be adjusted. For cases where both the first UE 1010 and the second UE 1020 generated calibration coefficients, the UEs 1010 and 1020 can each use locally generated calibration coefficients without transmitting calibration coefficients over the P2P link in some applications.

Figure 10B:
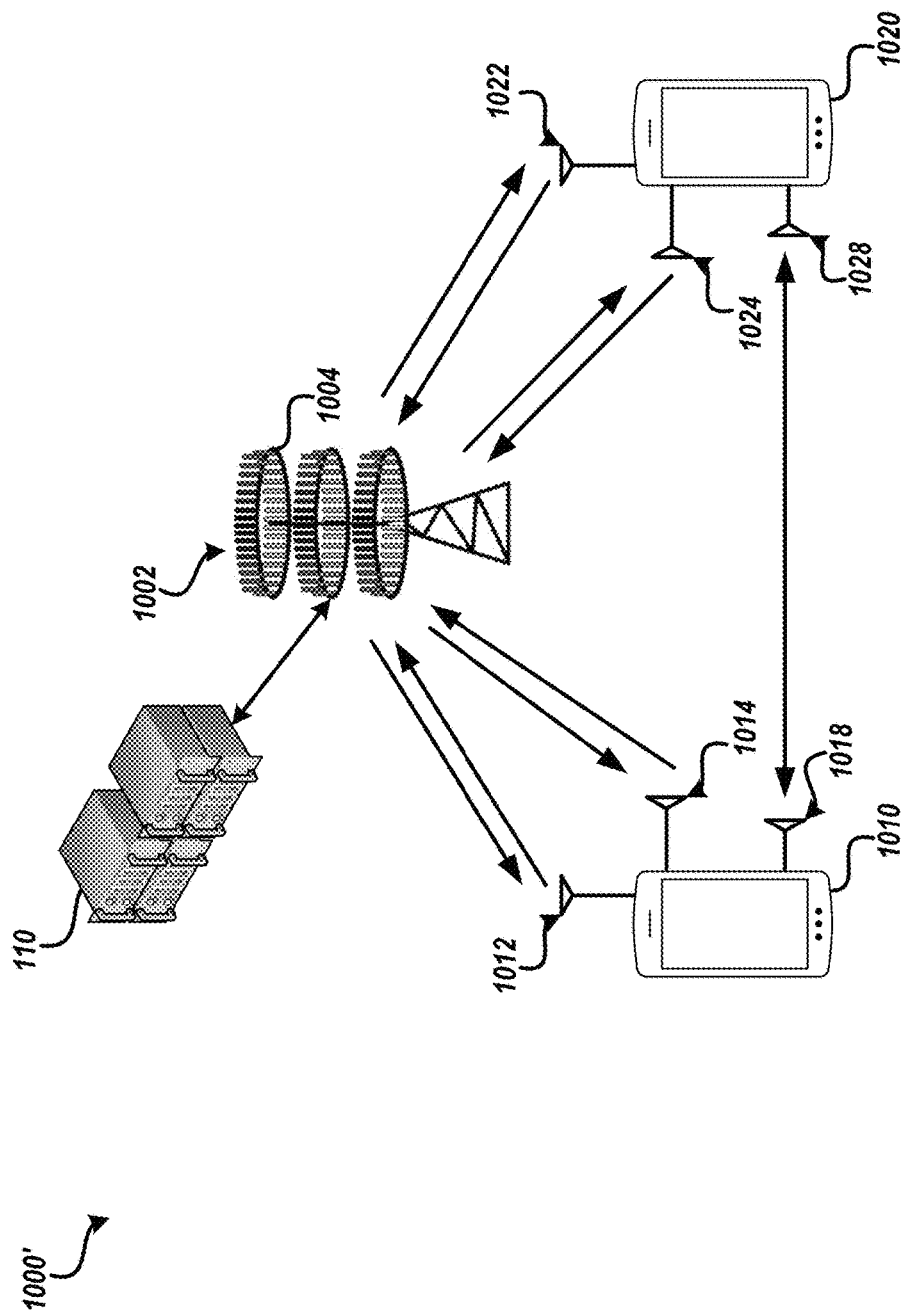
FIG. 10B is a diagram illustrating coordinated communication of MIMO data between the UEs of FIG. 10A and a network system after calibration according to an embodiment.

FIG. 10B is a diagram illustrating coordinated communication of MIMO data between the UEs of FIG. 10A and a network system after calibration according to an embodiment. A network environment 1000' of FIG. 10B includes the same elements as the network environment 1000 of FIG. 10A. While the network environment 1000 of FIG. 10A illustrates features of calibration, the network environment 1000' illustrates the UEs 1010 and the 1020 wirelessly exchanging MIMO data associated with the first UE 1010 with the network system in a coordinated manner.

In the illustrated network environment 1000', a group of UEs can wirelessly communicate with a larger number of antennas to serve the first UE 1010 to thereby increase a data rate and MIMO rank associated with the first UE 1010. Groups of UEs can wirelessly communicate MIMO data with the network system in accordance with any suitable principles and advantages disclosed in one or more of U.S. patent application Ser. Nos. 16/224,643; 16/224,528; 16/224,520; and 16/224,568; the disclosures of each of which are hereby incorporated by reference in their entireties herein.

There are a large number of antennas 1004 relative to the number of antennas of the first UE 1010 in the wireless environment 1000'. Accordingly, the communication rate of the first UE 1010 can be limited by the antennas and/or signal chains of the first UE 1010 when the primary UE 1010 is in communication with the antennas 1004 by itself. In such a case, the network system has excess capacity serve the first UE 1010. The UE 1020 can also have excess capacity to assist the UE 1010 in communicating with the network system.

The first UE 1010 can establish a P2P link with the second UE 1020. The P2P link can be established prior to the calibration routine discussed with reference to FIG. 10A. The P2P link can be used to exchange traffic between the first UE 1010 and the second UE 1020. The P2P link can be a Wi-Fi link, a Bluetooth link, a cellular link, or the like. P2P communications can be out-of-band. P2P communications can be in-band in some cases. The P2P link can enable relatively fast data transfer between the first UE 1010 and the second UE 1020. In some instances, the second UE 1020 can process part of the MIMO data associated with the first UE 1010 and send the processed data to the first UE 1010 via the P2P link. The data provided over the P2P link can be samples (modulation), bits (physical layer), or bytes (higher layer). The first UE 1010 and the second UE 1020 can together coordinate transmission and/or reception of MIMO data associated with the first UE 1010.

Downlink MIMO data associated with the first UE 1010 can be received by the first UE 1010 and the second UE 1020. A first part of the downlink MIMO data for the first UE 1010 can be received via the antennas 1012 and 1014 of the first UE 1010. A second part of the downlink MIMO data for the first UE 1010 can be received by the antennas 1022 and 1024 of the second UE 1020. The second UE 1020 can provide the second part of the downlink MIMO data to the first UE 1010 via the P2P link. In the example illustrated in FIG. 10B, the first UE 1010 and the second UE 1020 can each receive downlink MIMO data with a rank of two. By receiving the second part of the MIMO data associated with the first UE 1010 by the second UE 1020 and providing such data to the first UE 1010 via the P2P link, downlink MIMO data associated with the first UE 1010 can be effectively received with a rank of 4. Similarly, by receiving the second part of the MIMO data associated with the first UE 1010 with the second UE 1020 and sending such data to the first UE 1010 via the P2P link, downlink MIMO data associated with the first UE 1010 can be effectively transmitted at about 2 times the maximum data rate corresponding to receiving downlink MIMO data by the antennas 1012 and 1014.

Uplink MIMO data associated with the first UE 1010 can be transmitted by the first UE 1010 and the second UE 1020 in a coordinated manner. A processor of the first UE 1010 can cause transmission of a first part of a MIMO uplink data transmission via the antennas 1012 and 1014 and to cause transmission of a second part of the MIMO uplink data transmission to the second UE 1020 via the peer-to-peer link. The second UE 1020 can then transmit the second part of the uplink MIMO data transmission via the antennas 1022 and 1024. In the example illustrated in FIG. 10B, coordinated transmission of uplink MIMO data can increase the rank and maximum data rate of transmitting uplink MIMO data associated with the first UE 1010.

User Equipment Arranged for Calibration

Figure 11:
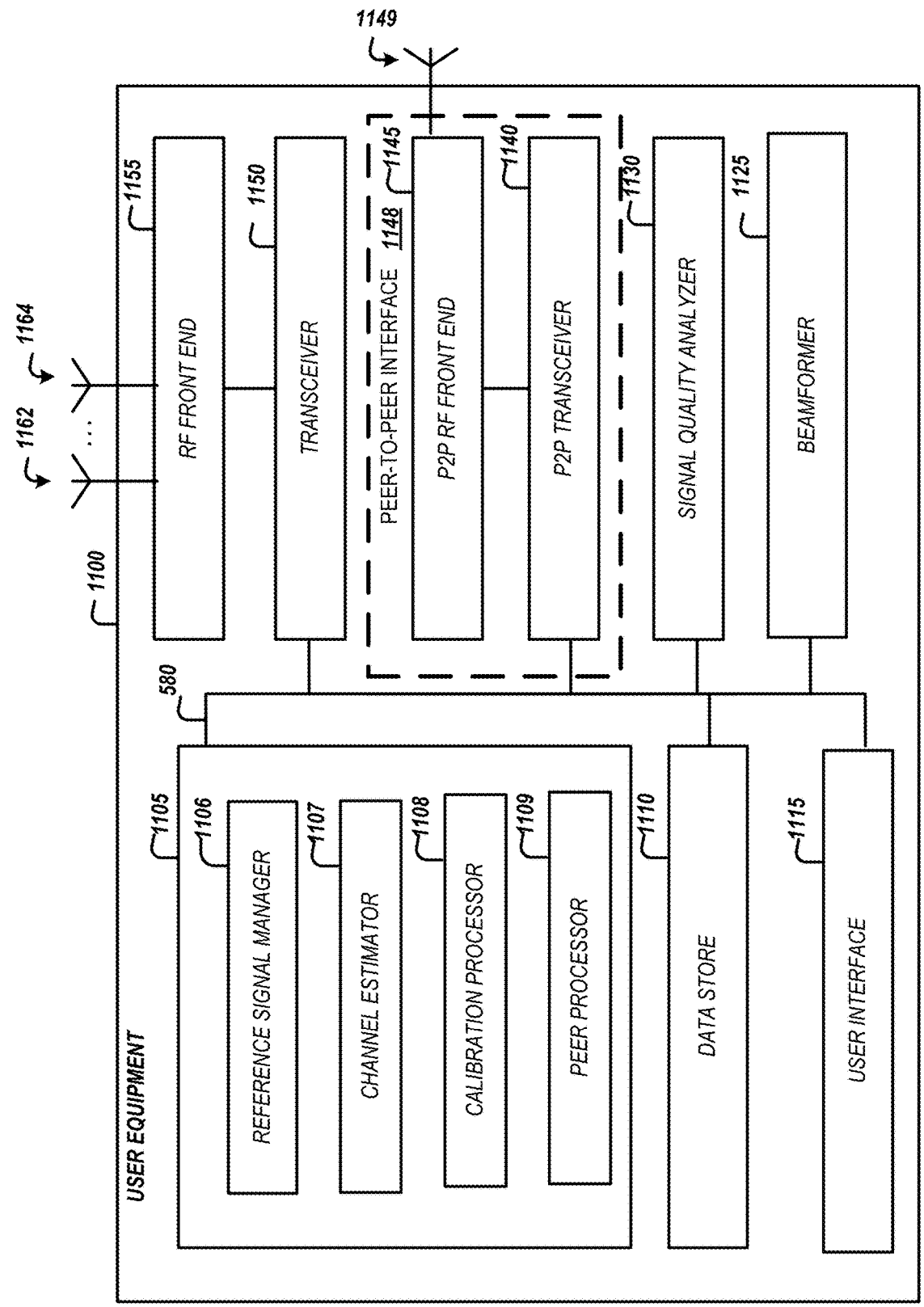
FIG. 11 is a block diagram of an example UE according to an embodiment.

A variety of different UEs can wirelessly communicate with a network system. FIG. 11 is a schematic block diagram of an example UE 1100 according to an embodiment. The UE 1100 is configured for wirelessly communicating with a base station and also wirelessly communicating with another UE via a P2P link. The UE 1100 can perform any suitable features of calibration disclosed herein, such as features disclosed with reference to FIG. 10A. The UE 1100 can function as a UE of a group of UEs arranged to wirelessly communicate MIMO data associated with one UE with a network system.

As illustrated, the UE 1100 includes a processor 1105, a data store 1110, a user interface 1115, a beamformer 1125, a signal quality analyzer 1130, a peer-to-peer transceiver 1140, a peer-to-peer radio frequency front end 1145, an antenna 1149 for peer-to-peer communications, a transceiver 1150, a radio frequency front end 1155, and antennas 1162 and 1164. The illustrated processor 1105 includes a reference signal manager 1106, a channel estimator 1107, a calibration processor 1108, and a peer processor 1109. Some other suitable UEs can include additional elements and/or a subset of the elements illustrated in FIG. 11.

The UE 1100 includes circuitry for cellular communications. The transceiver 1150 and the radio frequency front end 1155 can generate signals for uplink cellular data transmissions via the antennas 1162 and 1164. The transceiver 1150 includes a transmitter and a receiver. The transmitter can include one or more transmit chains. In certain instances, the transmitter includes a plurality of transmit chains. The transceiver 1150 and the radio frequency front end 1155 can process downlink cellular data transmissions received via the antennas 1162 and 1164. The receiver of transceiver 1150 can include one or more receive chains. In certain instances, receiver can include a plurality of receive chains. A calibration coefficient disclosed herein can be associated with a particular combination of a transmit chain, receive chain, and antenna of the UE 1100.

The UE 1100 can include any suitable number of antennas for wirelessly communicating with a network system. The antennas of the UE 1100 can include one or more transmit/receive antennas arranged to transmit and/or receive data, such as the antennas 1162 and 1164. Calibration coefficients can be determined for the transmit/receive antennas 1162 and 1164 in accordance with any suitable principles and advantages disclosed herein. The antennas of the UE 1100 can include one or more antennas arranged to communicate data with another UE via a P2P link, such as the antenna 1149.

The processor 1105 can include any suitable physical hardware configured to perform the functionality described with reference to the processor 1105 and elements thereof. The processor 1105 can include a processor configured with specific executable instructions, a microprocessor, a microcontroller, a digital signal processor (DSP), an application specific integrated circuit (ASIC), a programmable logic device such as field programmable gate array (FPGA), the like, or any combination thereof designed to perform the functions described herein. The processor 1105 can be implemented by any suitable combination of computing devices and/or discrete processing circuits in certain applications.

The reference signal manager 1106 can be implemented by dedicated circuitry of the processor 1105 and/or by circuitry of the processor 1105 that can be used for other functionality. The reference signal manager 1106 can coordinate transmission of reference signals for calibration. The reference signal manager 1106 can determine a type of reference signal to transmit from a group of antennas of the UE 1100 to one or more other groups of antennas of one or more other UEs for calibration. The reference signal manager 1106 can coordinate the timing of the time slots for transmitting and receiving reference signals for calibration. The reference signal manager 1106 can identify designated physical resources, such as orthogonal physical resources, over which to transmit reference signals. The reference signal manager 1106 can send information to another UE via the peer-to-peer interface 1148 related to one or more of a reference signal type, a timing reference for synchronizing time slots, or designated physical resources over which to transmit and/or receive reference signals.

The channel estimator 1107 can generate channel estimates based on reference signals received during a calibration routine. The channel estimator 1107 can generate channel estimates for links between antennas in different groups. The channel estimator 1107 can be implemented by dedicated circuitry and/or by circuitry of the processor 1105. In some instances, the channel estimator 1107 can include circuitry for channel estimation for SRS.

The channel estimator 1107 can generate an uplink channel estimate based on an uplink pilot signal. The channel estimator 1107 can generate a downlink channel estimate based on the uplink pilot signal and a calibration coefficient generated by a calibration routine.

The calibration processor 1108 can generate calibration coefficients based on the channel estimates from the channel estimator 1107. The calibration processor 1108 can execute any suitable calibration algorithm for determining calibration coefficients, such as a single link calibration algorithm, an iterative calibration algorithm, or a least squares regression. The calibration processor 1108 can be arranged to implement two or more different algorithms in a variety of applications.

In certain instances, the calibration processor 1108 can select a particular calibration algorithm to implement for a specific application. The particular calibration algorithm can be selected based on a desired accuracy, computational resources, a latency or timing for providing calibration coefficients, any other suitable factor, or any suitable combination thereof. For example, the calibration processor 1108 can select from a single-link calibration algorithm, an iterative algorithm, or a least squares algorithm. As another example, the calibration processor 1108 can select from a plurality of algorithms that includes at least one of a single-link calibration algorithm, an iterative algorithm, or a least squares algorithm. According to certain applications, a hybrid of two or more algorithms can be used for determining calibration coefficients. Such a hybrid can be of two or more of a single-link calibration algorithm, an iterative algorithm, or a least squares algorithm. The calibration processor 1108 can be implemented by dedicated circuitry and/or by circuitry of the processor 1105.

The peer processor 1109 can perform operations to that facilitate the UE 1100 to operate as part of a group of UEs that wirelessly communicate MIMO with a network system in a coordinated manner. For example, the peer processor 1109 can initiate a grouping of UEs that can wirelessly communicate MIMO data associated with the UE 1100 with the network system. As another example, the peer processor can determine whether the UE 1100 accepts a request to operate as a secondary UE of a group of UEs. As one more example, the peer processor 1109 can jointly process and/or aggregate MIMO data associated with the UE 1100. The peer processor 1109 can be implemented by dedicated circuitry of the processor 1105 and/or by circuitry of the processor 1105 that can be used for other functionality.

Initiating a grouping of UEs can involve functions related to selecting another UE to wirelessly communicate data associated with the UE 1100 with the network system. The peer processor 1109 can cause the UE 1100 to execute functionality related to one or more of discovering one or more candidate UEs for a grouping, collecting data from one or more candidate secondary UEs, determining joint spectral efficiency for the UE 1100 combined with a candidate UE, prioritizing a secondary UE, sending grouping information to the network system for making a grouping decision, or making a grouping decision.

The peer processor 1109 can determine whether to functioning as a secondary UE that wirelessly communicates MIMO data associated with another UE with the network system. This can involve accepting or rejecting a request for the UE 1100 to function as a secondary UE based on one or more of a variety of factors, including without limitation as battery life, traffic state, incentives, etc. The peer processor 1109 can also initiate a confirmation or rejection of a grouping request to be send to a primary UE.

The peer processor 1109 can jointly process and/or aggregate MIMO data associated with the UE 1100 when the UE 1100 is operating as a primary UE of a group of UEs. The peer processor 1109 can jointly process and/or aggregate downlink data received via the antennas 1162, 1164, and 1149. The peer processor 1109 can jointly process uplink data for transmission via the antennas 1162, 1164, and 1149. The peer processor 1109 can establish a peer-to-peer link with another UE.

The peer processor 1109 can perform operations associated with processing and transmitting MIMO data associated with another UE when the UE 1100 is operating as a secondary UE. The peer processor 1109 can cause the UE 1100 to enter a mode to operate as a secondary UE. The peer processor 1109 can detect that received data is associated with a primary UE. In certain applications, the peer processor 1109 can generate symbol level data from MIMO data received from a network system, and the cause the symbol level data to be transmitted to a primary UE via the peer-to-peer link. The peer processor 1109 can cause MIMO physical layer data to be transmitted to primary UE via the peer-to-peer link. MIMO physical layer data can include data from, for example, high definition video streaming, a relatively large content download, or a social network content sharing application. The peer processor 1109 can manage communications with another UE over the peer-to-peer link. The peer processor 1109 can implement any suitable features of a processor of a UE disclosed in one or more of U.S. patent application Ser. Nos. 16/224,643; 16/224,528; 16/224,520; and 16/224,568.

The processor 1105 can be in communication with the signal quality analyzer 1130. The signal quality analyzer 1130 can analyze the quality of signals received and/or transmitted by any of the antennas of the UE 1100. This can provide information associated with a spatial channel condition of the UE 1100. This information can be provided to the processor 1105 for determining one or more of a spectral efficiency of the UE 1100, an estimated joint spectral efficiency of the UE 1100 and another UE, or a relative priority of other UEs as candidate secondary UEs for a group of UEs. In some instances, some or all of the functionality of the signal quality analyzer can be implemented by the processor 1105 and/or the channel estimator 1107.

The UE 1100 includes circuitry for peer-to-peer wireless communications with another UE. The peer-to-peer wireless communications can be over a non-cellular communication channel. A peer-to-peer wireless interface can refer to circuitry of the UE 1100 configured to wirelessly communicate (e.g., receive and/or transmit) data to another UE via a peer-to-peer communication channel. As shown in FIG. 11, the UE 1100 includes a peer-to-peer wireless interface 1148. The peer-to-peer wireless interface 1148 includes a peer-to-peer transceiver 1140 and a peer-to-peer radio frequency front end 1145. The peer-to-peer transceiver 1140 and the peer-to-peer radio frequency front end 1145 cause data to be transmitted over the peer-to-peer link via the antenna 1149. The peer-to-peer transceiver 1140 and the peer-to-peer radio frequency front end 1145 can process data received over the peer-to-peer link via the antenna 1148. The UE 1100 can be configured to transmit and/or receive MIMO physical layer information over the peer-to-peer link in certain applications. Symbol level data can be exchanged over the peer-to-peer link in various applications.

The wireless signals exchanged over the peer-to-peer link can be non-cellular wireless signals. The non-cellular wireless signals can be in accordance with a wireless local area network (WLAN) standard or a wireless personal area network (WPAN) standard. The non-cellular wireless signals can be Bluetooth signals, Wi-Fi signals, ZigBee signals, or the like. The non-cellular wireless signals can have a shorter signal range than cellular signals. In some instances, the non-cellular wireless signals can have a range of about 300 feet or less. The non-cellular wireless signals can have a range of about 150 feet or less in certain applications. The non-cellular wireless signals can have a range of about 35 feet or less in some other applications. In some instances, the wireless signals exchanged over the peer-to-peer link can be cellular signals.

The beamformer 1125 can perform any suitable beamforming functionality for the UE 1100. The beamformer 1125 can set and/or adjust one or more parameters associated with receiving and/or transmitting signals associated with the antennas 1162 and 1164 of the UE 1100. The beamformer 1125 can be implemented by dedicated circuitry and/or circuitry of the processor 1105. The beamformer 1125 is an example of a precoding circuit. In some instances (not illustrated), the UE 1100 can include a precoding circuit that is different than a beamformer 1125. The beamformer 1125 can apply calibration coefficients generated by any suitable calibration routine disclosed herein. For example, the beamformer 1125 can generate a downlink channel estimate based on an uplink channel estimate and a calibration coefficient generated by a calibration routine.

The UE 1100 includes a data store 1110. The data store 1110 can store instructions that can be executed by the processor 1105 to implement any suitable features described herein. The data store 1110 can store data to facilitate calibration. The data store 1110 can store data to facilitate coordinated communication between a group of UEs and a network system. The data store 1110 can store any other suitable data for the UE 1100. The data store 1110 can include any suitable memory elements arranged to store data.

As illustrated, the UE 1100 also includes a user interface 1115. The user interface 1115 can be any suitable user interface, such as a display and/or an audio component. In some instances, the user interface 1115 can include one or more of touch screen capabilities, a button, a knob, a switch, or a slider. The user interface 1115 can include a microphone and a speaker in certain applications.

Several elements included in the UE 1100 may be coupled by a bus 1180. The bus 1180 can be a data bus, communication bus, other bus, or any suitable combination thereof to enable the various components of the UE 1100 to exchange information.

User Equipment as Virtual Network Node

Although embodiments discussed above may relate to calibration of antennas of RRUs, the principles and advantages disclosed herein can be applied to calibration associated with antennas of any suitable nodes arranged to transmit and receive radio frequency signals. For example, calibration associated with one or more antennas of other suitable network infrastructure can be performed in accordance with the principles and advantages disclosed herein. As another example, calibration associated with one or more antennas of one or more UEs operating as a virtual network element can be performed in accordance with the principles and advantages disclosed herein.

A UE operating as a virtual network element that can operate as one or more of a repeater, a virtual transmit-receive point (TRP) (e.g., a virtual coordinated multi-point (CoMP) TRP), or a virtual RRU. A UE can operate as a virtual network node in accordance with any suitable principles and advantages disclosed in one or more of U.S. patent application Ser. Nos. 16/268,325; 16/268,346; and 16/268,343; the disclosures of each of which are hereby incorporated by reference in their entireties herein. Hardware of the UE together with network configuration can implement such features. In certain instances, a UE can include RF circuitry arranged to process a received RF signal and generate a transmit RF signal without intervening baseband processing. Accordingly, such RF circuitry can be implemented entirely by analog circuity. The RF circuitry can process a received RF signal and generate a transmit RF signal entirely in the RF domain without demodulation to baseband. In some instances, the RF circuitry can frequency translate a received RF signal and generate a transmit RF signal having a different carrier frequency than the received RF signal. Alternatively or additionally, the RF circuitry can process a received RF signal and generate a transmit RF signal without modulation and/or demodulation. According to some applications, the RF circuitry can perform front haul processing on a received RF signal. A network system can signal the UE to operate in a mode for operating as a virtual network element, such a repeater mode or a TRP mode. One or more UEs operating as virtual network nodes can achieve one or more of richer scattering, higher network MIMO dimension, or extended network coverage.

Figure 12:
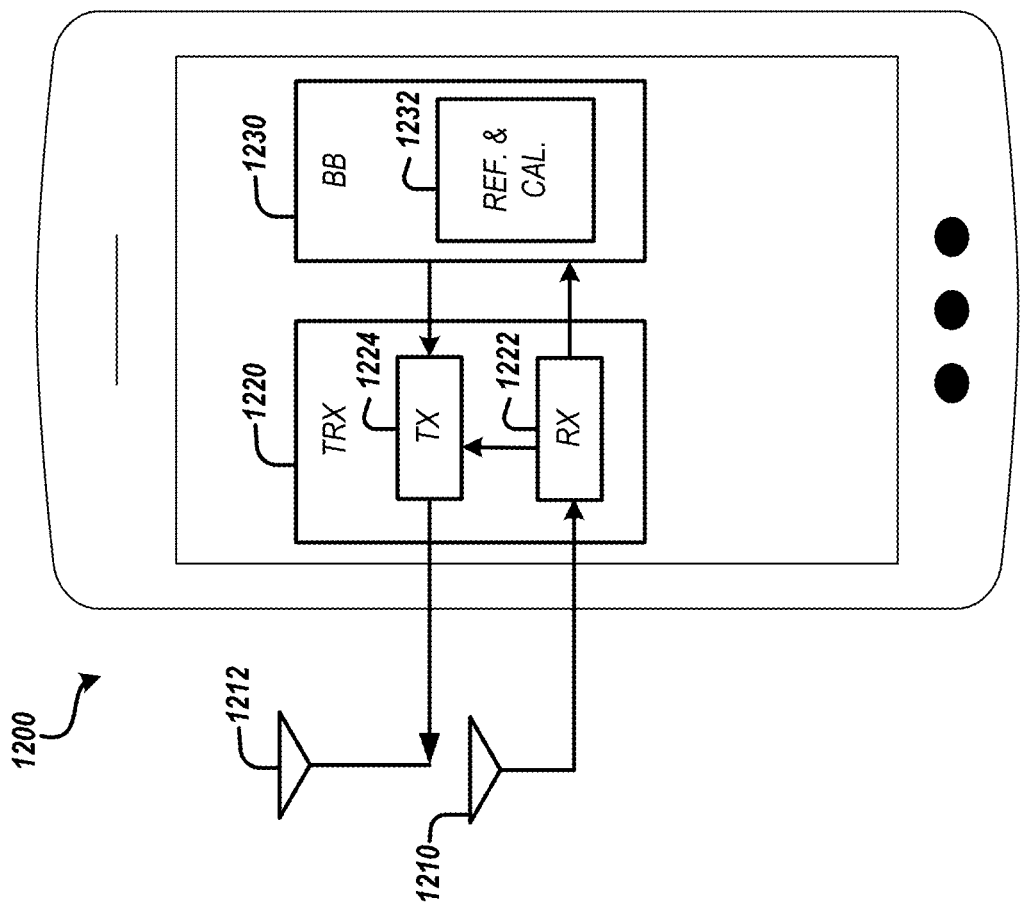
FIG. 12 is a block diagram of an example UE arranged to function as a virtual network node according to an embodiment.

FIG. 12 is a block diagram of an example UE 1200 arranged to function as a virtual network node according to an embodiment. The illustrated UE 1200 includes antennas 1210 and 1212, a transceiver 1220, and a baseband processor 1230.

The UE 1200 can perform functionality of a network node. The transceiver 1220 includes a receive path 1222 and a transmit path 1224. The transceiver 1220 can operate in multiple modes. In a first mode, the transceiver 1220 is configured to couple the receive path 1222 to the transmit path 1224 in an analog domain. Accordingly, the receive path 1222 can be coupled to the transmit path 1212 without intervening baseband circuitry. In a second mode, the transceiver 1220 is configured to provide signal processing between an antenna 1210 and/or 1212 and the baseband processor 1230. Although the UE 1200 includes two antennas for illustrative purposes, the UE 1200 can include any suitable number of antennas. In some instances, a UE can receive and transmit a signal from the same antenna. Although one receive path and one transmit path of the transceiver 1220 are shown for illustrative purposes, the transceiver 1220 can include any suitable number of transmit paths and any suitable number of receive paths.

The UE 1200 can implement any suitable features of calibration disclosed herein. Calibration can be performed using one or more antennas of the UE 1200 together with one or more antennas of RRUs and/or one or more antennas of other UEs. The baseband processor 1230 includes a reference and calibration processor 1232. The reference and calibration processor 1232 can implement any suitable combination of the BBU 902 of FIG. 9 and/or the UE 1100 for calibration. For example, the reference and calibration processor 1232 can implement any suitable combination of features of one or more of the antenna grouping block 906, the reference signal manager 908, the channel estimator 910, or the calibration processor 912 of FIG. 9.

In some instances, a UE be configurable to operate in multiple modes, in which at least one of the modes enables the UE to operate as a virtual network element and another mode is a traffic mode. The UE can include a multi-mode transceiver arranged to operate in the multiple modes. The transceiver can perform analog signal processing in a UE, such as amplification, filtering, and up conversion/down conversion. The transceiver can operate in the RF domain. In some instances, the UE can enable a virtual network element mode when the UE is in an idle mode. UEs arranged to operate as a virtual network element can include RF translation circuitry and/or mode switching circuitry. The RF translation circuitry can adjust a frequency of a received RF signal in the RF domain without demodulation to baseband. The mode switching circuitry can implement RF front end gating between virtual network element mode and a traffic mode.

Methods of Generating Calibration Coefficients

Figure 13:
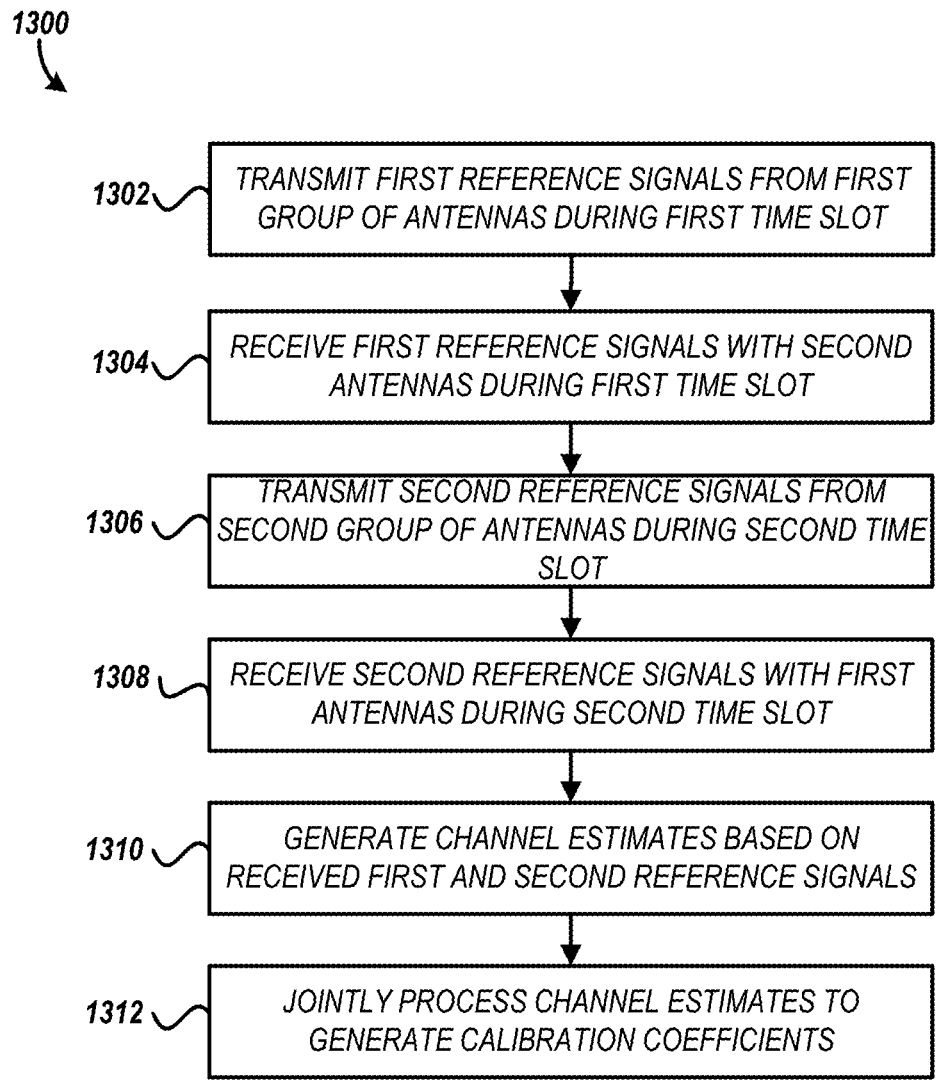
FIG. 13 is a flow diagram of an example method of generating calibration coefficients according to an embodiment.

FIG. 13 is a flow diagram of an example method 1300 of generating calibration coefficients according to an embodiment. The method 1300 can be performed by any suitable TDD MIMO system disclosed herein. Any suitable principles and advantages associated with generating calibration coefficients disclosed herein can be implemented in the method 1300. The method 1300 relates to a generating calibration coefficients associated with groups of antennas. A plurality of antennas arranged to serve UEs can be divided into groups. Antennas can be divided into groups, for example, as discussed with reference to FIGS. 4A to 4C. A plurality of nodes can include the plurality of antennas. In some instances, the nodes can include one or more RRUs, one or more UEs arranged to operate as a virtual network node, one or more other network infrastructure elements, or any suitable combination thereof. As one example, the plurality of RRUs can include the plurality of antennas. The method 1300 can generate calibration coefficients periodically, at set times, in response to one or more events, or any combination thereof.

At block 1302, a first group of antennas can transmit first reference signals to a second group of antennas during a first time slot. The first reference signals can be any suitable reference signals disclosed herein, such as SRS, cyclically shifted signals, and/or FDM signals. The first reference signals can be orthogonal to each other in time or frequency. The first time slot can be during a guard period or during an uplink time slot without assigned uplink traffic. For example, the first time slot can be any of the first time slots of FIGS. 5A to 5C. The first reference signals can be transmitted to the second group of antennas over designated physical resources. The designated physical resources can be orthogonal physical resources. The second group of antennas can receive the first reference signals at block 1304.

At block 1306, the second group of antennas can transmit second reference signals to the first group of antennas during a second time slot. The second reference signals can be any suitable reference signals disclosed herein, such as SRS, cyclically shifted signals, and/or FDM signals. The second reference signals can be orthogonal to each other in time or frequency. The second time slot can be, for example, any of the second time slots of FIGS. 5A to 5C. The second reference signals can be transmitted to the first group of antennas over the designated physical resources. The first group of antennas can receive the second reference signals at block 1308.

Information associated with reference signals received by remote radio unit nodes can be exchanged using wired backhaul. In certain instances, information associated with one or more reference signals received by a user equipment node can be exchanged using a wireless peer-to-peer interface (e.g., for a user equipment operating as a virtual network node or for a user equipment of a group of user equipments arranged to communicate with a network system in a coordinated manner). For a user equipment node arranged to operate as a virtual network node, information associated with one or more reference signals received by the user equipment node can be exchanged using a wireless backhaul between a network system and the user equipment.

Channel estimates can be generated based on the received first and second reference signals at block 1310. The channel estimates can include CSI. The channel estimates can be generated after the first reference signals and the second reference signals are both received in certain applications. According to some other applications, channel estimates associated with the first reference signals can be generated before and/or concurrently with the second reference signals being transmitted.

The channel estimates can be jointly processed to generate calibration coefficients at block 1312. The joint processing can involve any suitable algorithm, such as a single-link algorithm, an iterative algorithm, or a least squares regression. Each of the calibration coefficients can represent a ratio associated with a transit coefficient and a receive coefficient. Such a ratio can be (a) a transmit coefficient divided by a receive coefficient or (b) a receive coefficient divided by a transmit coefficient. Each calibration coefficient can represent a ratio for compensating for a difference between a transmit coefficient and a receive coefficient. Each calibration coefficient can represent a ratio for compensating for channel gain mismatch between a transmit coefficient and a receive coefficient. The transmit coefficient can be for a particular transmit path to an antenna. The receive coefficient can be for a particular receive path from the antenna. Accordingly, a calibration coefficient associated with an antenna can be for a particular transmit path, a particular receive path, and the particular antenna. The generated calibration coefficients can be applied to increase performance of the TDD MIMO system.

Figure 14A:
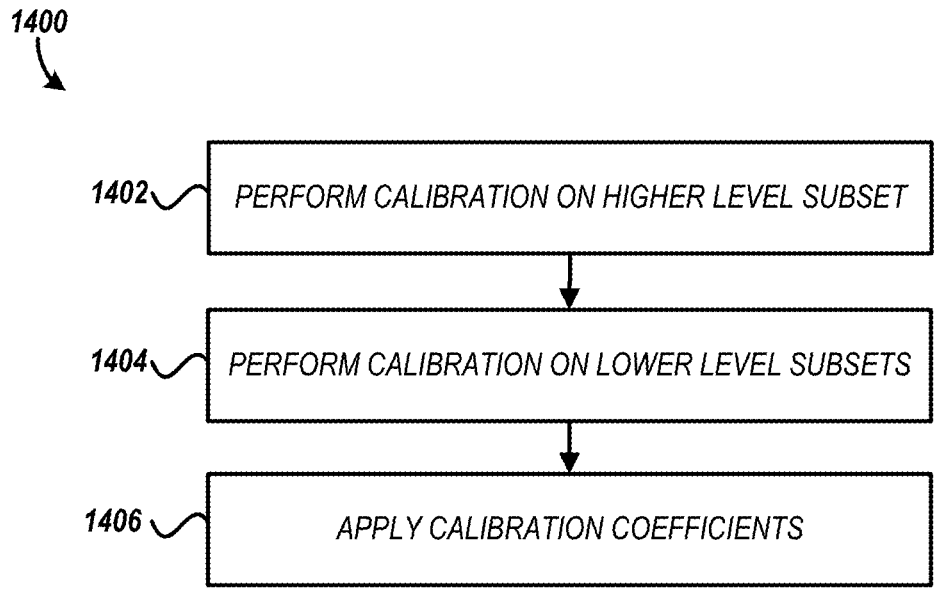
FIG. 14A is a flow diagram of an example method of hierarchical calibration according to an embodiment.

FIG. 14A is a flow diagram of an example method 1400 of hierarchical calibration according to an embodiment. The method 1400 illustrates that calibration can be performed at two or more levels of hierarchy. This can be advantageous in TDD MIMO systems with relatively large numbers of antennas. The hierarchical calibration can include any suitable principles and advantages disclosed with reference to FIGS. 8A and/or 8B.

Calibration can be performed on a higher level subset of antennas of a TDD MIMO system at block 1402. Calibration can involve generating calibration coefficients for each antenna of the higher level subset. These calibration coefficients can be generated using any suitable principles and advantages of the method 1300 of FIG. 13. The higher level subset of antennas can include reference antennas for lower level subsets.

Calibration can be performed on a lower level subset of antennas of a TDD MIMO system at block 1404. The lower level subset can include a single antenna of the higher level subset and use this antenna as a reference antenna. This calibration of the lower level subset can involve generating calibration coefficients for each antenna of the lower level subset. These calibration coefficients can be generated using any suitable principles and advantages of the method 1300 of FIG. 13. Calibration coefficients can be generated for a plurality of lower level subsets that each include a reference antenna that is also included in the higher level subset. The calibration coefficients for the lower level subsets can be generated concurrently and/or sequentially. Calibration coefficients can be generated for one or more additional layers of hierarchy.

The calibration coefficients can be applied at block 1406. This can calibrate the TDD MIMO system for wirelessly communicating uplink and downlink data.

Figure 14B:
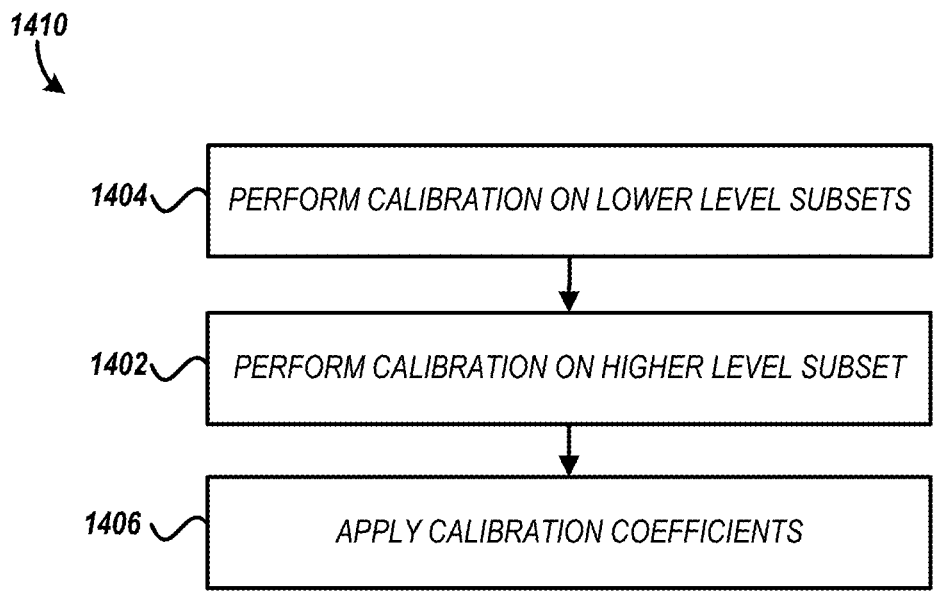
FIG. 14B is a flow diagram of an example method of hierarchical calibration according to an embodiment.

FIG. 14B is a flow diagram of an example method 1410 of hierarchical calibration according to an embodiment. The method 1410 is like the method 1400 of FIG. 14A except that the order of blocks 1402 and 1404 are swapped. Accordingly, calibration can be performed on lower level subsets before calibration is performed on higher level subsets in hierarchical calibration. In some instances, calibration of one or more lower level subsets can be performed at least partly concurrently calibration of a higher level subset.

Figure 15:
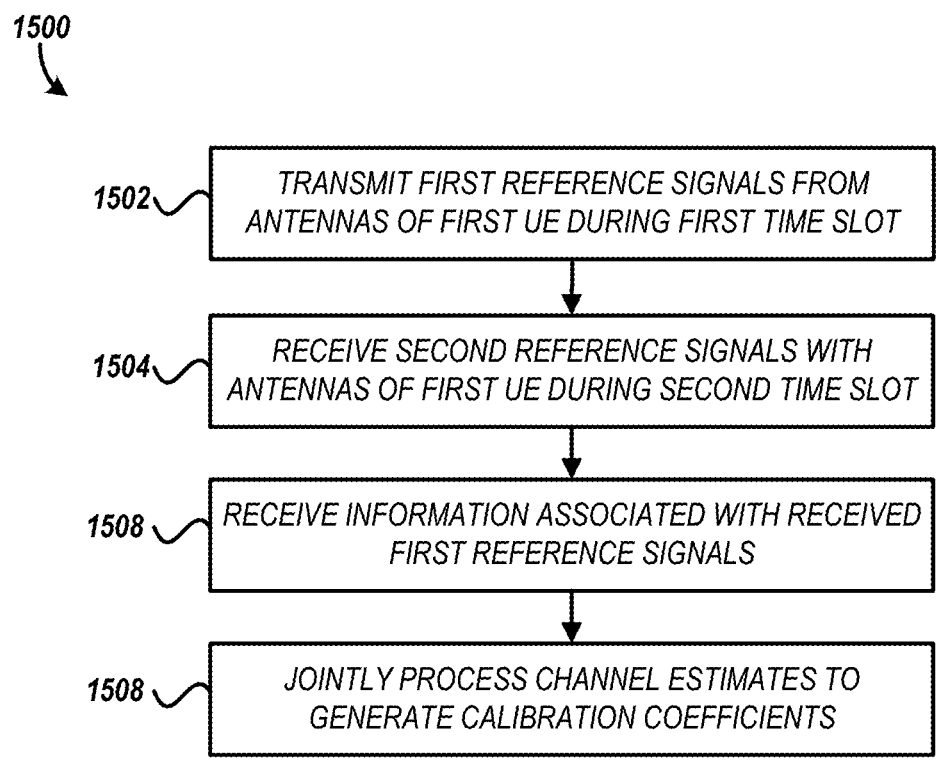
FIG. 15 is a flow diagram of an example method of generating calibration coefficients for UEs according to an embodiment.

FIG. 15 is a flow diagram of an example method 1500 of generating calibration coefficients for UEs according to an embodiment.

The method 1500 can be performed by any suitable UE disclosed herein, such as the UEs 1100 and/or 1200. Any suitable principles and advantages associated with generating calibration coefficients for UEs disclosed herein can be implemented in the method 1500. The method 1500 relates to a generating calibration coefficients associated with antennas of UEs. The UEs can wirelessly communicate MIMO data for one UE with a network system in a coordinated manner. The method 1500 can generate calibration coefficients periodically, at set times, in response to one or more events, or any combination thereof.

At block 1502, antennas of a first UE can transmit reference signals to antennas of a second UE over designated physical resources during a first time slot. The first time slot can be synchronized between the first UE and the second UE. The antennas of the first UE can receive second reference signals transmitted by the antennas of the second UEs over the designated physical resources during a second time slot at block 1504. The second time slot can be synchronized between the first UE and the second UE. The first UE can receive information associated with the first reference signals received by the second UE over a P2P link between the second UE and the first UE at block 1506. The information can include channel estimates or information from which channel estimates can be generated.

At block 1508, the first UE can jointly process channel estimates associated with the first antennas of the first UE and the second UE to generate calibration coefficients associated with the antennas of the first UE and the antennas of the second UE. The joint processing can involve any suitable algorithm, such as a single-link algorithm, an iterative algorithm, or a least squares regression. Each of the calibration coefficients can represent a ratio associated with a transit coefficient and a receive coefficient. Such a ratio can be (a) a transmit coefficient divided by a receive coefficient or (b) a receive coefficient divided by a transmit coefficient. The transmit coefficient can be for a particular transmit path to an antenna. Each calibration coefficient can represent a ratio for compensating for a difference between a transmit coefficient and a receive coefficient. Each calibration coefficient can represent a ratio for compensating for channel gain mismatch between a transmit coefficient and a receive coefficient. The receive coefficient can be for a particular receive path from the antenna. Accordingly, a calibration coefficient associated with an antenna can be for a particular transmit path, a particular receive path, and the particular antenna. The generated calibration coefficients can be applied to increase performance of the UEs jointly communicating MIMO data with a network system.

Conclusion

Depending on the embodiment, certain acts, events, or functions of any of the processes or algorithms described herein can be performed in a different sequence, can be added, merged, or left out altogether (e.g., not all described operations or events are necessary for the practice of the process or algorithm). Moreover, in certain embodiments, operations, or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," "such as," and the like, unless specifically stated otherwise, or otherwise understood within the context as used, is generally intended to convey that certain embodiments include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without other input or prompting, whether these features, elements, and/or steps are included or are to be performed in any particular embodiment. The terms "comprising," "including," and the like are synonymous and are used inclusively, in an open-ended fashion, and do not exclude additional elements, features, acts, operations, and so forth. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated or generally understood from context, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Connections can be via an air interface and/or via wires and/or via optical fiber and/or via any other suitable connection.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A time-division duplex (TDD) multiple-input multiple-output (MIMO) system comprising:
   a plurality of nodes comprising a first group of antennas and a second group of antennas, each node of the plurality of nodes configured to wirelessly transmit and wirelessly receive signals; and
   a baseband unit in communication with the plurality of nodes, the baseband unit comprising one or more processors configured to execute instructions stored by the baseband unit to:
      cause the first group of antennas to transmit first reference signals to the second group of antennas over designated physical resources during a first time slot;

cause the second group of antennas to transmit second reference signals to the first group of antennas over the designated physical resources during a second time slot;

cause a third group of antennas to transmit third reference signals to the first and second groups of antennas during a third time slot;

generate channel estimates based on the first reference signals received by the second group of antennas, the second reference signals received by the first group of antennas, and the third reference signals received by the first and second groups of antennas; and jointly process the channel estimates to generate, for at least each antenna of the first and second groups of antennas, a calibration coefficient representing a ratio for compensating for a difference between a transmit coefficient and a receive coefficient.

2. The TDD MIMO system of claim 1, wherein the plurality of nodes comprises remote radio units, a first remote radio units of the remote radio units comprises an antenna of the first group of antennas, and a second remote radio unit of the remote radio units comprises an antenna of the second group of antennas.

3. The TDD MIMO system of claim 2, wherein the plurality of nodes comprises a user equipment arranged to operate as a virtual network node.

4. The TDD MIMO system of claim 1, wherein the plurality of nodes comprises a user equipment.

5. The TDD MIMO system of claim 1, wherein the plurality of nodes comprises a first user equipment and a second user equipment, and wherein the first user equipment and the second user equipment are configured to communicate with each other via a peer-to-peer link.

6. The TDD MIMO system of claim 1, wherein the designated physical resources are orthogonal physical resources.

7. A method of calibration in a time-division duplex (TDD) multiple-input multiple-output (MIMO) system, the method comprising:

causing transmission, from a first group of antennas, of first reference signals to a second group of antennas over designated physical resources during a first time slot;

causing transmission, from the second group of antennas, of second reference signals to the first group of antennas over the designated physical resources during a second time slot;

causing a third group of antennas to transmit third reference signals to the first and second groups of antennas during a third time slot;

generating channel estimates associated with the first and second groups of antennas based on the first reference signals received by the second group of antennas, the second reference signals received by the first group of antennas, and the third reference signals received by the first and second groups of antennas; and jointly processing the channel estimates to generate, for each antenna of the first and second groups, a calibration coefficient representing a ratio for compensating for channel gain mismatch between a transmit coefficient and a receive coefficient.

8. The method of claim 7, wherein a remote radio unit comprises an antenna of the first group.

9. The method of claim 7, wherein a remote radio unit comprises an antenna of the first group, and wherein a user equipment arranged to operate as a virtual network node comprises an antenna of the second group.

10. The method of claim 7, wherein a user equipment comprises an antenna of the first group.

11. The method of claim 7, wherein a first user equipment comprises an antenna of the first group, wherein a second user equipment comprises an antenna of the second group, and the method further comprises transmitting information associated with the first reference signals received by the antenna of the second group of the second user equipment to the first user equipment via a peer-to-peer link between the first user equipment and the second user equipment.

12. The method of claim 7, wherein the first group of antennas comprises a reference antenna, and wherein the jointly processing comprises a single link calibration that comprises determining the calibration coefficients based on a single link from the antennas of second group to the reference antenna.

13. The method of claim 7, wherein the jointly processing comprises generating the calibration coefficients with an iterative calibration that comprises applying an iterative algorithm on a factor graph of multiple paths between antennas of the first and second groups.

14. The method of claim 7, further comprising selecting an algorithm of a plurality of algorithms for the jointly processing, wherein the plurality of algorithms have different computational complexity and different accuracy.

15. The method of claim 7, further comprising:

causing transmission, from the first group of antennas, of additional first reference signals to a third group of antennas during the first time slot; and causing transmission, from the second group of antennas, of additional second reference signals to the third group of antennas during the second time slot; and wherein the generating the channel estimates is based on the additional first reference signals and the additional second reference signals received by the third group of antennas.

16. The method of claim 7, further comprising applying each of the calibration coefficients to a respective signal path associated with the antennas of the first and second groups to compensate for channel gain mismatches between respective transmit and receive coefficients.

17. The method of claim 7, wherein the jointly processing comprises determining the calibration coefficients relative to a calibration coefficient associated with a reference antenna of the first group of antennas.

18. The method of claim 17, wherein the reference antenna is included in a higher level subset of antennas, and wherein the higher level subset of antennas comprises a first higher level subset group of antennas and a second higher level subset group of antennas.

19. The method of claim 18, further comprising:

causing the first higher level subset group of antennas to transmit first higher level subset reference signals to the second higher level subset group of antennas during a first higher level subset time slot;

causing the second higher level subset group of antennas to transmit second higher level subset reference signals to the first higher level subset group of antennas during a second higher level subset time slot;

generating higher level subset channel estimates based on the first higher level subset reference signals received by the second higher level subset group of antennas and the second higher level subset reference signals received by the first higher level subset group of antennas; and jointly processing the higher level subset channel estimates to generate, for at least each antenna of the first and second higher level subset groups, a higher level subset calibration coefficient representing a ratio associated with a transmit coefficient and a receive coefficient.

20. The method of claim 19 wherein the jointly processing the higher level subset channel estimates is performed before jointly processing the channel estimates.

21. Non-transitory computer-readable storage comprising memory storing computer-executable instructions, wherein the computer-executable instructions, when executed by a baseband unit of a time-division duplex (TDD) multiple-input multiple-output (MIMO) system, cause the TDD MIMO system to perform the method of claim 7.

22. A method of calibration in a time-division duplex (TDD) multiple-input multiple-output (MIMO) system, the method comprising:
   causing transmission, from a first group of antennas, of first reference signals to a second group of antennas over designated physical resources during a first time slot;
   causing transmission, from the second group of antennas, of second reference signals to the first group of antennas over the designated physical resources during a second time slot;
   generating channel estimates associated with the first and second groups of antennas based on the first reference signals received by the second group of antennas and the second reference signals received by the first group of antennas; and
   jointly processing the channel estimates to generate, for each antenna of the first and second groups, a calibration coefficient representing a ratio for compensating for channel gain mismatch between a transmit coefficient and a receive coefficient, wherein the jointly processing comprises generating the calibration coefficients with a least squares regression of determining the calibration coefficients for the antennas of the first and second groups.

23. The method of claim 22, further comprising:
causing a third group of antennas to transmit third reference signals to the first and second groups of antennas during a third time slot;
wherein the generating the channel estimates is based on the third reference signals received by the first and second groups of antennas.

\* \* \* \* \*